(12) United States Patent
He et al.

(10) Patent No.: US 11,442,448 B2
(45) Date of Patent: Sep. 13, 2022

(54) SELF-MOVING DEVICE, METHOD FOR PROVIDING ALARM ABOUT POSITIONING FAULT IN SAME, SELF-MOVING DEVICE, AND AUTOMATIC WORKING SYSTEM

(71) Applicant: Positec Power Tools (Suzhou) Co., Ltd, Jiangsu (CN)

(72) Inventors: Mingming He, Jiangsu (CN); Yong Shao, Jiangsu (CN); Chang Zhou, Jiangsu (CN); Yiyun Tan, Jiangsu (CN); Fangshi Liu, Jiangsu (CN); Shiping Jiao, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 171 days.

(21) Appl. No.: 16/442,442

(22) Filed: Jun. 14, 2019

(65) Prior Publication Data
US 2019/0369640 A1    Dec. 5, 2019

Related U.S. Application Data

(63) Continuation of application No. PCT/CN2017/116685, filed on Dec. 15, 2017.

(30) Foreign Application Priority Data

Dec. 15, 2016  (CN) .......................... 201611157425.9

(51) Int. Cl.
*G05D 1/00* (2006.01)
*A01D 34/00* (2006.01)
(Continued)

(52) U.S. Cl.
CPC ......... *G05D 1/0088* (2013.01); *A01D 34/008* (2013.01); *G01S 19/41* (2013.01);
(Continued)

(58) Field of Classification Search
CPC .. G05D 1/0088; G05D 1/0212; G05D 1/0214; G05D 1/0225; G05D 1/0278;
(Continued)

(56) References Cited

U.S. PATENT DOCUMENTS

2002/0156556 A1   10/2002   Ruffner
2004/0193348 A1    9/2004   Gray et al.
(Continued)

FOREIGN PATENT DOCUMENTS

CN        1989419 A      6/2007
CN      102082466 A      6/2011
(Continued)

*Primary Examiner* — Aniss Chad
*Assistant Examiner* — Christopher George Fees
(74) *Attorney, Agent, or Firm* — Dentons US LLP

(57) ABSTRACT

The invention relates to a method for providing an alarm about a positioning fault in a self-moving device. A self-moving device is configured to autonomously move, based on positioning of the self-moving device, inside a working region defined on a map. The method includes: receiving positioning data from a satellite positioning system to locate the self-moving device; detecting whether a positioning fault occurs in the self-moving device; and in response to a detected positioning fault that occurs in the self-moving device, providing an alarm about the positioning fault.

18 Claims, 32 Drawing Sheets

(51) Int. Cl.
*G01S 19/41* (2010.01)
*G01S 19/47* (2010.01)
*G05D 1/02* (2020.01)
*G06F 16/29* (2019.01)
*G05B 13/02* (2006.01)
*A01D 101/00* (2006.01)

(52) U.S. Cl.
CPC ............ *G01S 19/47* (2013.01); *G05D 1/0212* (2013.01); *G05D 1/0214* (2013.01); *G05D 1/0225* (2013.01); *G05D 1/0278* (2013.01); *G06F 16/29* (2019.01); *A01D 2101/00* (2013.01); *G05B 13/0265* (2013.01); *G05D 2201/0208* (2013.01)

(58) Field of Classification Search
CPC ............ G05D 2201/0208; G06F 16/29; A01D 34/008; A01D 2101/00; G01S 19/41; G01S 19/47; G05B 13/0265
See application file for complete search history.

(56) References Cited

U.S. PATENT DOCUMENTS

| | | |
|---|---|---|
| 2007/0282565 A1 | 12/2007 | Battcher et al. |
| 2008/0024306 A1* | 1/2008 | Bomber ............ G06K 7/10881 340/572.7 |
| 2009/0281661 A1* | 11/2009 | Dooley ................. B60L 50/52 700/258 |
| 2010/0007550 A1 | 1/2010 | Nagamiya et al. |
| 2010/0315288 A1* | 12/2010 | Liu ....................... H04B 7/086 342/359 |
| 2012/0260617 A1* | 10/2012 | Gilpatrick ............... H02J 50/12 56/11.9 |
| 2014/0324300 A1* | 10/2014 | Halder ................. G01C 21/165 701/50 |
| 2016/0165795 A1* | 6/2016 | Balutis ................. G05D 1/0265 701/25 |
| 2017/0250465 A1* | 8/2017 | Wakasugi ................ H01Q 7/06 |

FOREIGN PATENT DOCUMENTS

| | | |
|---|---|---|
| CN | 102844722 A | 12/2012 |
| CN | 102955478 A | 3/2013 |
| CN | 103217976 A | 7/2013 |
| CN | 103324192 A | 9/2013 |
| CN | 203352594 U | 12/2013 |
| CN | 103576567 A | 2/2014 |
| CN | 103728644 A | 4/2014 |
| CN | 105116902 A | 12/2015 |
| CN | 105405451 A | 3/2016 |
| CN | 105446343 A | 3/2016 |
| CN | 105446350 A | 3/2016 |
| CN | 105738935 A | 7/2016 |
| CN | 105843219 A | 8/2016 |
| CN | 105856263 A | 8/2016 |
| CN | 105890602 A | 8/2016 |
| CN | 106202241 A | 12/2016 |
| CN | 106325271 A | 1/2017 |
| DE | 4300941 B4 | 6/2009 |
| EP | 2093634 A2 | 8/2009 |
| JP | H1073650 A | 3/1998 |
| WO | 2014145996 A1 | 9/2014 |
| WO | 2016102143 A1 | 6/2016 |
| WO | WO-2016144709 A1 * | 9/2016 ............ G01S 19/34 |

* cited by examiner

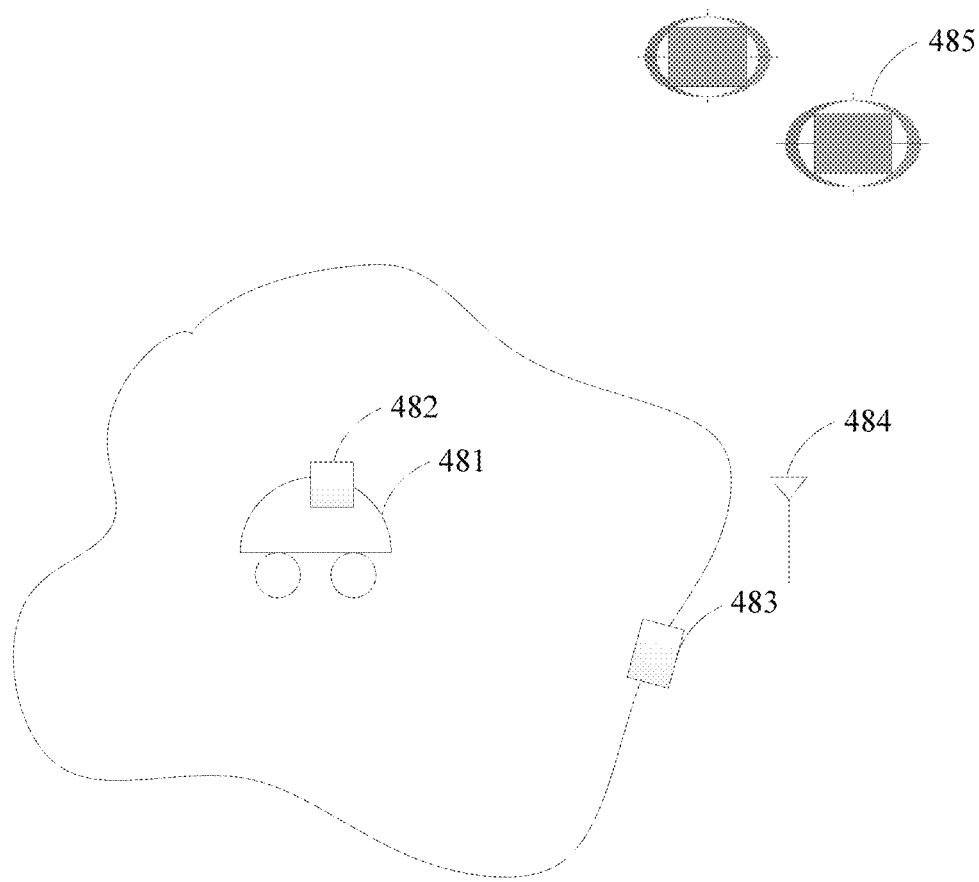

FIG. 46

Receive confirmation information from a user to confirm target position points, and acquire information about the target position points, where the target position points include position points on a boundary of a working region, and the information about the target position points includes coordinate information of the target position points — 5101

Connect the target position points to obtain at least one boundary to generate a map — 5102

FIG. 47

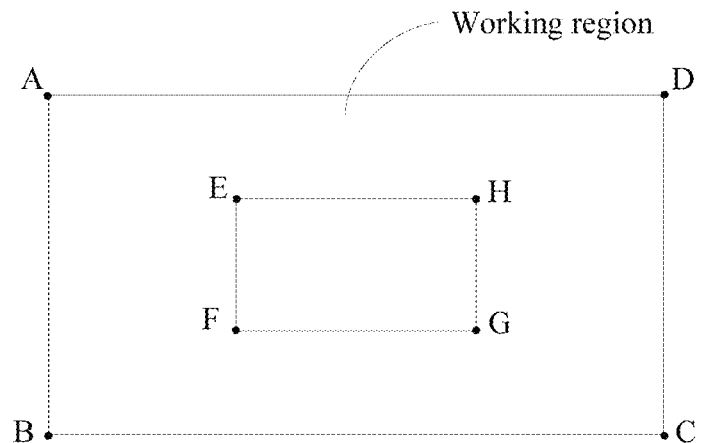

FIG. 48a

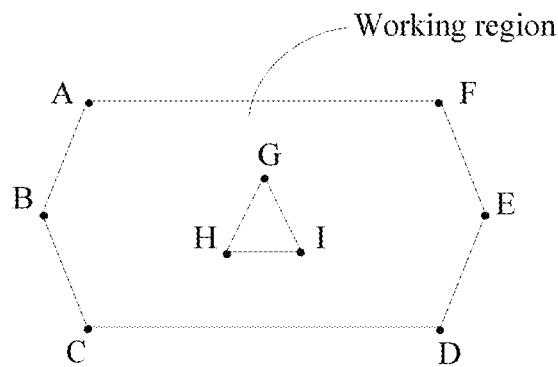

FIG. 48b

| Acquire information about several target position points, where the several target position points include discrete position points on a boundary of a working region, and the information about the target position points includes coordinate information of the target position points | 5201 |

| Connect the target position points to obtain at least one boundary to generate a map of the working region | 5202 |

FIG. 49

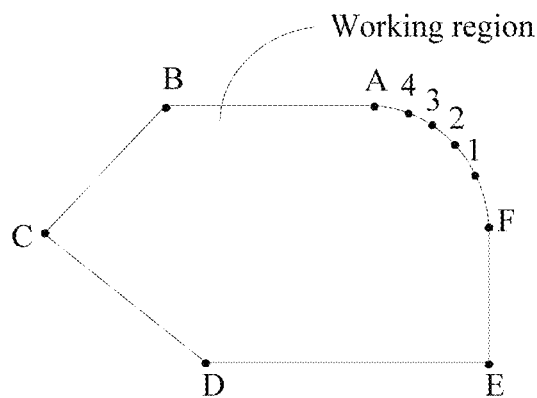

FIG. 53

Control a mobile station to start to move from a starting position point to a corresponding end position point, and continuously acquire information about position points through which the mobile station moves, where the starting position point and the end position point are position points on a boundary of a working region — 5501

Connect the target position points, the starting position point, and the end position point to obtain at least one boundary to generate a map of the working region — 5502

FIG. 54

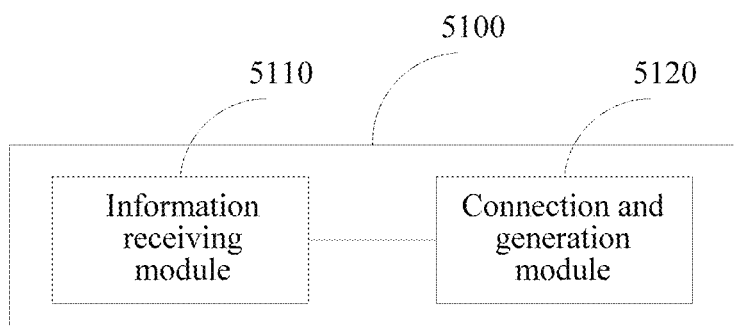

FIG. 55

SELF-MOVING DEVICE, METHOD FOR PROVIDING ALARM ABOUT POSITIONING FAULT IN SAME, SELF-MOVING DEVICE, AND AUTOMATIC WORKING SYSTEM

This application is a continuation of PCT International Application No. PCT/CN2017/116685, filed on Dec. 15, 2017, which claims priority under 35 U.S.C. 119(e) to Chinese Patent Application No. 201611157425.9 filed on Dec. 15, 2016, which is hereby incorporated by reference herein in their entirety.

BACKGROUND

Technical Field

The present invention relates to a self-moving device, and in particular, to a method for providing an alarm about a positioning fault in a self-moving device, a self-moving device, an automatic working system, and an electronic device.

Related Art

An automatic working system such as an automatic lawn mower system can automatically complete a lawn maintenance task or the like, and becomes increasingly popular among consumers. In the automatic working system, a self-moving device such as an automatic lawn mower is restricted to move inside a working region. When the automatic lawn mower leaves the working region, a safety problem may occur. In addition, an obstacle may exist in the working region. The obstacle includes a pit, a flowering shrub, and the like. The automatic lawn mower should avoid the obstacle in the working region during working to prevent accidents such as falling or trapping. To ensure the safety of the automatic working system and improve the working efficiency of the automatic lawn mower, the automatic lawn mower needs to recognize the working region. The recognizing the working region includes recognizing a boundary of the working region and an obstacle in the working region.

In a method used by a conventional automatic lawn mower to recognize a working region, a boundary line is arranged along a boundary of the working region, and a boundary line may be arranged along a periphery of an obstacle. A boundary line transmits an electrical signal to generate an electromagnetic field. A sensor on the automatic lawn mower detects an electromagnetic field signal to determine whether the automatic lawn mower is located inside or outside a region defined by a boundary line.

Such a method requires complex arrangement of a boundary line and adversely affects the look of a lawn.

To enable an automatic lawn mower to recognize a working region without arranging a boundary line, a method for creating a map of a working region may be used. In the method for creating a map of a working region, position coordinates of a boundary, an obstacle, and the like of a working region are recorded, a coordinate system is established, and a map of the working region is generated. When an automatic working system works, a position of the automatic lawn mower on the map is observed to determine whether the automatic lawn mower is inside a safe working region.

An automatic working system using this method needs to have a navigation function to enable an automatic lawn mower to accurately acquire the position of the automatic lawn mower during working. However, a navigation module may encounter a fault for various reasons, resulting in a positioning exception. Therefore, another technical problem in using this method is how to notify a user when the navigation module encounters a positioning fault.

Another technical problem in using this method is how to ensure that an automatic working system accurately locates itself when a navigation module encounters a positioning fault.

Another technical problem in using this method is how to create a map of a working region and resolve a problem in creating the map of the working region.

Another technical problem in using this method is how to ensure map generation accuracy and robot positioning accuracy.

An automatic control system such as an automatic lawn mower system can automatically complete a lawn maintenance task or the like, and becomes increasingly popular among users. In an automatic working system, a self-moving device such as an automatic lawn mower is restricted to move inside a preset working region. In the prior art, when the automatic lawn mower works inside the preset working region, a charging station is used to charge the automatic lawn mower. Specifically, the charging station is connected to an alternating-current power supply in a user's home through an adapter and then outputs low-voltage direct-current power to power the automatic lawn mower. In addition, the charging station is integrated with a base station, and the charging station powers the base station.

However, to ensure quality of a satellite signal received by the base station, the base station needs to be disposed in a relatively open region. Because the base station is integrated with the charging station, an installing position of the base station is restricted. For example, the base station cannot be disposed on a roof or at another high, relatively open position. As a result, a positioning signal that is sent by a satellite and received by the base station has relatively low quality, and further, navigation data provided by the base station and a mobile station to an automatic working system has relatively low reliability.

A self-moving device such as an automatic lawn mower system can automatically complete a lawn maintenance task or the like, and becomes increasingly popular among users. A self-moving device such as an automatic lawn mower is restricted to move inside a working region. In the prior art, during the creation of a map of the working region, a positioning device is controlled to move along a boundary of the working region to record the coordinates of all position points on the boundary of the working region.

In this manner, in a region in which a positioning signal may be relatively poor in a working region, recorded coordinates deviate considerably from actual coordinates, resulting in relatively low map generation accuracy.

SUMMARY

To overcome the disadvantages in the prior art, one problem to be resolved by the present invention is to notify a user when a positioning fault occurs in a self-moving device.

The technical solution used by the present invention to resolve the problem in the prior art is as follows:

A method for providing an alarm about a positioning fault in a self-moving device is provided, a self-moving device being configured to autonomously move, based on positioning of the self-moving device, inside a working region defined on a map, and the method including: receiving positioning data from a satellite positioning system to locate the self-moving device; detecting whether a positioning fault occurs in the self-moving device; and in response to a detected positioning fault that occurs in the self-moving device, providing an alarm about the positioning fault.

In the foregoing method for providing an alarm about a positioning fault in a self-moving device, the providing an alarm about the positioning fault includes: providing an alarm locally at the self-moving device.

In the foregoing method for providing an alarm about a positioning fault in a self-moving device, the providing an alarm about the positioning fault includes: sending an alarm signal indicating the positioning fault in the self-moving device.

In the foregoing method for providing an alarm about a positioning fault in a self-moving device, the providing an alarm about the positioning fault includes: providing a fault detail of the positioning fault.

In the foregoing method for providing an alarm about a positioning fault in a self-moving device, the fault detail includes a fault type of the positioning fault.

In the foregoing method for providing an alarm about a positioning fault in a self-moving device, the fault detail includes a fault solution corresponding to the fault type.

In the foregoing method for providing an alarm about a positioning fault in a self-moving device, the fault type is self-detected by the self-moving device.

In the foregoing method for providing an alarm about a positioning fault in a self-moving device, the fault type is self-detected by the self-moving device based on at least one of the following: a part in which the positioning fault occurs; and a communication stage in which data flows in or out.

In the foregoing method for providing an alarm about a positioning fault in a self-moving device, the providing an alarm about the positioning fault includes: determining whether the fault type of the positioning fault can be determined; and in response to a failure to determine the fault type of the positioning fault, prompting a possible fault type.

In the foregoing method for providing an alarm about a positioning fault in a self-moving device, the fault detail includes at least one of the time and location of the positioning fault.

In the foregoing method for providing an alarm about a positioning fault in a self-moving device, the fault detail includes a customer service phone number of the self-moving device.

In the foregoing method for providing an alarm about a positioning fault in a self-moving device, the providing an alarm about the positioning fault includes: determining a fault code corresponding to the fault type of the positioning fault; sending the fault code to a background service center; and receiving the fault solution corresponding to the fault type from the background service center.

The foregoing method for providing an alarm about a positioning fault in a self-moving device further includes: in response to the detected positioning fault that occurs in the self-moving device, controlling the self-moving device to stop moving.

A self-moving device is provided, configured to autonomously move, based on positioning of the self-moving device, inside a working region defined on a map, and including: a detection unit, configured to detect whether a positioning fault occurs in the self-moving device; and an alarm unit, configured to: in response to a detected positioning fault that occurs in the self-moving device, provide an alarm about the positioning fault.

In the foregoing self-moving device, the alarm unit is configured to provide an alarm locally at the self-moving device.

In the foregoing self-moving device, the alarm unit is configured to send an alarm signal indicating the positioning fault in the self-moving device.

In the foregoing self-moving device, the alarm unit is configured to provide a fault detail of the positioning fault.

In the foregoing self-moving device, the fault detail includes a fault type of the positioning fault.

In the foregoing self-moving device, the fault detail includes a fault solution corresponding to the fault type.

In the foregoing self-moving device, the fault type is self-detected by the self-moving device.

In the foregoing self-moving device, the fault type is self-detected by the self-moving device based on at least one of the following: a part in which the positioning fault occurs; and a communication stage in which data flows in or out.

In the foregoing self-moving device, the alarm unit is configured to: determine whether the fault type of the positioning fault can be determined; and in response to a failure to determine the fault type of the positioning fault, prompt a possible fault type.

In the foregoing self-moving device, the fault detail includes at least one of the time and location of the positioning fault.

In the foregoing self-moving device, the fault detail includes a customer service phone number of the self-moving device.

In the foregoing self-moving device, the alarm unit is configured to: determine a fault code corresponding to the fault type of the positioning fault; send the fault code to a background service center; and receive the fault solution corresponding to the fault type from the background service center.

The foregoing self-moving device further includes a control unit, configured to: in response to the detected positioning fault that occurs in the self-moving device, control the self-moving device to stop moving.

An automatic working system is provided, including the foregoing self-moving device. In the foregoing automatic working system, the self-moving device is an automatic lawn mower.

In the foregoing automatic working system, the automatic working system is an automatic lawn mower.

An electronic device is provided, including: a memory, configured to store a computer executable instruction; and a processor, configured to execute the computer executable instruction stored in the memory, to perform the foregoing method for providing an alarm about a positioning fault in a self-moving device.

A computer readable storage medium is provided, storing a computer program instruction, where when being executed by a computing apparatus, the computer program instruction may operate to perform the foregoing method for providing an alarm about a positioning fault in a self-moving device.

Compared with the prior art, the beneficial effect of the present invention is as follows: When a positioning fault in a self-moving device is detected, an alarm about the positioning fault is provided, so that a positioning exception in the self-moving device can be notified to a user.

To overcome the disadvantages in the prior art, another problem to be resolved by the present invention is to ensure that an automatic working system accurately locates itself.

The technical solution used by the present invention to resolve the problem in the prior art is as follows:

A positioning fault handling method for a self-moving device is provided, a self-moving device being configured to autonomously move, based on positioning of the self-moving device, inside a working region defined on a map, and the method including: receiving positioning data from a satellite positioning system to locate the self-moving device; detecting whether a positioning fault occurs in the self-moving device; in response to a detected positioning fault that occurs in the self-moving device, determining a time point before the positioning fault occurs in the self-moving device; acquiring precise positioning data at the time point; and locating, based on a predetermined positioning fault handling strategy, the self-moving device by using the precise positioning data.

In the foregoing positioning fault handling method for a self-moving device, the detecting whether a positioning fault occurs in the self-moving device includes: detecting a type of the positioning fault in the self-moving device; and the locating, based on a predetermined positioning fault handling strategy, the self-moving device by using the precise positioning data includes: selecting, based on the type of the positioning fault, the predetermined positioning fault handling strategy to locate the self-moving device by using the precise positioning data.

The foregoing positioning fault handling method for a self-moving device further includes: receiving positioning correction data from a base station of the satellite positioning system to locate the self-moving device; the acquiring precise positioning data at the time point includes: acquiring precise positioning correction data at the time point; and the selecting, based on the type of the positioning fault, the predetermined positioning fault handling strategy to locate the self-moving device by using the precise positioning data includes: using the precise positioning correction data as the positioning correction data based on the type of the positioning fault being a positioning fault that the self-moving device cannot receive a signal from the base station, to locate the self-moving device.

In the foregoing positioning fault handling method for a self-moving device, the locating, based on a predetermined positioning fault handling strategy, the self-moving device by using the precise positioning data includes: providing an assisted positioning system other than the satellite positioning system, and calibrating the assisted positioning system by using the precise positioning data, to locate the self-moving device.

In the foregoing positioning fault handling method for a self-moving device, the assisted positioning system includes an inertial navigation system; and the calibrating the inertial navigation system by using the precise positioning data, to locate the self-moving device includes: calculating, by the inertial navigation system, current position coordinates of the self-moving device by using the precise positioning data as starting position coordinates, to locate the self-moving device.

In the foregoing positioning fault handling method for a self-moving device, the assisted positioning system is at least one of an ultra-wideband (UWB) positioning system, a capacitance detection system, and an image recognition system.

The foregoing positioning fault handling method for a self-moving device further includes: in response to the detected positioning fault that occurs in the self-moving device, detecting, after a predetermined time, whether the absence of the positioning fault; and in response to the absence of the positioning fault, controlling the self-moving device to restore normal operation.

The foregoing positioning fault handling method for a self-moving device further includes: in response to the presence of the positioning fault, controlling the self-moving device to stop.

The foregoing positioning fault handling method for a self-moving device further includes: in response to the detected positioning fault that occurs in the self-moving device, estimating a distance d between a current position of the self-moving device and a boundary of the working region of the self-moving device; estimating a distance d' between the current position and an actual position of the self-moving device based on quality of a current positioning result; and in response to $d' \geq d$, controlling the self-moving device to change a movement manner.

In the foregoing positioning fault handling method for a self-moving device, the controlling the self-moving device to change a movement manner includes: controlling the self-moving device to stop moving or reverse a moving direction or move inside a small range.

The foregoing positioning fault handling method for a self-moving device further includes: in response to $d' < d$, controlling the self-moving device to continue moving.

The foregoing positioning fault handling method for a self-moving device further includes: in response to the detected positioning fault that occurs in the self-moving device, controlling the self-moving device to stop moving.

The foregoing positioning fault handling method for a self-moving device further includes: in response to the detected positioning fault that occurs in the self-moving device, receiving confirmation information of the positioning fault from a user.

A self-moving device is provided, including: a mobile station, configured to: receive positioning data of a satellite positioning system, and communicate with a base station; and a positioning fault handling apparatus, including: a positioning fault detection unit, configured to detect whether a positioning fault occurs in the self-moving device; a time point determining unit, configured to: in response to a detected positioning fault that occurs in the self-moving device, determine a time point before the positioning fault occurs in the self-moving device; a data acquisition unit, configured to: acquire precise positioning data at the time point; and a positioning fault handling unit, configured to locate, based on a predetermined positioning fault handling strategy, the self-moving device by using the precise positioning data.

In the foregoing self-moving device, the positioning fault detection unit is configured to detect a type of the positioning fault in the self-moving device; and the positioning fault handling unit is configured to select, based on the type of the positioning fault, the predetermined positioning fault handling strategy to locate the self-moving device by using the precise positioning data.

In the foregoing self-moving device, the mobile station is configured to receive positioning correction data from the base station of the satellite positioning system to locate the self-moving device; the time point determining unit is configured to acquire precise positioning correction data at the time point; and the positioning fault handling unit is configured to use the precise positioning correction data as the positioning correction data based on the type of the positioning fault being a positioning fault that the self-moving device cannot receive a signal from the base station, to locate the self-moving device.

In the foregoing self-moving device, the positioning fault handling unit is configured to: provide an assisted positioning system other than the satellite positioning system, and calibrate the assisted positioning system by using the precise positioning data, to locate the self-moving device.

In the foregoing self-moving device, the assisted positioning system includes an inertial navigation system; and the positioning fault handling unit is configured to control the inertial navigation system to calculate current position coordinates of the self-moving device by using the precise positioning data as starting position coordinates, to locate the self-moving device.

In the foregoing self-moving device, the assisted positioning system is at least one of a UWB positioning system, a capacitance detection system, and an image recognition system.

In the foregoing self-moving device, the positioning fault detection unit is configured to: in response to the detected positioning fault that occurs in the self-moving device, detect, after a predetermined time, whether the absence of the positioning fault; and the positioning fault handling unit is configured to: in response to the absence of the positioning fault, control the self-moving device to restore normal operation.

In the foregoing self-moving device, the positioning fault handling unit is configured to: in response to the presence of the positioning fault, control the self-moving device to stop.

The foregoing self-moving device further includes a fault tolerance control unit, configured to: in response to the detected positioning fault that occurs in the self-moving device, estimate a distance d between a current position of the self-moving device and a boundary of a working region of the self-moving device; estimate a distance d' between the current position and an actual position of the self-moving device based on quality of a current positioning result; and in response to d'≥d, control the self-moving device to change a movement manner.

In the foregoing self-moving device, the fault tolerance control unit is configured to: control the self-moving device to stop moving or reverse a moving direction or move inside a small range.

In the foregoing self-moving device, the fault tolerance control unit is further configured to: in response to d'<d, control the self-moving device to continue moving.

In the foregoing self-moving device, the positioning fault handling unit is further configured to: in response to the detected positioning fault that occurs in the self-moving device, control the self-moving device to stop moving.

The foregoing self-moving device further includes: a confirmation receiving unit, configured to: in response to the detected positioning fault that occurs in the self-moving device, receive confirmation information of the positioning fault from a user.

An automatic working system is provided, including the foregoing self-moving device.

In the foregoing automatic working system, the self-moving device is an automatic lawn mower.

In the foregoing automatic working system, the automatic working system is an automatic lawn mower.

An electronic device is provided, including: a memory, configured to store a computer executable instruction; and a processor, configured to execute the computer executable instruction stored in the memory, to perform the foregoing positioning fault handling method for a self-moving device.

A computer readable storage medium is provided, storing a computer program instruction, where when being executed by a computing apparatus, the computer program instruction may operate to perform the foregoing positioning fault handling method for a self-moving device.

Compared with the prior art, the beneficial effect of the present invention is as follows: Based on a predetermined positioning fault handling strategy, a self-moving device is located by using precise positioning data at a time point before a positioning fault occurs, so that it can be ensured that an automatic working system accurately locates itself.

An objective of the present invention is to provide a map generation method for an automatic working system, so that during map drawing, a currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

Another objective of the present invention is to provide another map generation method for an automatic working system.

Another objective of the present invention is to provide a map generation apparatus for an automatic working system.

Another objective of the present invention is to provide another map generation apparatus for an automatic working system.

Another objective of the present invention is to provide an automatic working system.

Another objective of the present invention is to provide another automatic working system.

Another objective of the present invention is to provide a computer device.

Another objective of the present invention is to provide a non-transitory computer readable storage medium.

Another objective of the present invention is to provide a computer program product.

To achieve the foregoing objective, according to a first aspect of the present invention, an embodiment provides a map generation method for an automatic working system, an automatic working system including: a self-moving device, autonomously moving inside a working region defined on a map, and a positioning mobile station, the mobile station moving along a boundary of the working region and acquiring positioning information to generate the map, and the method including:
- as the mobile station moves, acquiring position coordinates through which the mobile station moves, and updating a currently drawn map of the working region in real time by using the acquired position coordinates; and
- sending the currently drawn map to a display device to be displayed in real time by the display device.

In the map generation method for an automatic working system in this embodiment of the present invention, as a mobile station moves, position coordinates through which the mobile station moves are acquired, and a currently drawn map of a working region is updated in real time by using the acquired position coordinates; and the currently drawn map is sent to a display device to be displayed in real time by the display device. In this embodiment, during map drawing, the currently drawn map may be displayed in real time by using the display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a second aspect of the present invention, an embodiment provides another map generation method for an automatic working system, applicable to an automatic working system, the automatic working system including: a self-moving device, autonomously moving inside a working region defined on a map, and a positioning mobile station, the mobile station moving along a boundary of the working region and acquiring positioning information to generate the map, and the method including:

receiving first data from the mobile station, where the first data is position coordinates currently acquired or the map of the working region currently drawn by the mobile station; and displaying the received first data in real time.

In the map generation method for an automatic working system in this embodiment of the present invention, first data is received from a mobile station, where the first data is position coordinates currently acquired or a map of a working region currently drawn by the mobile station; and the received first data is displayed in real time. In this embodiment, during map drawing, a currently drawn map may be displayed in real time by using a display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a third aspect of the present invention, an embodiment provides a map generation apparatus for an automatic working system, an automatic working system including: a self-moving device, autonomously moving inside a working region defined on a map, and a positioning mobile station, the mobile station moving along a boundary of the working region and acquiring information about position points on the working region to generate the map, and the apparatus including:

a real-time update module, configured to: as the mobile station moves, acquire position coordinates through which the mobile station moves, and update a currently drawn map of the working region in real time by using the acquired position coordinates; and a sending and display module, configured to send the currently drawn map to a display device to be displayed in real time by the display device.

For the map generation apparatus for an automatic working system in this embodiment of the present invention, as a mobile station moves, position coordinates through which the mobile station moves are acquired, and a currently drawn map of a working region is updated in real time by using the acquired position coordinates; and the currently drawn map is sent to a display device to be displayed in real time by the display device. In this embodiment, during map drawing, the currently drawn map may be displayed in real time by using the display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a fourth aspect of the present invention, an embodiment provides another map generation apparatus for an automatic working system, an automatic working system including: a self-moving device, autonomously moving inside a working region defined on a map, and a positioning mobile station, the mobile station moving along a boundary of the working region and acquiring information about position points on the working region to generate the map, and the apparatus including:

a receiving module, configured to receive first data from the mobile station, where the first data is position coordinates currently acquired or the map of the working region currently drawn by the mobile station; and a real-time display module, configured to display the received first data in real time.

In the map generation apparatus for an automatic working system in this embodiment of the present invention, first data is received from a mobile station, where the first data is position coordinates currently acquired or a map of a working region currently drawn by the mobile station; and the received first data is displayed in real time. In this embodiment, during map drawing, a currently drawn map may be displayed in real time by using a display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a fifth aspect of the present invention, an embodiment provides an automatic working system, including: a self-moving device, a positioning mobile station, and map generation apparatus for an automatic working system in the embodiment of the third aspect of the present invention, where the self-moving device moves and works based on a map of a working region.

For the automatic working system in this embodiment of the present invention, during map drawing, a currently drawn map may be displayed in real time by using a display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a sixth aspect of the present invention, an embodiment provides another automatic working system, including: a self-moving device, a positioning mobile station, and the map generation apparatus for an automatic working system in the embodiment of the fourth aspect of the present invention, where the self-moving device moves and works based on a map of a working region.

For the automatic working system in this embodiment of the present invention, during map drawing, a currently drawn map may be displayed in real time by using a display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To achieve the foregoing objective, according to a seventh aspect of the present invention, an embodiment provides a computer device, including: a processor and a memory, where the processor reads an executable program code stored in the memory to execute a program corresponding to the executable program code, to implement the map generation method for an automatic working system in the embodiment of the first aspect of the present invention or the map generation method for an automatic working system in the embodiment of the second aspect of the present invention.

To achieve the foregoing objective, according to an eighth aspect of the present invention, an embodiment provides a non-transitory computer readable storage medium, storing a computer program, where when being executed by a processor, the program implements the map generation method for an automatic working system in the embodiment of the first aspect of the present invention or the map generation method for an automatic working system in the embodiment of the second aspect of the present invention.

To achieve the foregoing objective, according to a ninth aspect of the present invention, an embodiment provides a computer program product, where when being executed by a processor, an instruction in the computer program product performs the map generation method for an automatic working system in the embodiment of the first aspect of the present invention or the map generation method for an automatic working system in the embodiment of the second aspect of the present invention.

Some additional aspects and advantages of the present invention will be described partially below, and some will be obvious from the following descriptions or understood through the practice of the present invention.

A map generation method for an automatic working system is provided, an automatic working system including: a self-moving device, autonomously moving inside a working region defined on a map, and a positioning mobile station, the mobile station moving along a boundary of the working region and acquiring positioning information to generate the map, and the method including the following steps: as the mobile station moves, acquiring position coordinates through which the mobile station moves, and updating a currently drawn map of the working region in real time by using the acquired position coordinates; and sending the currently drawn map to a display device to be displayed in real time by the display device.

In one embodiment, the method further includes the steps: acquiring a map image of the working region; aligning coordinate systems of the currently drawn map and the map image; and displaying the currently drawn map on the map image, and sending the map and the map image to the display device.

In one embodiment, the method further includes the step: controlling the mobile station to move along an outer boundary of the working region and/or an inner boundary of the working region.

In one embodiment, the updating a currently drawn map in real time by using the acquired position coordinates includes: updating, starting from a starting point of movement of the mobile station, the currently drawn map by using currently acquired position coordinates, where the map includes partial map information of the working region; and after the mobile station finishes moving along the boundary of the working region, updating the currently drawn map by using the acquired position coordinates to generate the map of the working region.

In one embodiment, after the sending the currently drawn map to a display device to be displayed in real time by the display device, the method further includes: receiving an adjustment instruction input by a user via a display screen, and correcting a currently displayed map according to the adjustment instruction.

In one embodiment, the receiving an adjustment instruction input by a user via a display screen, and correcting a currently displayed map according to the adjustment instruction includes: detecting a first operation trajectory of the user on the display screen, and recognizing a to-be-corrected boundary segment from the first operation trajectory; and detecting a second operation trajectory of the user on the display screen, and correcting the boundary segment by using the second operation trajectory.

In one embodiment, after the correcting the boundary segment by using the second operation trajectory, the method further includes: controlling the self-moving device to travel on the corrected boundary segment to detect whether an exception occurs in the corrected boundary segment; and if no exception occurs in the corrected boundary segment, replacing the to-be-corrected boundary segment with the corrected boundary segment; or if an exception occurs in the corrected boundary segment, correcting the to-be-corrected boundary segment.

In one embodiment, the receiving an adjustment instruction input by a user via a display screen, and correcting a currently displayed map according to the adjustment instruction includes: detecting a first operation trajectory of the user on the display screen, and recognizing a to-be-corrected boundary segment from the first operation trajectory; marking a starting point position and an end point position of the to-be-corrected boundary segment; displaying the starting point position and the end point position on the display screen; and when the mobile station moves to the starting point position, starting redrawing the boundary segment by using acquired position coordinates of the mobile station until the mobile station reaches the end point position.

In one embodiment, after the map of the working region is generated, the method further includes: receiving an alarm instruction sent by the self-moving device, where the alarm instruction is sent when an exception occurs as the self-moving device travels according to the map of the working region; and adjusting the map of the working region according to the alarm instruction.

In one embodiment, after the sending the currently drawn map to a display device to be displayed in real time by the display device, the method further includes: detecting a selection operation input by a user via a display interface, and retrieving a to-be-marked sub-region from the selection operation; and receiving a mark parameter of the to-be-marked sub-region input by the user.

In one embodiment, the mark parameter includes danger description information and/or movement manner information of the self-moving device.

In one embodiment, the mark parameter includes a time period and/or a preset condition of permitting/forbidding entry of the self-moving device.

In one embodiment, before the updating a currently drawn map of the working region in real time by using the acquired position coordinates, the method further includes: receiving a drawing instruction from the user.

In one embodiment, the sending the currently drawn map to a display device to be displayed in real time by the display device includes: connecting the mobile station to an intelligent terminal of a user; and displaying the currently drawn map by using the intelligent terminal of the user.

In one embodiment, the controlling the mobile station to move along an outer boundary of the working region and/or an inner boundary of the working region includes: transmitting a detection signal externally by using the mobile station or a carrier of the mobile station, to detect a biometric feature signal of a user, where the user moves along the boundary of the working region, and the biometric feature signal is a signal generated by the user; and follow the biometric feature signal to control the mobile station to move along the boundary of the working region.

In one embodiment, the controlling the mobile station to move along an outer boundary of the working region and/or an inner boundary of the working region includes: carrying, by a user, the mobile station to move along the boundary of the working region.

In one embodiment, the automatic working system includes: a self-moving device, autonomously moving inside a working region defined on a map, and a positioning mobile station, the mobile station moving along a boundary of the working region and acquiring positioning information to generate the map, and the method including the following steps: receiving first data from the mobile station, where the first data is position coordinates currently acquired or the map of the working region currently drawn by the mobile station; and displaying the received first data in real time.

In one embodiment, the method further includes: when the first data is position coordinates currently acquired by the mobile station, updating the currently drawn map of the working region in real time by using the currently acquired position coordinates.

In one embodiment, the method further includes: acquiring an electronic map, and displaying the currently drawn map in real time on the electronic map.

A map generation apparatus for an automatic working system is provided, an automatic working system including: a self-moving device, autonomously moving inside a working region defined on a map, and a positioning mobile station, the mobile station moving along a boundary of the working region and acquiring information about position points on the working region to generate the map, and the apparatus including: a real-time update module, configured to: as the mobile station moves, acquire position coordinates through which the mobile station moves, and update a currently drawn map of the working region in real time by using the acquired position coordinates; and a sending and display module, configured to send the currently drawn map to a display device to be displayed in real time by the display device.

A map generation apparatus for an automatic working system is provided, an automatic working system including: a self-moving device, autonomously moving inside a working region defined on a map, and a positioning mobile station, the mobile station moving along a boundary of the working region and acquiring information about position points on the working region to generate the map, and the apparatus including: a receiving module, configured to receive first data from the mobile station, where the first data is position coordinates currently acquired or the map of the working region currently drawn by the mobile station; and a real-time display module, configured to display the received first data in real time.

An automatic working system is provided, including: a self-moving device, a positioning mobile station, and the foregoing map generation apparatus for an automatic working system, where the self-moving device moves and works based on a map of a working region.

An automatic working system is provided, including: a self-moving device, a positioning mobile station, and the foregoing map generation apparatus for an automatic working system, where the self-moving device moves and works based on a map of a working region.

A computer device is provided, including a processor and a memory, where the processor reads an executable program code stored in the memory to execute a program corresponding to the executable program code, to implement any map generation method for an automatic working system in the foregoing or any map generation method for an automatic working system in the foregoing.

A computer program product is provided, where when being executed by a processor, an instruction in the computer program product implements any map generation method for an automatic working system in the foregoing or any map generation method for an automatic working system in the foregoing.

A non-transitory computer readable storage medium, storing a computer program, where when being executed by a processor, the program implements any map generation method for an automatic working system in the foregoing or any map generation method for an automatic working system in the foregoing.

The present invention is to resolve one of the technical problems in related technologies to at least a degree.

In view of this, an objective of the present invention is to provide a state detection method for an automatic working system. In the method, during working of a mobile station, information such as quality of a signal is indicated to a user to enable the user to intuitively learn about an operating state of an automatic working system in real time, thereby improving the reliability of using the automatic working system and improving user experience.

Another objective of the present invention is to provide a mobile station.

Another objective of the present invention is to provide a base station.

Another objective of the present invention is to provide a computer readable storage medium.

To achieve the foregoing objective, according to a first aspect of the present invention, an embodiment provides a state detection method for an automatic working system, an automatic working system including: a mobile station, configured to determine position information of one or more positions inside or outside a working region of a self-moving device, the mobile station including a first antenna configured to receive a satellite signal and a first indication module, and the state detection method including:
determining, by the mobile station, quality of a signal received by the first antenna; and
determining, by the mobile station, an indication manner of the first indication module according to the quality of the signal received by the first antenna.

In the state detection method for an automatic working system provided in this embodiment of the present invention, a mobile station may determine in real time quality of a signal received by a first antenna, and determine an indication manner of a first indication module according to the quality of the signal. Accordingly, during working of the mobile station, information such as the quality of the signal is indicated to a user to enable the user to intuitively learn about an operating state of an automatic working system in real time, thereby improving the reliability of using the automatic working system and improving user experience.

In addition, the state detection method for an automatic working system provided in the foregoing embodiment of the present invention may further have the following additional technical features:

In an embodiment of the present invention, the determining, by the mobile station, quality of a signal received by the first antenna includes:
determining, by the mobile station according to a parameter of a satellite signal received by the first antenna, the quality of the signal received by the first antenna, where
the parameter of the satellite signal includes a quantity of satellite signals and a signal-to-noise ratio of each satellite signal.

In another embodiment of the present invention, the mobile station further includes an attitude sensor disposed on the first antenna; and
the state detection method further includes:
when the mobile station determines, according to an output of the attitude sensor, that a current attitude of the first antenna is abnormal, indicating, by using the first indication module, that the attitude of the first antenna is abnormal.

In another embodiment of the present invention, the mobile station further includes a first contact sensor disposed on a receiving surface of the first antenna; and
the state detection method further includes:
when the mobile station determines, according to an output value of the first contact sensor, that the first antenna is blocked, indicating, by using the first indication module, that the first antenna is blocked.

In another embodiment of the present invention, the mobile station further includes a handle portion configured to assist a user in keeping the first antenna in a correct attitude; and
the state detection method further includes:
indicating, by the mobile station by using the first indication module, whether an attitude of holding the handle portion by the user is correct.

In another embodiment of the present invention, the mobile station further includes a second contact sensor disposed at the handle portion; and
before the indicating whether an attitude of holding the handle portion by the user is correct, the method further includes:

determining, by the mobile station according to an output value of the second contact sensor, whether the attitude of holding the handle portion by the user is correct.

In another embodiment of the present invention, the mobile station further includes an energy source module; and
the state detection method further includes:
indicating, by the mobile station by using the first indication module, remaining power of the energy source module.

In another embodiment of the present invention, the determining an indication manner of the first indication module includes:
determining a display manner of the first indication module;
determining a vibration manner of the first indication module;
determining voice content of the first indication module; or
determining content sent to a terminal by using the first indication module.

In another embodiment of the present invention, the automatic working system further includes: a charging station, and a base station configured to send differential information to the mobile station to enable the mobile station to perform positioning according to the differential information; and
the state detection method further includes:
when the mobile station determines that the quality of the signal on the first antenna satisfies a preset condition at any position, determining that the any position is suitable for fixing the charging station or the base station.

In another embodiment of the present invention, the mobile station is configured to create a map according to the satellite signal received by the first antenna; and
after the determining, by the mobile station, quality of a signal received by the first antenna, the method further includes:
marking, by the mobile station according to the quality of the signal received by the first antenna at any position, map information of the any position determined by the mobile station.

In another embodiment of the present invention, the mobile station further includes a communications module; and
the state detection method further includes:
according to a state of a signal acquired by the communications module at a current position and/or time, determining, by the mobile station, a working state of the communications module at the current position, or, determining a working state of a peer end in communication connection with the mobile station by using the communications module.

In another embodiment of the present invention, the mobile station is connected to a terminal by using the communications module; and
the state detection method further includes:
sending the working state of the mobile station at the current position to the terminal.

In another embodiment of the present invention, the automatic working system further includes a base station configured to send differential information to the mobile station to enable the mobile station to perform positioning according to the differential information; and
the state detection method further includes:
receiving, by the mobile station, a satellite signal by using the first antenna;

acquiring, by the mobile station, a differential signal sent by the base station; and determining, by the mobile station according to the state of the mobile station, the differential signal, and the satellite signal, that the base station is moved, indicating, by using the first indication module, that the base station is moved.

In another embodiment of the present invention, the mobile station further includes a first displacement sensor; and the determining that the base station is moved includes:

calculating, by the mobile station, a calculated position of the mobile station at a current moment according to the differential signal and the satellite signal;

determining, by the mobile station according to an output value of the first displacement sensor, whether the mobile station is in a stationary state; and if the mobile station is in a stationary state, determining whether the calculated position at the current moment is consistent with a calculated position at a previous moment; or if the mobile station is not in a stationary state, determining that the base station is moved.

In another embodiment of the present invention, the automatic working system further includes a base station configured to send differential information to the mobile station to enable the mobile station to perform positioning according to the differential information; and the base station includes a second antenna configured to receive a satellite signal and a second indication module; and the state detection method further includes:

indicating, by the base station by using the second indication module, quality of a signal received by the second antenna.

In another embodiment of the present invention, the state detection method further includes:

When the base station determines that the base station is moved, indicate, by using the second indication module, that the base station is moved.

In another embodiment of the present invention, the determining that the base station is moved includes:

when it is determined that a difference between a satellite signal acquired by the second antenna and a locally stored position signal is greater than a threshold, determining that the base station is moved, or determining, by the base station according to an output value of a second displacement sensor disposed in the base station, that the base station is moved.

To achieve the foregoing objective, according to a second aspect of the present invention, an embodiment provides a mobile station, configured to move and work inside a working region defined on a map, and including: a first antenna configured to receive a satellite signal, a first indication module, a first memory, a first processor, and a computer program that is stored in the first memory and can be executed on the first processor, where the first antenna is configured to acquire the satellite signal; and the first processor is configured to invoke and execute the computer program stored in the first memory, to control the first indication module to perform indication, thereby implementing the state detection method for an automatic working system in the embodiment of the first aspect.

For the mobile station provided in this embodiment, the mobile station may determine in real time quality of a signal received by a first antenna, and determine an indication manner of a first indication module according to the quality of the signal. Accordingly, during working of the mobile station, information such as the quality of the signal is indicated to a user to enable the user to intuitively learn about an operating state of an automatic working system in real time, thereby improving the reliability of using the automatic working system and improving user experience.

In addition, the mobile station provided in the foregoing embodiment of the present invention may further have the following additional technical features:

In an embodiment of the present invention, the mobile station further includes at least one of the following assemblies: a first contact sensor disposed on a receiving surface of the first antenna, an attitude sensor disposed on the first antenna, an energy source module, a communications module, a handle portion, and a second contact sensor disposed at the handle portion.

In another embodiment of the present invention, the first indication module includes at least one of the following assemblies: an optical assembly, a vibration assembly, an acoustic assembly, and a communications assembly.

To achieve the foregoing objective, according to a third aspect of the present invention, an embodiment provides a base station, configured to send differential information to a mobile station in the embodiment of the second aspect to enable the mobile station to perform positioning according to the differential information, the base station including a second antenna configured to receive a satellite signal, a second indication module, a second memory, a second processor, and a computer program that is stored in the second memory and can be executed on the second processor;

the second antenna is configured to acquire the satellite signal; and the second processor is configured to invoke and execute the computer program stored in the second memory, to control the second indication module to perform indication, thereby implementing any state detection method for an automatic working system in the foregoing.

For the base station provided in this embodiment, the base station may determine in real time quality of a signal received by a second antenna, and determine an indication manner of the second indication module according to the quality of the signal. Accordingly, during working of a mobile station, information such as the quality of the signal is indicated to a user to enable the user to intuitively learn about an operating state of an automatic working system in real time, thereby improving the reliability of using the automatic working system and improving user experience.

To achieve the foregoing objective, according to a fourth aspect of the present invention, an embodiment provides a computer readable storage medium, storing a computer program, where when being executed by a processor, the program implements the state detection method for an automatic working system in the embodiment of the first aspect.

Some additional aspects and advantages of the present invention will be described partially below, and some will be obvious from the following descriptions or understood through the practice of the present invention.

The present invention is to resolve one of the technical problems in related technologies to at least a degree.

In view of this, the present invention provides a base station based on a differential positioning technology, so that the base station is self-powered by using its own wind power generation part and/or solar power generation part. Therefore, an installing position of the base station is not restricted, quality of a positioning signal received by the base station is further ensured, and the base station and a mobile station provide more reliable navigation data to an automatic working system. In addition, a power unit receives or sends a signal to locate the mobile station, so that a self-moving device can move inside a preset working region according to positioning. In this way, the trouble of arranging a boundary line around the preset working region of the self-moving device in the prior art can be avoided for the automatic working system, thereby effectively improving user experience. In addition, it is not necessary to use an electric cable from a charging station to power the base station, the trouble of arranging a line is avoided for the automatic working system, thereby further improving use experience of a user. Because an existing base station is integrated with the charging station, the installing position of the base station is restricted. As a result, a positioning signal that is sent by a satellite and received by the base station has relatively low quality, and further, navigation data provided by the base station and the mobile station to the automatic working system has relatively low reliability. Such a technical problem is resolved accordingly.

The present invention provides an automatic working system.

To achieve the foregoing objective, according to a first aspect of the present invention, an embodiment provides a base station based on a differential positioning technology, the base station being configured to locate a mobile station to enable a self-moving device installed with the mobile station to move inside a preset working region, and the base station including: a power unit and a power supply unit electrically connected to the power unit, where
the power unit is configured to receive or send a signal to locate the mobile station;
the power supply unit is configured to power the power unit;
the power supply unit includes a wind power generation part and/or a solar power generation part;
the wind power generation part is electrically connected to the power unit, and is configured to: convert wind energy into electrical energy, and output the electrical energy to the power unit; and
the solar power generation part is electrically connected to the power unit, and is configured to: convert solar energy into electrical energy, and output the electrical energy to the power unit.

In a first possible implementation of the embodiment of the first aspect of the present invention, the wind power generation part of the power supply unit and the solar power generation part are both fixedly connected to a support assembly of the base station;
a solar cell panel in the solar power generation part is fixedly connected to a first position of the support assembly; and
a fan in the wind power generation part is fixedly connected to a second position of the support assembly, and the second position is higher than the first position.

In a second possible implementation of the embodiment of the first aspect of the present invention, a preset angle exists between a surface of the solar cell panel and a solar radiation direction, and a shadow region of the fan and the surface of the solar cell panel do not have an overlapping part.

In a third possible implementation of the embodiment of the first aspect of the present invention, the power supply unit further includes a storage battery, where
the storage battery is connected to the wind power generation part and/or the solar power generation part and is electrically connected to the power unit, and is configured to: store electrical energy, and output the stored electrical energy to the power unit.

In a fourth possible implementation of the embodiment of the first aspect of the present invention, the power supply unit further includes an electrical energy conversion circuit, where
the electrical energy conversion circuit is electrically connected to the wind power generation part and the solar power generation part, and is configured to adjust an electrical parameter of the electrical energy output by the wind power generation part and the solar power generation part.

In a fifth possible implementation of the embodiment of the first aspect of the present invention, the electrical energy conversion circuit includes an input terminal and an output terminal;
the input terminal of the electrical energy conversion circuit is connected in parallel to the solar power generation part and the wind power generation part that are connected in series; and
the output terminal of the electrical energy conversion circuit is connected to in parallel to the storage battery.

In a sixth possible implementation of the embodiment of the first aspect of the present invention, the power unit includes:
a satellite signal receiver, a signal processor, and a wireless data transmission module that are electrically connected.

For the base station based on a differential positioning technology in this embodiment of the present invention, a power unit receives or sends a signal to locate a mobile station, so that a self-moving device can move inside a preset working region according to positioning. In this way, the trouble of arranging a boundary line around the preset working region of the self-moving device in the prior art can be avoided for an automatic working system, thereby effectively improving user experience. In addition, the base station and a charging station may be separately disposed, and the base station is self-powered by using its own wind power generation part and/or solar power generation part. Therefore, an installing position of the base station is not restricted, quality of a positioning signal received by the base station is further ensured, and the base station and the mobile station provide more reliable navigation data to the automatic working system. In addition, it is not necessary to use an electric cable from the charging station to power the base station, the trouble of arranging a line is avoided for the automatic working system, thereby further improving use experience of a user.

To achieve the foregoing objective, according to a second aspect of the present invention, an embodiment provides an automatic working system, including: a self-moving device, the base station based on a differential positioning technology in the embodiment of the first aspect of the present invention, and a mobile station installed on the self-moving device, where
the self-moving device installed with the mobile station is configured to move inside a preset working region according to the positioning of the mobile station by the base station.

In a first possible implementation of the embodiment of the second aspect of the present invention, the automatic working system further includes a charging station configured to charge the self-moving device, and the base station is electrically isolated from the charging station.

In a second possible implementation of the embodiment of the second aspect of the present invention, the automatic working system further includes a charging station configured to charge the self-moving device, and the base station is electrically connected to the charging station; and
  a storage battery of a power supply unit in the base station is connected in parallel to the charging station, and is configured to power the charging station.

In a third possible implementation of the embodiment of the second aspect of the present invention, the self-moving device includes an automatic lawn mower.

For the automatic working system in this embodiment of the present invention, a self-moving device moves inside a preset working region according to the positioning of a mobile station by a base station. In this way, the trouble of arranging a line in the prior art can be avoided for the automatic working system, thereby effectively improving user experience.

Some additional aspects and advantages of the present invention will be described partially below, and some will be obvious from the following descriptions or understood through the practice of the present invention.

The present invention is to resolve one of the technical problems in related technologies to at least a degree.

In view of this, an objective of the present invention is to provide a map generation method for an automatic working system. A mobile station acquires information about target position points specified by a user, and then connects the target position points to obtain at least one boundary to generate a map. Because it is not necessary to record coordinates of position points on an entire boundary of a working region, map generation efficiency can be improved. In addition, the user specifies the target position points, so that the method can be more flexible and adaptable. Moreover, information about only several target position points on the boundary of the working region is acquired, and a region in which a positioning signal may be relatively poor in the working region can be avoided, thereby improving map generation accuracy. In an existing problem, in a region in which a positioning signal may be relatively poor in the working region, recorded coordinates deviate considerably from actual coordinates, resulting in relatively low map generation accuracy. This problem is resolved.

Another objective of the present invention is to provide another map generation method for an automatic working system.

Another objective of the present invention is to provide a map generation apparatus for an automatic working system.

Another objective of the present invention is to provide another map generation apparatus for an automatic working system.

Another objective of the present invention is to provide an automatic working system.

Another objective of the present invention is to provide a computer device.

Another objective of the present invention is to provide a non-transitory computer readable storage medium.

Another objective of the present invention is to provide a computer program product.

To achieve the foregoing objective, according to a first aspect of the present invention, an embodiment provides a map generation method for an automatic working system, an automatic working system including: a self-moving device, autonomously moving inside a working region defined on a map, and a positioning mobile station, the mobile station moving along a boundary of the working region and acquiring information about position points on the working region to generate the map, and the method including:
  receiving confirmation information from a user to confirm target position points, and acquiring information about the target position points, where the target position points include position points on the boundary of the working region, and the information about the target position points includes coordinate information of the target position points; and
  connecting at least the target position points to obtain at least one boundary to generate the map.

In the map generation method for an automatic working system in this embodiment of the present invention, confirmation information is received from a user to confirm target position points, and information about the target position points is acquired, where the target position points include position points on a boundary of a working region, and the information about the target position points includes coordinate information of the target position points; and the target position points are then connected to obtain at least one boundary to generate a map. In this embodiment, a mobile station only acquires information about target position points specified by the user, and then connects the target position points to obtain the at least one boundary to generate the map. Because it is not necessary to record the coordinates of position points on an entire boundary of the working region, map generation efficiency can be improved. In addition, the user specifies the target position points, so that the method can be more flexible and adaptable. Moreover, information about only several target position points on the boundary of the working region is acquired, and it can be avoided that the mobile station passes through a region in which a positioning signal may be relatively poor in the working region, thereby improving map generation accuracy.

To achieve the foregoing objective, according to a second aspect of the present invention, an embodiment provides another map generation method for an automatic working system, an automatic working system including: a self-moving device, autonomously moving inside a working region defined on a map, and a positioning mobile station, the mobile station moving along a boundary of the working region and acquiring information about position points on the working region to generate the map, and the method including:
  acquiring information about several target position points, where the several target position points include discrete position points on the boundary of the working region, and the information about the target position points includes coordinate information of the target position points; and
  connecting the target position points to obtain at least one boundary to generate the map of the working region.

In the map generation method for an automatic working system in this embodiment of the present invention, information about several target position points is acquired, where the several target position points include discrete position points on a boundary of a working region, and the information about the target position points includes coordinate information of the target position points; and the target position points are then connected to obtain at least one boundary to generate a map of the working region. In this embodiment, information about several target position points on the boundary of the working region is acquired, and the target position points are then connected to obtain the at least one boundary. Because it is not necessary to record the coordinates of position points on an entire boundary of the working region, map generation efficiency can be improved. In addition, information about only several target position points on the boundary of the working region is acquired, and it can be avoided that a mobile station passes through a region in which a positioning signal may be relatively poor in the working region, thereby improving map generation accuracy.

To achieve the foregoing objective, according to a third aspect of the present invention, an embodiment provides a map generation apparatus for an automatic working system, an automatic working system including: a self-moving device, autonomously moving inside a working region defined on a map, and a positioning mobile station, the mobile station moving along a boundary of the working region and acquiring information about position points on the working region to generate the map, and the apparatus including:

an information receiving module, configured to: receive confirmation information from a user to confirm target position points, and acquire information about the target position points, where the target position points include position points on the boundary of the working region, and the information about the target position points includes coordinate information of the target position points; and a connection and generation module, configured to connect at least the target position points to obtain at least one boundary to generate the map.

For the map generation apparatus for an automatic working system in this embodiment of the present invention, confirmation information is received from a user to confirm target position points, and information about the target position points is acquired, where the target position points include position points on a boundary of a working region, and the information about the target position points includes coordinate information of the target position points; and the target position points are then connected to obtain at least one boundary to generate a map. In this embodiment, a mobile station only acquires information about target position points specified by the user, and then connects the target position points to obtain the at least one boundary to generate the map. Because it is not necessary to record the coordinates of position points on an entire boundary of the working region, map generation efficiency can be improved. In addition, the user specifies the target position points, so that the method can be more flexible and adaptable. Moreover, information about only several target position points on the boundary of the working region is acquired, and it can be avoided that the mobile station passes through a region in which a positioning signal may be relatively poor in the working region, thereby improving map generation accuracy.

To achieve the foregoing objective, according to a fourth aspect of the present invention, an embodiment provides another map generation apparatus for an automatic working system, an automatic working system including: a self-moving device, autonomously moving inside a working region defined on a map, and a positioning mobile station, the mobile station moving along a boundary of the working region and acquiring information about position points on the working region to generate the map, and the apparatus including:

an information acquisition module, configured to acquire information about several target position points, where the several target position points include discrete position points on the boundary of the working region, and the information about the target position points includes coordinate information of the target position points; and a generation module, configured to connect the target position points to obtain at least one boundary to generate the map of the working region.

For the map generation apparatus for an automatic working system in this embodiment of the present invention, information about several target position points is acquired, where the several target position points include discrete position points on a boundary of a working region, and the information about the target position points includes coordinate information of the target position points; and the target position points are then connected to obtain at least one boundary to generate a map of the working region. In this embodiment, information about several target position points on the boundary of the working region is acquired, and the target position points are then connected to obtain the at least one boundary. Because it is not necessary to record the coordinates of position points on an entire boundary of the working region, map generation efficiency can be improved. In addition, information about only several target position points on the boundary of the working region is acquired, and it can be avoided that a mobile station passes through a region in which a positioning signal may be relatively poor in the working region, thereby improving map generation accuracy.

To achieve the foregoing objective, according to a fifth aspect of the present invention, an embodiment provides an automatic working system, including a self-moving device, and the map generation apparatus for an automatic working system in the embodiment of the third aspect of the present invention or the map generation apparatus for an automatic working system in the embodiment of the fourth aspect of the present invention, where the self-moving device moves and works based on a map of a working region.

To achieve the foregoing objective, according to a sixth aspect of the present invention, an embodiment provides a computer device, including: a processor and a memory, where the processor reads an executable program code stored in the memory to execute a program corresponding to the executable program code, to implement the map generation method for an automatic working system in the embodiment of the first aspect of the present invention and the map generation method for an automatic working system in the embodiment of the second aspect of the present invention.

To achieve the foregoing objective, according to a fifth aspect of the present invention, an embodiment provides a non-transitory computer readable storage medium, storing a computer program, where when being executed by a processor, the program implements the map generation method for an automatic working system in the embodiment of the first aspect of the present invention and the map generation method for an automatic working system in the embodiment of the second aspect of the present invention.

To achieve the foregoing objective, according to a sixth aspect of the present invention, an embodiment provides a computer program product, where when being executed by a processor, an instruction in the computer program product performs the map generation method for an automatic working system in the embodiment of the first aspect of the present invention and the map generation method for an automatic working system in the embodiment of the second aspect of the present invention.

Some additional aspects and advantages of the present invention will be described partially below, and some will be obvious from the following descriptions or understood through the practice of the present invention.

A map generation method for an automatic working system is provided, an automatic working system including: a self-moving device, autonomously moving inside a working region defined on a map, and a positioning mobile station, the mobile station moving along a boundary of the working region and acquiring information about position points on the working region to generate the map, and the method including steps: receiving confirmation information from a user to confirm target position points, and acquiring information about the target position points, where the target position points include position points on the boundary of the working region, and the information about the target position points includes coordinate information of the target position points; and connecting the target position points to obtain at least one boundary to generate the map.

A map generation method for an automatic working system is provided, an automatic working system including: a self-moving device, autonomously moving inside a working region defined on a map, and a positioning mobile station, the mobile station moving along a boundary of the working region and acquiring information about position points on the working region to generate the map, and the method includes steps: acquiring information about several target position points, where the several target position points include discrete position points on the boundary of the working region, and the information about the target position points includes coordinate information of the target position points; and connecting the target position points to obtain at least one boundary to generate the map of the working region.

In one embodiment, the target position points include position points on an outer boundary of the working region and/or position points on an inner boundary of the working region.

In one embodiment, the connecting the target position points to obtain at least one boundary to generate the map includes: connecting several target position points on the outer boundary to obtain a map of the outer boundary of the working region; connecting several target position points on the inner boundary to obtain a map of the inner boundary of the working region; and combining the map of the outer boundary and the map of the inner boundary to generate the map.

In one embodiment, the combining the map of the outer boundary and the map of the inner boundary to generate the map includes: determining a first position of the map of the outer boundary on the map of the working region according to the coordinate information of the target position points on the outer boundary; determining a second position of the map of the inner boundary on the map of the working region according to the coordinate information of the target position points on the inner boundary; and positioning the map of the outer boundary at the first position and positioning the map of the inner boundary at the second position to generate the map of the working region.

In one embodiment, the acquiring information about target position points includes: recording acquisition time of the target position points; and acquiring attribute information of the target position points; and the connecting the target position points to obtain at least one boundary includes: acquiring target position points having the same attribute information to form a position point set; and connecting the target position points in the position point set according to the acquisition time of each target position point in the position point set to obtain a boundary corresponding to the position point set.

In one embodiment, the target position points are sequentially connected according to the acquisition time of each target position point in the position point set and two sequential ends of a set of the target position points are connected to obtain a closed boundary.

In one embodiment, the map generation method further includes: acquiring information about continuous position points on the boundary of the working region, and connecting at least boundary segments that are obtained by acquiring the information about the continuous position points to the target position points to obtain the at least one boundary.

In one embodiment, the map generation method further includes: automatically acquiring information about position points on the boundary of the working region, and connecting at least boundary segments that are obtained by automatically acquiring the information about the position points to the target position points to obtain the at least one boundary.

In one embodiment, the quantity of the target position points may be set.

In one embodiment, the target position points include turning points on the boundary of the working region.

In one embodiment, before the connecting the target position points to obtain at least one boundary, the map generation method further includes: receiving a boundary drawing instruction from the user.

A map generation apparatus for an automatic working system is provided, an automatic working system including: a self-moving device, autonomously moving inside a working region defined on a map, and a positioning mobile station, the mobile station moving along a boundary of the working region and acquiring information about position points on the working region to generate the map, and the apparatus including: an information receiving module, configured to: receive confirmation information from a user to confirm target position points, and acquire information about the target position points, where the target position points include position points on the boundary of the working region, and the information about the target position points includes coordinate information of the target position points; and a connection and generation module, configured to connect at least the target position points to obtain at least one boundary to generate the map.

A map generation apparatus for an automatic working system, an automatic working system including: a self-moving device, autonomously moving inside a working region defined on a map, and a positioning mobile station, the mobile station moving along a boundary of the working region and acquiring information about position points on the working region to generate the map, and the apparatus including: an information acquisition module, configured to acquire information about several target position points, where the several target position points include discrete position points on the boundary of the working region, and the information about the target position points includes coordinate information of the target position points; and a generation module, configured to: connect the target position points to obtain at least one boundary to generate a map of the working region.

An automatic working system is provided, including: a self-moving device, and the foregoing map generation apparatus for an automatic working system or the foregoing map generation apparatus for an automatic working system, where the self-moving device moves and works based on a map of a working region.

A computer device, including a processor and a memory, where the processor reads an executable program code stored in the memory to execute a program corresponding to the executable program code, to implement any map generation method for an automatic working system in the foregoing.

A computer program product is provided, where when being executed by a processor, an instruction in the computer program product implements any map generation method for an automatic working system in the foregoing.

A non-transitory computer readable storage medium, storing a computer program, where when being executed by a processor, the program implements any map generation method for an automatic working system in the foregoing.

BRIEF DESCRIPTION OF THE DRAWINGS

The foregoing objectives, technical solutions, and beneficial effects of the present invention may be implemented by using the accompanying drawings below:

FIG. 46 is a schematic diagram of a working scenario of a self-moving device according to an embodiment of the present invention;

FIG. 47 is a schematic flowchart of a first map generation method for an automatic working system according to an embodiment of the present invention;

FIG. 48a is a schematic diagram of the shape of a working region according to an embodiment of the present invention;

FIG. 48b is a schematic diagram of the shape of another working region according to an embodiment of the present invention;

FIG. 49 is a schematic flowchart of a second map generation method for an automatic working system according to an embodiment of the present invention;

FIG. 53 is a schematic diagram of the shape of still another working region according to an embodiment of the present invention;

FIG. 54 is a schematic flowchart of a fifth map generation method for an automatic working system according to an embodiment of the present invention;

FIG. 55 is a schematic structural diagram of a map generation apparatus for an automatic working system according to an embodiment of the present invention;

DETAILED DESCRIPTION

Exemplary embodiments according to the present application are described below in detail with reference to the accompanying drawings. Apparently, the described embodiments are merely some embodiments of the present application rather than all the embodiments of the present application. It should be understood that the present application is not limited to the exemplary embodiments described herein.

Brief Description of an Automatic Working System

Figure 1:
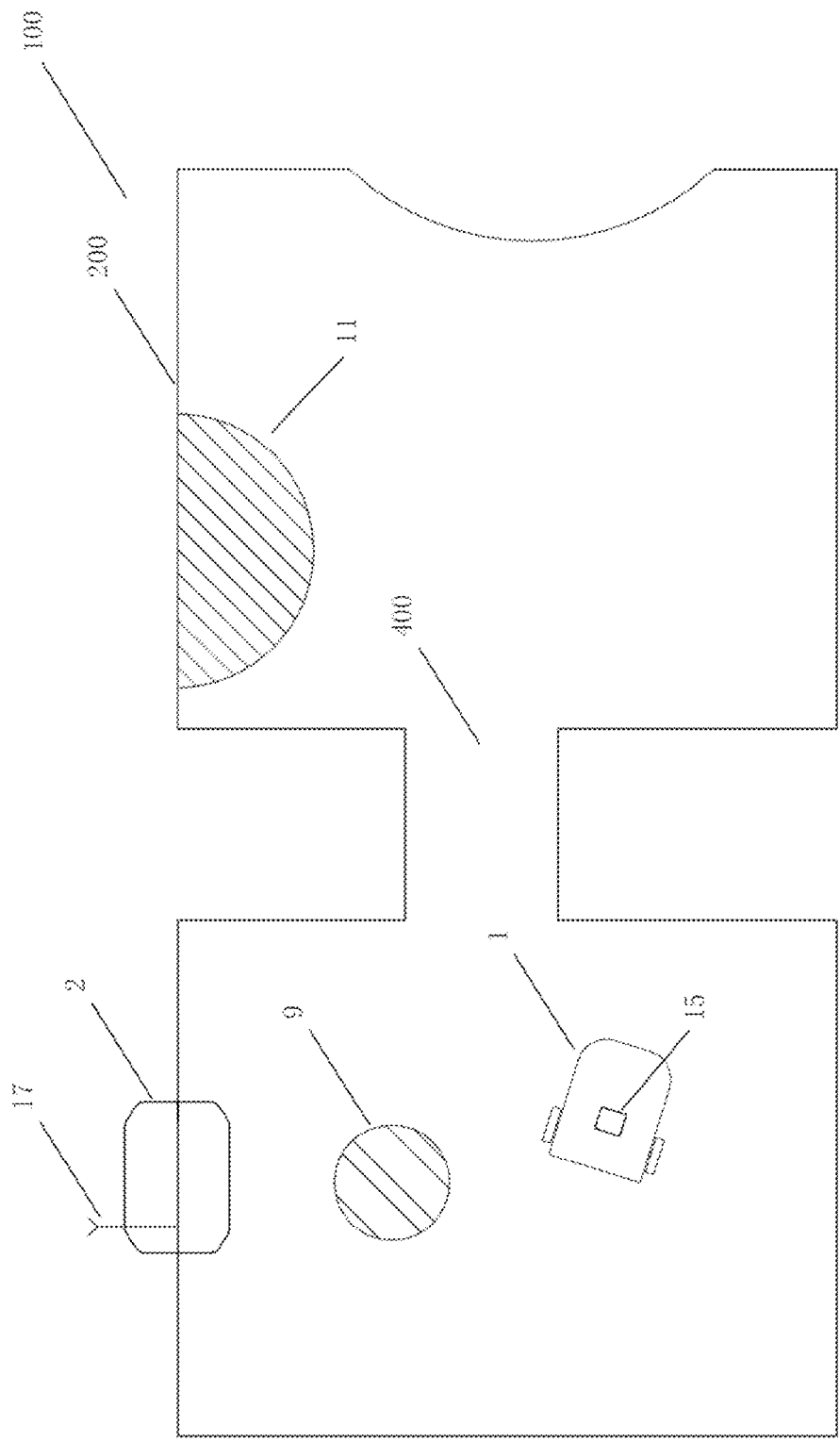
FIG. 1 is a schematic diagram of an automatic working system according to a first embodiment of the present invention.

FIG. 1 is a schematic diagram of an automatic working system 100 according to a first embodiment of the present invention. The automatic working system includes a self-moving device. In this embodiment, the self-moving device is an automatic lawn mower 1. In other embodiments, the self-moving device may alternatively be an unattended device such as an automatic cleaning device, an automatic irrigation device, and an automatic snowplow. The automatic working system 100 further includes a charging station 2 configured to charge the automatic lawn mower 1. In this embodiment, the automatic working system 100 includes a navigation module configured to output a current position of the automatic lawn mower. Specifically, the navigation module includes a base station 17 and a mobile station 15.

As shown in FIG. 1, the automatic working system is configured to work inside a predetermined working region. In this embodiment, the working region includes at least two separate sub-working regions. The sub-working regions are connected through a passage 400. A boundary 200 is formed between a working region and a non-working region. Obstacles 9, 11 exist in the working region. The obstacle is a tree, a pit or the like.

Figure 2:
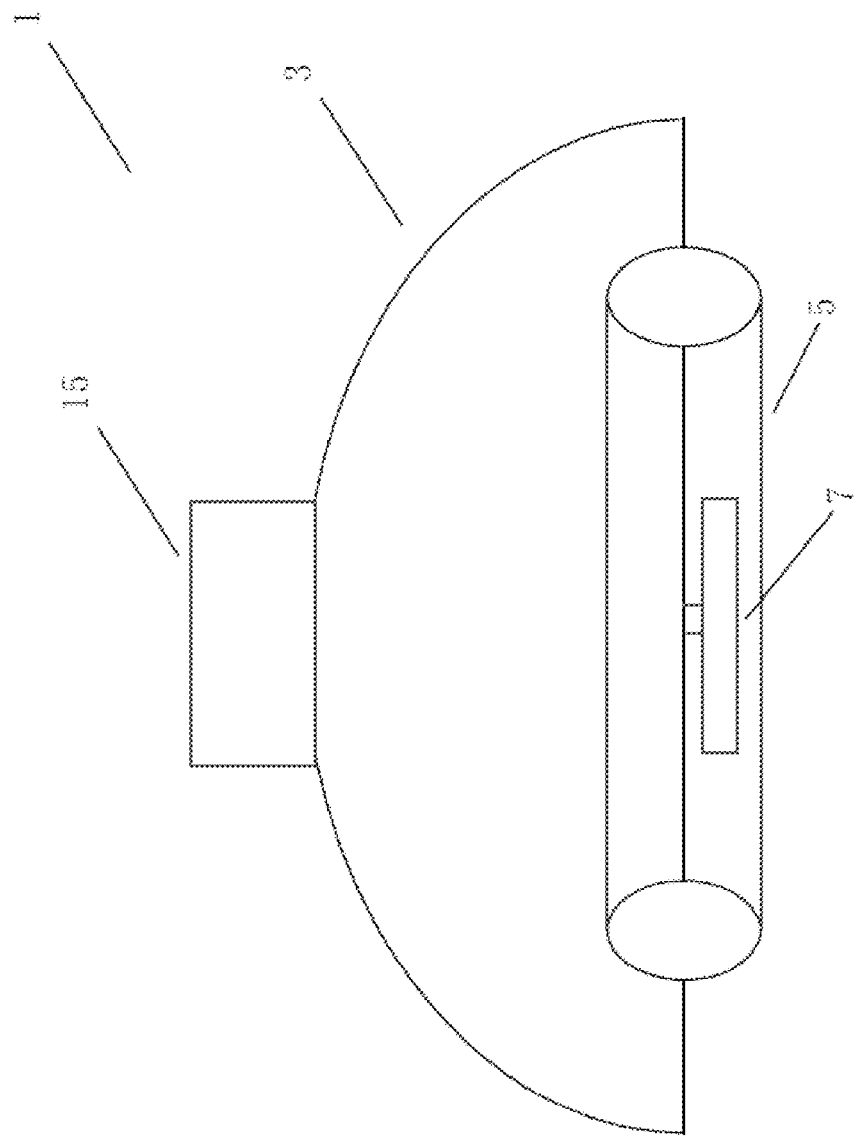
FIG. 2 is a schematic structural diagram of an automatic lawn mower according to the first embodiment of the present invention.

The structure of the automatic lawn mower 1 in this embodiment is shown in FIG. 2. The automatic lawn mower 1 includes a housing 3, a movement module, a task execution module, an energy source module, a control module, and the like. The movement module includes a continuous track 5 driven by a drive motor to enable the automatic lawn mower 1 to move. The task execution module includes a cutting assembly 7 performing grass cutting work. The energy source module includes a battery pack (not shown) supplying electrical energy for the automatic lawn mower 1 to move and work. The control module is electrically connected to the movement module, the task execution module, and the energy source module, controls the movement module to enable the automatic lawn mower 1 to move, and controls the task execution module to perform a task.

Figure 3A:
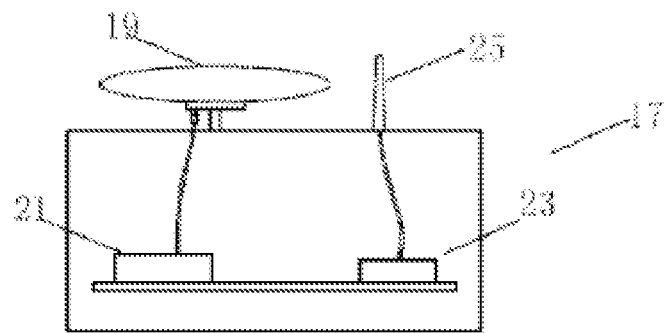
FIG. 3(a) and FIG. 3(b) are schematic composition diagrams of a navigation module according to the first embodiment of the present invention.
Figure 3B:
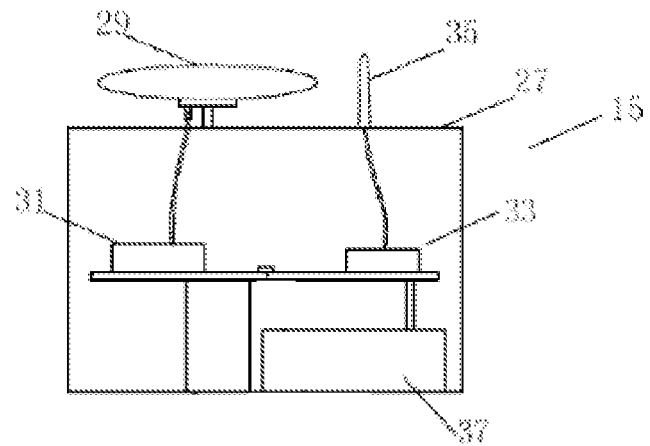

The composition of the navigation module in this embodiment is shown in FIG. 3(a) and FIG. 3(b). The navigation module includes the base station 17 and the mobile station 15. The base station 17 and the mobile station 15 both receive a satellite signal, and the base station 17 sends a positioning correction signal to the mobile station 15, to implement differential satellite positioning. In this embodiment, the base station 17 and the mobile station 15 receive a global positioning system (GPS) positioning signal to implement differential GPS positioning. Certainly, in other embodiments, the base station 17 and the mobile station 15 may alternatively receive a Galileo satellite navigation system positioning signal, a Beidou satellite navigation system positioning signal, a global navigation satellite system (GLONASS) positioning signal or the like.

As shown in FIG. 3(a), in this embodiment, the base station 17 includes: a GPS antenna 19, configured to receive a GPS positioning signal; a GPS card 21, configured to: process the received GPS positioning signal, and generate a positioning correction signal; and a communications module 23, configured to send the positioning correction signal to the mobile station 15. In this embodiment, the communications module 23 includes a radio station and a radio station antenna 25. The base station further includes an indicator (not shown). The indicator can output an indication showing whether a satellite signal at a current position is desirable. In this embodiment, the base station 17 is disposed at the charging station 2 and is integrated with the charging station 2. In other embodiments, the base station 17 may alternatively be disposed separately from the charging station 2, for example, may be disposed at a position such as a roof where a satellite signal can be better received.

In this embodiment, the mobile station 15 includes: a housing 27; a GPS antenna 29, configured to receive a GPS positioning signal; a GPS card 31, configured to process the received GPS positioning signal; and a communications module 33, configured to receive a positioning correction signal sent by the base station 17. The communications module 33 includes a radio station and a radio station antenna 35. In this embodiment, the mobile station 15 integrates an inertial navigation system (not shown). The inertial navigation system outputs inertial navigation data. When the mobile station 15 is working, only the GPS positioning signal may be used for navigation, or a positioning signal obtained by combining a GPS positioning signal and inertial navigation data may be used for navigation, or only inertial navigation data may be used for navigation if a GPS signal is weak. The mobile station 15 further includes an indicator (not shown) configured to output an indication showing whether a differential GPS signal at a current position is desirable. In this embodiment, the mobile station 15 is detachably connected to the housing 3 of the automatic lawn mower 1. The mobile station 15 includes a first interface (not shown) for connecting to the housing of the automatic lawn mower 1. When the automatic lawn mower 1 is working, the mobile station 15 is installed at the housing 3 of the automatic lawn mower 1. When being connected to the housing 3 of the automatic lawn mower 1, the mobile station 15 may be electrically connected to the control module of the automatic lawn mower 1, and the mobile station 15 outputs the coordinates of a current position of the automatic lawn mower 1. The control module controls, according to the current position of the automatic lawn mower 1, the automatic lawn mower 1 to move and work. In this embodiment, the mobile station 15 includes an independent power supply module 37. The mobile station 15 may work independently when being separated from the housing 3 of the automatic lawn mower 1.

In this embodiment, before the automatic lawn mower starts to work, a map of the working region needs to be created. Specifically, in this embodiment, the navigation module of the automatic working system is used to create the map of the working region. The creating the map of the working region includes a map recording step.

The map recording step is started after a user finishes installing the base station. In the first embodiment of the present invention, to record a map, the mobile station is separated from the housing of the automatic lawn mower, the mobile station works independently, and the user holds the mobile station and walks to record the map. The recording a map includes the following steps. The user starts to walk along a boundary of the working region from a starting point to record position coordinates of the boundary. In this embodiment, the starting point is a position of the charging station. The user walks along an obstacle in the working region to record position coordinates of the obstacle. The user walks along a traffic island in the working region to record position coordinates of the traffic island. The user walks along a passage connecting sub-working regions to record position coordinates of the passage. In this embodiment, when the user holds the mobile station to record a map, the inertial navigation system is turned off. The reason is that when the user holds the mobile station and moves, with the shaking of a hand, the mobile station may tilt around to severely interfere with the inertial navigation system.

In a second embodiment of the present invention, to record a map, the mobile station is installed at the housing of the automatic lawn mower, and the user uses an intelligent terminal device such as a mobile phone and a tablet to remotely control the automatic lawn mower to move. Similarly, the map recording step includes recording a boundary of the working region, an obstacle in the working region, a passage connecting sub-regions or the like. In this embodiment, in the process of recording a map, an inertial navigation apparatus may be turned on. The reason is that the mobile station is installed at the housing of the automatic lawn mower, and the mobile station moves relatively stably. In this embodiment, in the process of recording a map, the task execution module of the automatic lawn mower is kept off.

In a third embodiment of the present invention, the automatic lawn mower includes a pushing rod detachably installed at the housing of the automatic lawn mower. To record a map, the mobile station is installed at the housing of the automatic lawn mower, the pushing rod is installed at the housing of the automatic lawn mower, and the user operates the pushing rod to push the automatic lawn mower to move, to record a boundary of the working region, an obstacle, a passage or the like. Similarly, the task execution module of the automatic lawn mower is kept off.

In a fourth embodiment of the present invention, the automatic lawn mower includes an ultrasonic apparatus, so that the automatic lawn mower can follow the user at a distance. To record a map, the mobile station is installed at the housing of the automatic lawn mower, the user walks along a boundary of the working region, an obstacle, a passage or the like, and the automatic lawn mower follows the user to record a map. Similarly, the task execution module of the automatic lawn mower is kept off. The benefit of this approach is that the automatic lawn mower follows the user when recording a map, so that it can be determined whether a position recorded on the map is accurate, and the map is examined.

In a fifth embodiment of the present invention, to record a map, the mobile station is separated from the automatic lawn mower, the mobile station is placed on a pushcart. For example, the mobile station may be installed on a hand-propelled device, and the user pushes a cart and walks, to record a boundary of the working region, an obstacle, a passage or the like. The benefit of this approach is that the mobile station moves stably, and an inertial navigation apparatus may be turned on.

In the first embodiment of the present invention, the mobile station includes a second interface for connecting to an intelligent terminal of the user. The intelligent terminal such as a mobile phone and a tablet may be installed on the mobile station through the second interface. The second interface may include an electrical interface, so that when being installed on the mobile station, the intelligent terminal is electrically connected to the mobile station. In this embodiment, the mobile station communicates with the intelligent terminal wirelessly by using the communications module. A manner of the wireless communication may be, for example, WiFi, a cellular network or Bluetooth. To record a map, the intelligent terminal is installed on the mobile station and displays in real time information recorded by the mobile station. In this embodiment, the mobile station includes several buttons configured to input instructions such as "Record a map" and "Complete recording". In other embodiments, the mobile station includes a display screen displaying information in real time in place of the intelligent terminal.

In this embodiment, the charging station is used as a starting point on a map, and the automatic lawn mower starts to work from the charging station. To record the position of the charging station, the mobile station is installed at the automatic lawn mower, so that the automatic lawn mower is in a charging state, or the charging state of the automatic lawn mower is simulated, that is, a docking state is completed. Recording of the position information of the charging station is confirmed manually or by using a charging signal. The position information of the charging station includes position coordinates, and further includes attitude information of the automatic lawn mower. The automatic lawn mower includes an acceleration sensor, an electronic compass, and the like. To record the position of the charging station, the acceleration sensor, the electronic compass, and the like are used to record current information such as a direction and a tilt angle of the automatic lawn mower, to facilitate accurate docking when the automatic lawn mower returns.

In the first embodiment of the present invention, the mobile station includes a map generation module configured to generate a map of the working region according to recorded position coordinates and save the map. In this embodiment, every time the user walks to form a closed region, the user uses a button to input a map generation instruction to generate map information of the closed region. For example, when recording the boundary of the working region, the user walks along a boundary of a sub-working region. After the boundary of the sub-working region is completed, the boundary of the sub-working region is generated, and then a boundary of a next sub-working region starts to be recorded. Similarly, when recording an obstacle and a passage, the user walks along the obstacle or the passage to form a closed region, map information corresponding to the closed region is generated, and the user then records a next closed region. On the generated map, an attribute is assigned to the recorded closed region. For example, if a boundary attribute is assigned to the recorded closed region, the automatic lawn mower can work inside the region but cannot leave the region. If an obstacle attribute is assigned to the recorded closed region, the automatic lawn mower cannot enter the region. In addition, the obstacle needs to be located inside the boundary. Therefore, a part, outside the boundary, of the obstacle will be discarded. If a passage attribute is assigned to the recorded closed region, the automatic lawn mower can enter the region but cannot perform grass cutting work inside the region. A passage may be located inside or outside the boundary. If a passage is located outside the boundary, the passage is used to connect two separate sub-working regions. Therefore, the passage needs to intersect with both the sub-working regions. If a passage is located inside the boundary, the passage is usually a non-lawn surface. Therefore, the automatic lawn mower is also forbidden to perform grass cutting work.

In this embodiment, a Cartesian coordinate system is established to generate a map. Specifically, a first point from which recording is started is used as the origin (0, 0) of the coordinate axes. The position coordinates that correspond to the origin and are output by the mobile station are (x0, y0). In this embodiment, the origin (0, 0) of the coordinate axes corresponds to the position coordinates of the charging station. As the user records the map, the mobile station outputs position coordinates (x1, y1), and converts the position coordinates (x1, y1) into (x1−x0, y1−y0) when generating the map, so as to convert a satellite positioning coordinate system into a Cartesian coordinate system. In this embodiment, a raster image is generated based on the Cartesian coordinate system. Rasterization precision, for example, 1 mm, is defined. In the Cartesian coordinate system, straight lines are drawn at an interval of 1 mm separately on X and Y axes, so as to form the raster image. Recorded position coordinates are converted into a grid on the Cartesian coordinate system. In this way, a map recording process is equivalent to a process of placing points on the raster image. As the points are placed, each point further records some other information, for example, a differential GPS signal at the point, the altitude of the point, and a positioning error of the point. A boundary, an obstacle, and a passage are all generated by using the foregoing method.

After the raster image is generated, a square attribute is assigned to a raster square. The square attribute includes coordinates, whether the automatic lawn mower can cover the raster square, whether the automatic lawn mower passes through the raster square, a quantity of times that the automatic lawn mower passes through the raster square, a differential GPS signal, a positioning error, an altitude, a slope, temperature, humidity, sunlight intensity, and the like. If the square attribute of a raster square indicates that the automatic lawn mower cannot cover the raster square, when the automatic lawn mower approaches a position corresponding to the raster square, the control module controls the automatic lawn mower to change a movement manner to stay away from the position corresponding to the raster square. If the square attribute of a raster square indicates that the automatic lawn mower can cover the raster square, every time the automatic lawn mower passes through the raster square, the square attribute being the quantity of times that the automatic lawn mower passes through the raster square of the raster square is increased by 1.

In this embodiment, an offset operation is performed on the map to eliminate a positioning error. When the automatic lawn mower is working, the mobile station is installed at the housing of the automatic lawn mower to output current position coordinates of the automatic lawn mower. A positioning center of the automatic lawn mower is deviated from the positioning center of the mobile station during map recording. A safety problem may occur if the deviation is not calibrated. For example, when the automatic lawn mower moves towards a boundary but the positioning center of the automatic lawn mower is still inside the boundary, the automatic lawn mower continues to move, and as a result the automatic lawn mower moves outside the boundary. To eliminate a positioning error caused by the deviation of the positioning center of the automatic lawn mower from the positioning center of the mobile station during map recording, an offset operation is performed on the map. A distance D of the deviation of the positioning center of the automatic lawn mower from the positioning center of the mobile station during map recording is determined, a boundary, an obstacle, a passage, and the like are offset on the map into the working region by the distance D. To be specific, the boundary and the passage are shrunk by the distance D, and the obstacle is enlarged by the distance D. An operation of shrinking the boundary and the passage is also referred to as a map erosion, and an operation of enlarging the obstacle is also referred to as a map expansion.

A positioning error also exists during map recording. The severity of the positioning error is related to a differential GPS signal, that is, is related to a precision level of a coordinate point. When the differential GPS signal is strong, the positioning error is relatively small, and when the differential GPS signal is weak, the positioning error is relatively large. When an offset operation is performed on the map to eliminate a positioning error, positioning errors of different positions are first assessed according to differential GPS signals of the positions. This is also referred to as error evaluation. Offsets on the map are then adjusted according to error evaluations of different positions. An offset operation similarly includes erosion and expansion.

In this embodiment, after the map of the working region is offset, the map of the region may be joined with the maps of other regions.

After the offset operation is completed, the step of generating the map of the working region is completed.

In this embodiment, the mobile station further includes an assisted positioning apparatus. The assisted positioning apparatus includes a pedometer, a laser radar, a camera, an odometer, an ultrasonic wave, and the like. The inertial navigation system may also be considered as an assisted positioning apparatus. The assisted positioning apparatus is used in coordination to perform differential GPS positioning when a differential GPS signal is weak, and a correction value output by the assisted positioning apparatus is used to correct a positioning error, so that a generated map is more precise.

In a sixth embodiment of the present invention, the working region has a boundary with a regular shape, for example, a rectangular boundary. To record a map, the user only needs to record the positions of the vertices of the working region. During map generation, the vertices are connected to obtain the boundary. The method is also applicable to a passage, an obstacle, and the like with a regular shape. In the method, map generation efficiency can be improved, and a possible region with a poor differential GPS signal in the middle is avoided.

In the first embodiment of the present invention, the base station communicates with the mobile station to implement differential GPS positioning, the base station is disposed in several manners to enable the base station and the mobile station to reliably and efficiently provide navigation data to the automatic working system. In this embodiment, the base station is disposed at the charging station and is powered by the charging station. Certainly, in other embodiments, the base station may be disposed separately from the charging station. The base station may be powered by independent energy sources. For example, a power form such as solar energy and wind energy may be used. In this embodiment, to ensure a strong satellite signal at the base station, before the charging station is installed, the user first places the automatic lawn mower at a position where the user intends to install the charging station. Alternatively, the user detaches the mobile station from the automatic lawn mower and then moves the mobile station to the position where the user intends to install the charging station. The user turns on positioning, determines positioning precision, and confirms that the positioning precision is high before fixing the charging station. The base station is provided with an acoustic, optical, electrical apparatus or the like configured to feed back the condition of a satellite signal to indicate whether an installing position or receiving quality of the base station is appropriate. The base station can perform comparison by using historical coordinates to determine whether there is an exception such as blockage. If positioning precision is reduced, it indicates that the base station may be blocked. After discovering an exception, the base station sends prompt information to the user or the automatic lawn mower by using a communications module, or switches a state to wait for recovery.

To enable the base station and the mobile station to reliably and efficiently provide navigation data to the automatic working system, reliable and efficient communication between the base station and the mobile station further needs to be ensured.

Figure 4:
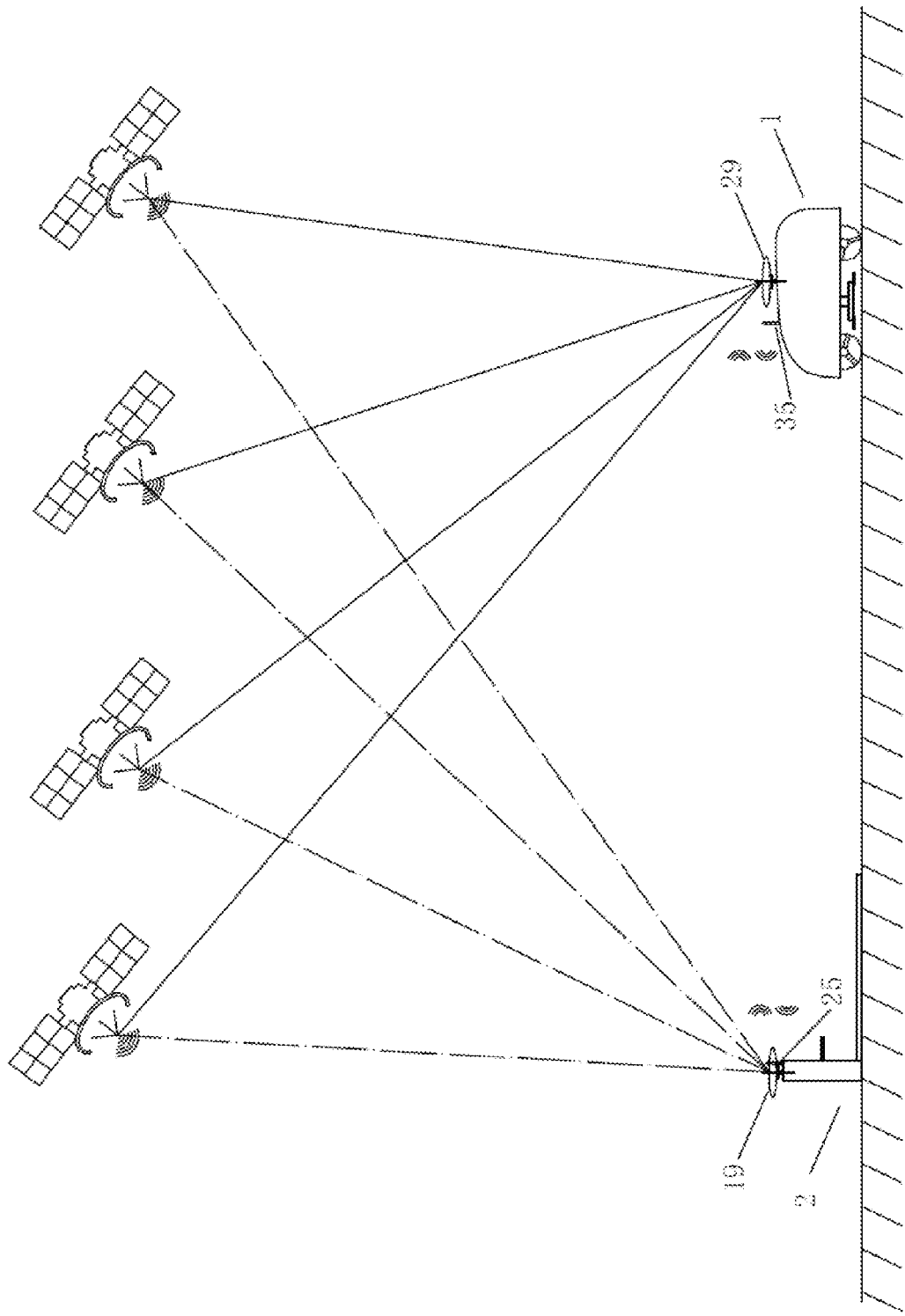
FIG. 4 is a working principle diagram of a navigation module according to the first embodiment of the present invention.

As shown in FIG. 4, in this embodiment, the base station receives a satellite signal by using a GPS antenna, and sends acquired carrier phase information to the mobile station by using the communications module. The communications module includes a radio station and a radio station antenna, and may also include a Sub-1G module, a WiFi module, and a 2G/3G/4G/5G module. The mobile station also receives a satellite signal by using a GPS antenna, and also receives, by using a communications module corresponding to the base station, a carrier phase signal acquired by the base station, to resolve relative position coordinates of the mobile station relative to the base station. The relative position coordinates include longitude and latitude, and may further include altitude. The precision may reach the centimeter level.

In this embodiment, the mobile station may selectively communicate with one of a plurality of different base stations. For example, the mobile station may selectively communicate with a first base station or a second base station. Specifically, the automatic working system includes a plurality of base stations, or, base stations of different automatic working systems located inside a region may be shared. The mobile station is switched among the plurality of base stations. When an exception occurs during communication between the mobile station and the first base station, the mobile station may be automatically switched to the second the base station for communication.

In this embodiment, a satellite based augmentation system may further be used to implement differential GPS navigation.

In this embodiment, the base station and the mobile station may further communicate by using a lora technology.

Figure 5A:
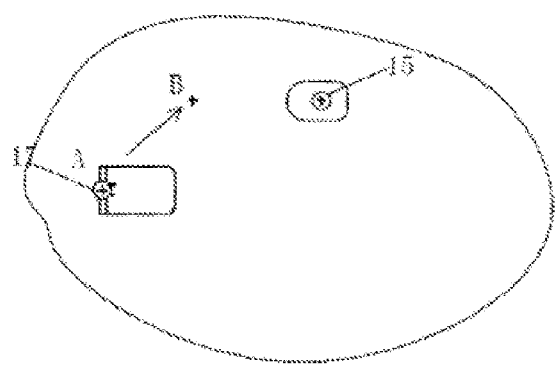
FIG. 5(a), FIG. 5(b), and FIG. 5(c) are principle diagrams of position correction by a base station according to the first embodiment of the present invention.
Figure 5B:
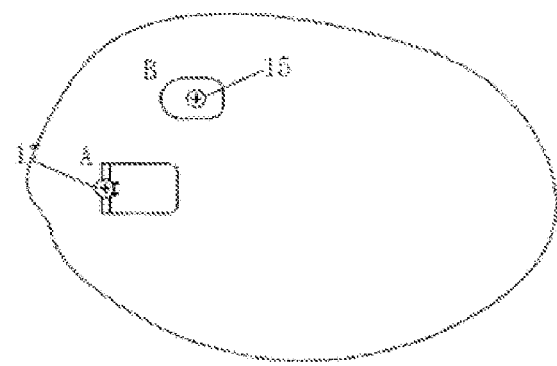
Figure 5C:
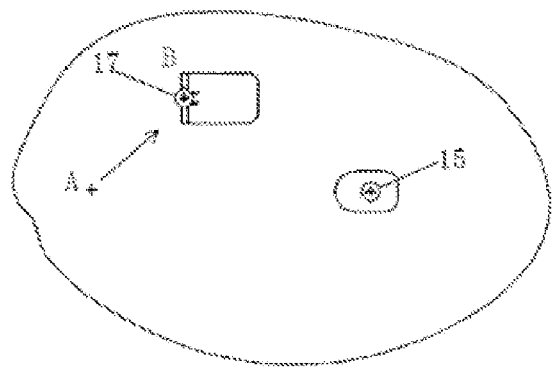
Figure 6:
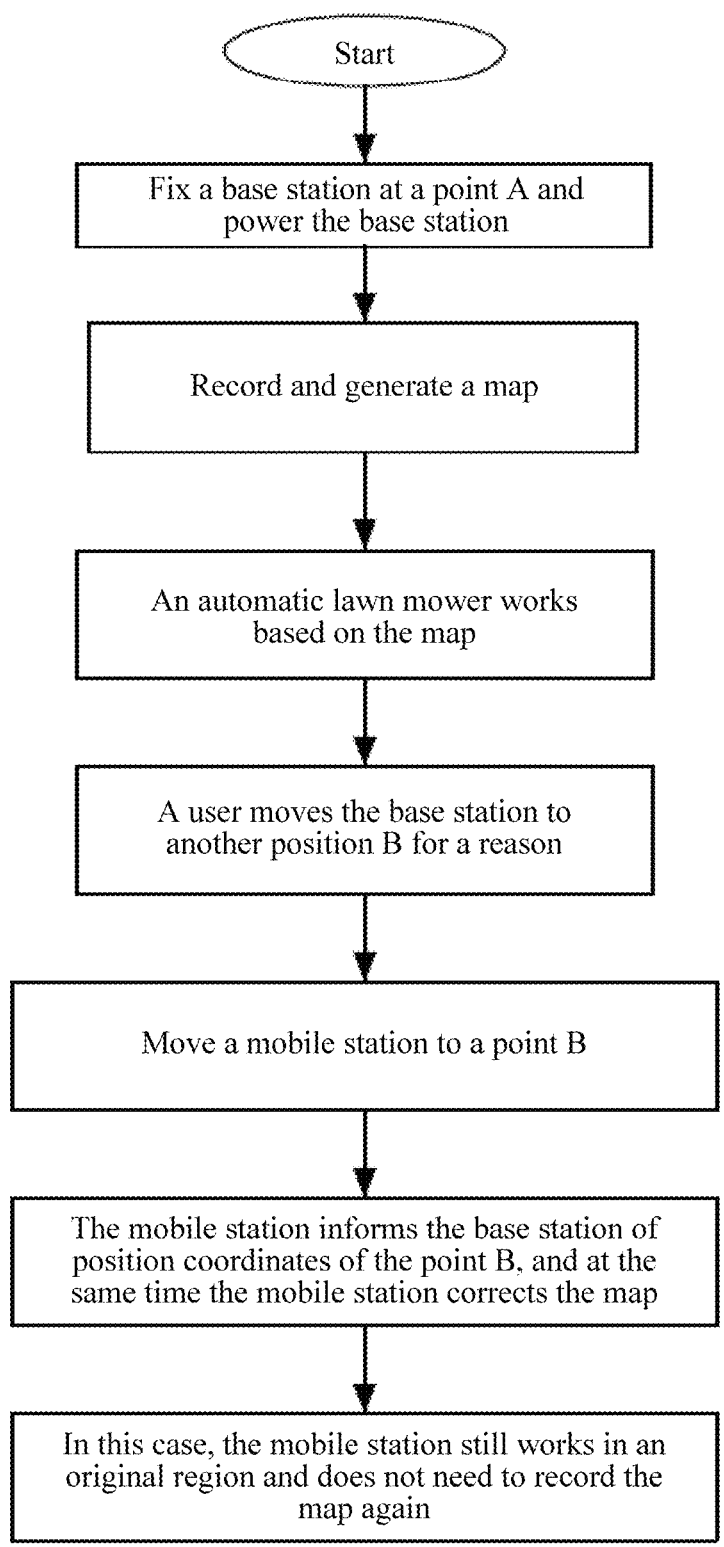
FIG. 6 is a flowchart of position correction by a base station according to the first embodiment of the present invention.

In this embodiment, differential GPS positioning is implemented based on that the base station is fixed at a position. When the base station moves, position coordinates output by the mobile station deviate. To avoid the trouble of recording a map again after the base station moves, in this embodiment, the mobile station is used to obtain a movement position of the base station, and the obtained movement position is used to correct a generated map. Referring to FIG. 5 and FIG. 6, a map correction process is as follows: 1). The base station 17 is fixed at a point A, the mobile station 15 keeps a record and generates a map. 2). As shown in FIG. 5(*a*), a user intends to move the base station 17 to another position B for a reason, for example, one that the user needs to build a flower bed at the point A. 3). As shown in FIG. 5(*b*), the mobile station 15 is moved to a point B, and the mobile station 15 sends position coordinates of the point B to the base station 17. 4). As shown in FIG. 5(*c*), the base station 17 is moved to the position B, and the base station 17 corrects its position. Meanwhile, the mobile station 15 learns of an offset of a position of the base station 17, and corrects the map according to the offset. The corrected map overlaps the map before correction. Therefore, it is not necessary to record a map again.

In the first embodiment of the present invention, the mobile station includes a path generation module configured to generate a path plan according to the map of the working region. First, the working region is divided according to a boundary, an obstacle, a passage or the like of the working region. With the division of the working region, the automatic lawn mower implements more efficient coverage. For example, the working region is divided into two sub-working regions connected through a passage. When performing grass cutting work, the automatic lawn mower first completes coverage in one of the sub-working regions, and then enters the other sub-working region through the passage to work. In this way, the automatic lawn mower is prevented from working inefficiently for moving repeatedly between the two ends of the passage. In another example, based on two parts separated by an obstacle in the working region, the working region is divided into two sub-regions, and the automatic lawn mower is prevented from encountering an obstacle frequently. According to the shape of a boundary, the boundary may further be divided into different sub-regions based on a part with a regular shape and a part with an irregular shape. In this way, the automatic lawn mower may cover a regular sub-region by using a regular path and cover an irregular sub-region by using a random path. In this embodiment, an overlapping part is provided between adjacent sub-regions, to ensure coverage on the part between the adjacent sub-regions. In this embodiment, the area of a region in which the automatic lawn mower can work one time is estimated according to the capacity of a battery pack to determine the size of a section. In this embodiment, the working region may further be divided according to the growth of plants, so that the automatic lawn mower works at higher cutting power for a longer cutting time in a region with dense plants and works at lower cutting power for a shorter cutting time in a region with sparse plants. In this embodiment, the working region may further be divided according to the priorities of regions. For example, a front yard and a back yard of a user are different sub-regions, so that the automatic lawn mower works in the front yard and the backyard by using different working strategies. Certainly, the working region may further be divided according to comprehensive factors such as a quantity of obstacles.

After region division is completed, a path of the automatic lawn mower in each sub-region is planned. A preset path of the automatic lawn mower in each sub-region may be a regular path such as parallel paths and a spiral path or may be a random path.

Figure 7:
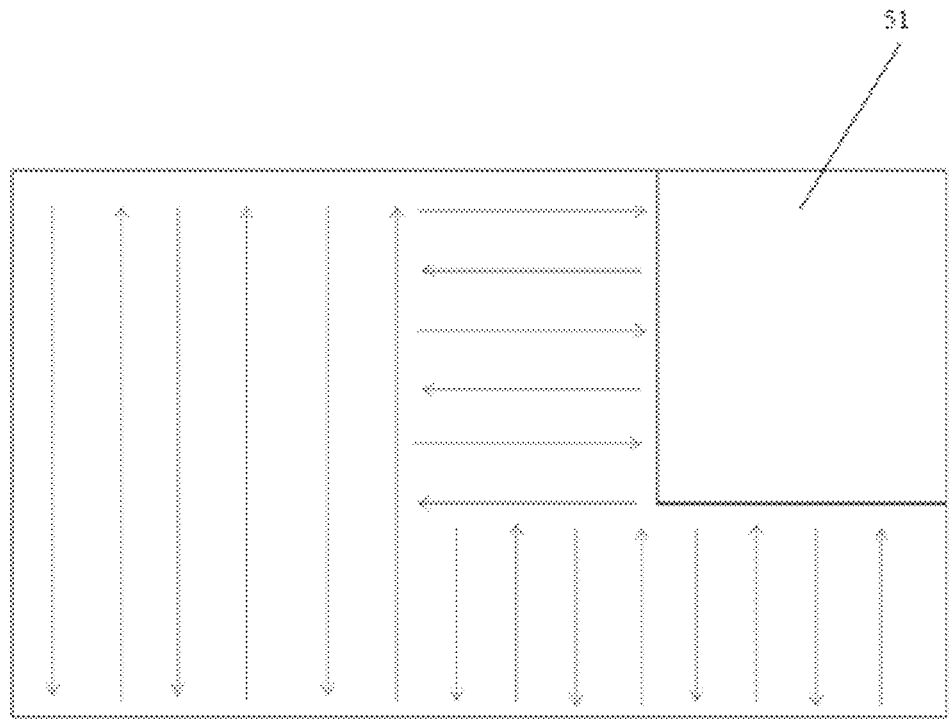
FIG. 7, FIG. 8(a), FIG. 8(b), FIG. 9, FIG. 10(a), and FIG. 10(b) are schematic diagrams of a movement path of an automatic lawn mower according to the first embodiment of the present invention.

In this embodiment, different paths may be planned in a same sub-working region. A building 51 exists in a sub-working region D shown in FIG. 7. It may be predicted that a satellite signal is poor in a region near the building 51 due to blockage by the building, and the navigation module has low positioning precision. If the automatic lawn mower moves on a path parallel to an edge of the building 51, when the automatic lawn mower moves near the building 51, the navigation module keeps outputting low precision signals. As a result, the automatic lawn mower may fail to move on a planned path, or move with low efficiency. To avoid the foregoing condition, a path in a region on an edge of the building 51 may be planned to be a path perpendicular to the edge of the building 51. In this way, the navigation module outputs a low precision signal only when the automatic lawn mower is near an edge of the building 51. When the automatic lawn mower is far away from an edge of the building 51, the navigation module outputs a high precision signal. When the automatic lawn mower is near an edge of the building 51, a satellite signal is poor, positioning errors of an inertial navigation apparatus accumulate, and the positioning precision gradually decreases. When the automatic lawn mower is far away from an edge of the building 51, a satellite signal becomes strong again and may be used to calibrate inertial navigation errors. Therefore, with the movement on such a path, it can be ensured that the navigation module outputs a strong positioning signal most of the time. In this embodiment, a path plan is automatically generated by the path generation module, and certainly may be alternatively adjusted by a user according to the condition of the working region. Alternatively, the automatic lawn mower may be adjusted during movement in real time according to the precision of a positioning signal. The case in FIG. 7 is used as an example. The automatic lawn mower moves may adjust in real time directions of walking back and forth.

Figure 8A:
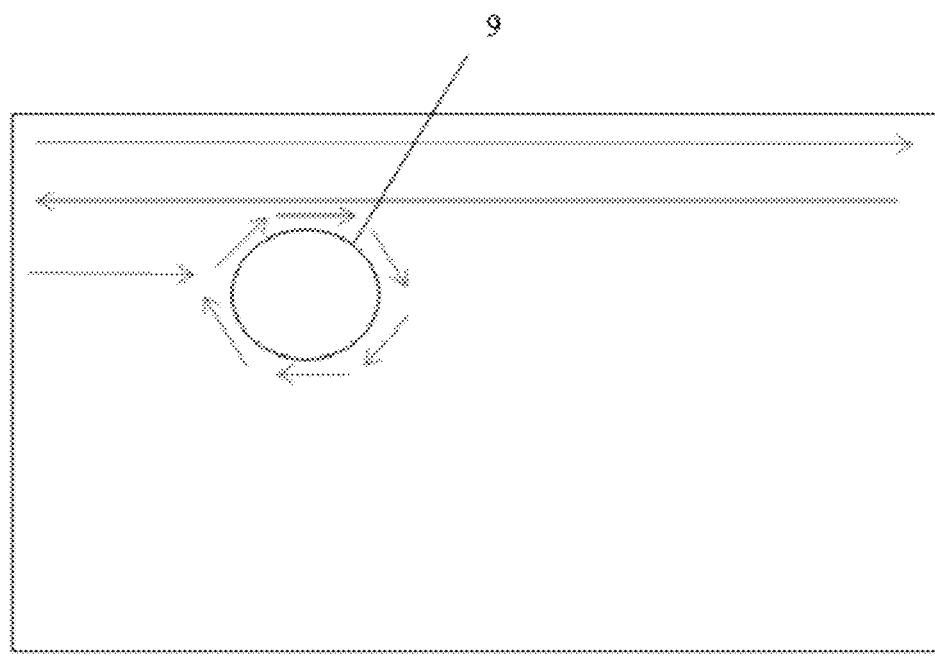
Figure 8B:
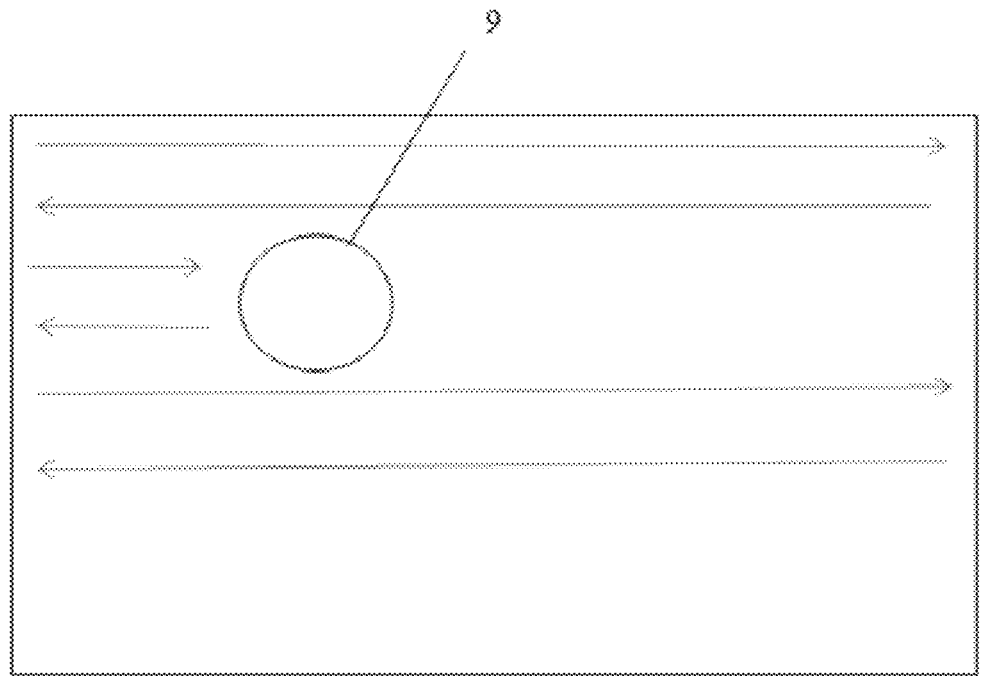

As shown in FIG. 8(*a*) and FIG. 8(*b*), in this embodiment, when encountering an obstacle, the automatic lawn mower may move around the obstacle or may turn around. If the automatic lawn mower moves around an obstacle when encountering the obstacle, the navigation module may be used to generate a vector image for moving around the obstacle.

In this embodiment, during the movement, the automatic lawn mower can distinguish a moving obstacle from a fixed obstacle. The fixed obstacle is an obstacle having a fixed position in the working region, and is usually an obstacle recorded on a map. If the automatic lawn mower repeatedly encounters an obstacle at a same position during movement but the obstacle is not recorded on the map, the automatic lawn mower may determine that the obstacle is a newly found fixed obstacle. The moving obstacle is an obstacle that appears at an indefinite position in the working region, and is usually an obstacle that the automatic lawn mower temporarily encounters during movement and appears at a same position occasionally. The moving obstacle may be a human, an animal or the like that appears in the working region. The automatic lawn mower distinguishes a moving obstacle from a fixed obstacle according to whether an obstacle is recorded on a map or according to the frequency of encountering an obstacle at a same position, and uses different obstacle avoidance strategies. The obstacle avoidance strategies include moving around an obstacle, turning around, and the like.

In this embodiment, the automatic lawn mower adjusts a movement range according to the condition of a positioning signal during movement. When the automatic lawn mower moves to a position with a poor positioning signal, the movement range is shrunk and the automatic lawn mower continues moving inside a small range or the automatic lawn mower stops moving.

Figure 9:
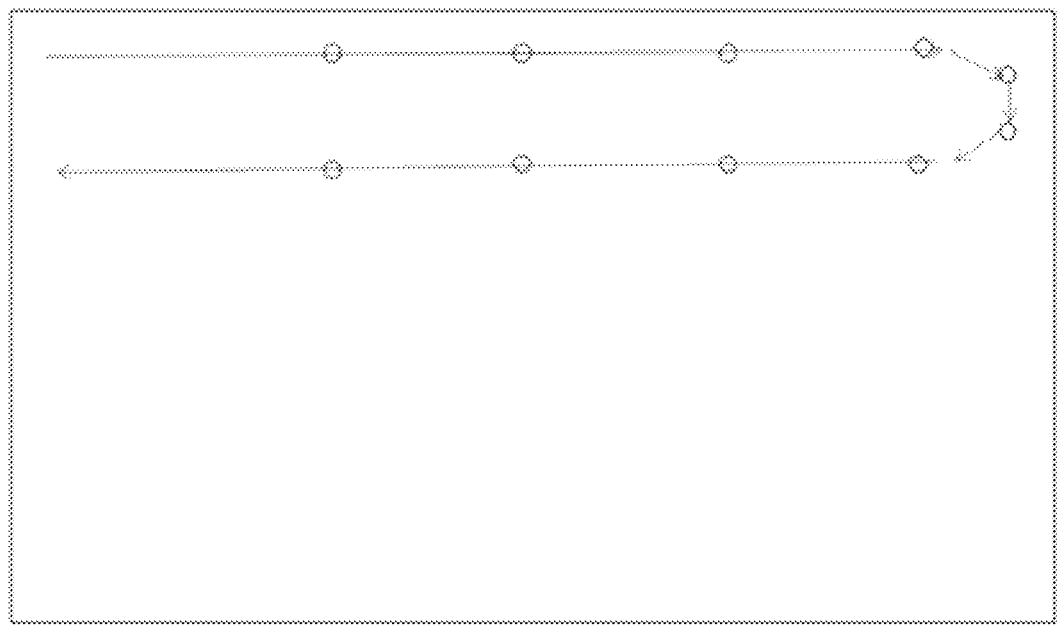

In this embodiment, the navigation module further includes a gyroscope configured to control the automatic lawn mower to move along a straight line. When the automatic lawn mower moves along a preset path, the gyroscope and a differential GPS positioning signal are used in combination to perform navigation. As shown in FIG. 9, a preset path is divided into a plurality of segments. When the automatic lawn mower starts to move, a moving direction is determined. When moving on each segment, the automatic lawn mower uses the gyroscope to perform navigation. The gyroscope is configured to control the automatic lawn mower to move along a straight line, to prevent the moving direction of the automatic lawn mower from deviating. After the automatic lawn mower completes movement on a segment of the path, the differential GPS positioning signal is used to calibrate the moving direction. Specifically, the control module determines whether a current position of the automatic lawn mower is located on the preset path. If the current position of the automatic lawn mower is not on the preset path, the moving direction of the automatic lawn mower is adjusted to enable the automatic lawn mower to return to the preset path. When moving along a next segment of the path, the automatic lawn mower moves along a straight line again in a calibrated direction by using the gyroscope. As the automatic lawn mower moves, if determining that a distance by which the current position of the automatic lawn mower deviates from the preset path is greater than a preset value, the control module may calibrate the moving direction of the automatic lawn mower in real time, or may redraw segments.

Figure 10A:
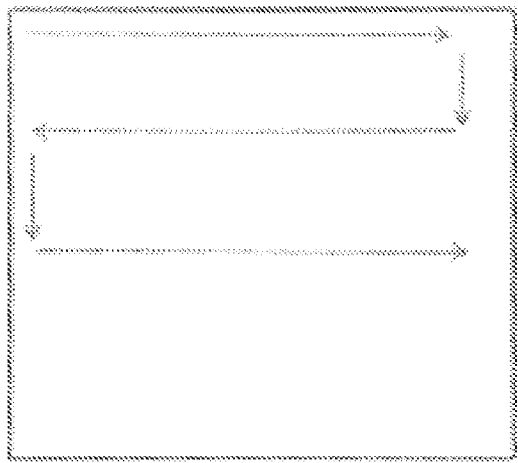
Figure 10B:
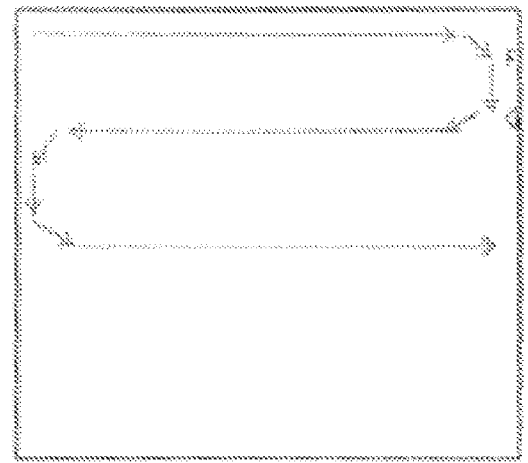

As shown in FIG. 10(*b*), in this embodiment, the automatic lawn mower moves along parallel paths. When reaching a boundary, the automatic lawn mower steers to move in an opposite direction. When steering, the automatic lawn mower covers a plurality of points F and G between adjacent parallel paths, to ensure complete coverage, thereby avoiding a problem that a region near the boundary is not covered due to steering by a right angle (referring to FIG. 10(*a*)).

In this embodiment, as the automatic lawn mower moves, if an exception occurs in communication between the base station and the mobile station, for example, the communication is interrupted or a differential GPS signal is weak and as a result the navigation module keeps outputting a low precision positioning signal, the automatic lawn mower is controlled to adjust a movement manner. When the automatic lawn mower adjusts the movement manner, the automatic lawn mower is switched between working states. For example, the automatic lawn mower is switched to a random walking mode, or returns to the charging station, or enters a search mode to search for a strong satellite signal. Alternatively, when the automatic lawn mower adjusts the movement manner, the automatic lawn mower enables the task execution module to stop working, reverse, steer, stop or perform another operation.

Figure 11:
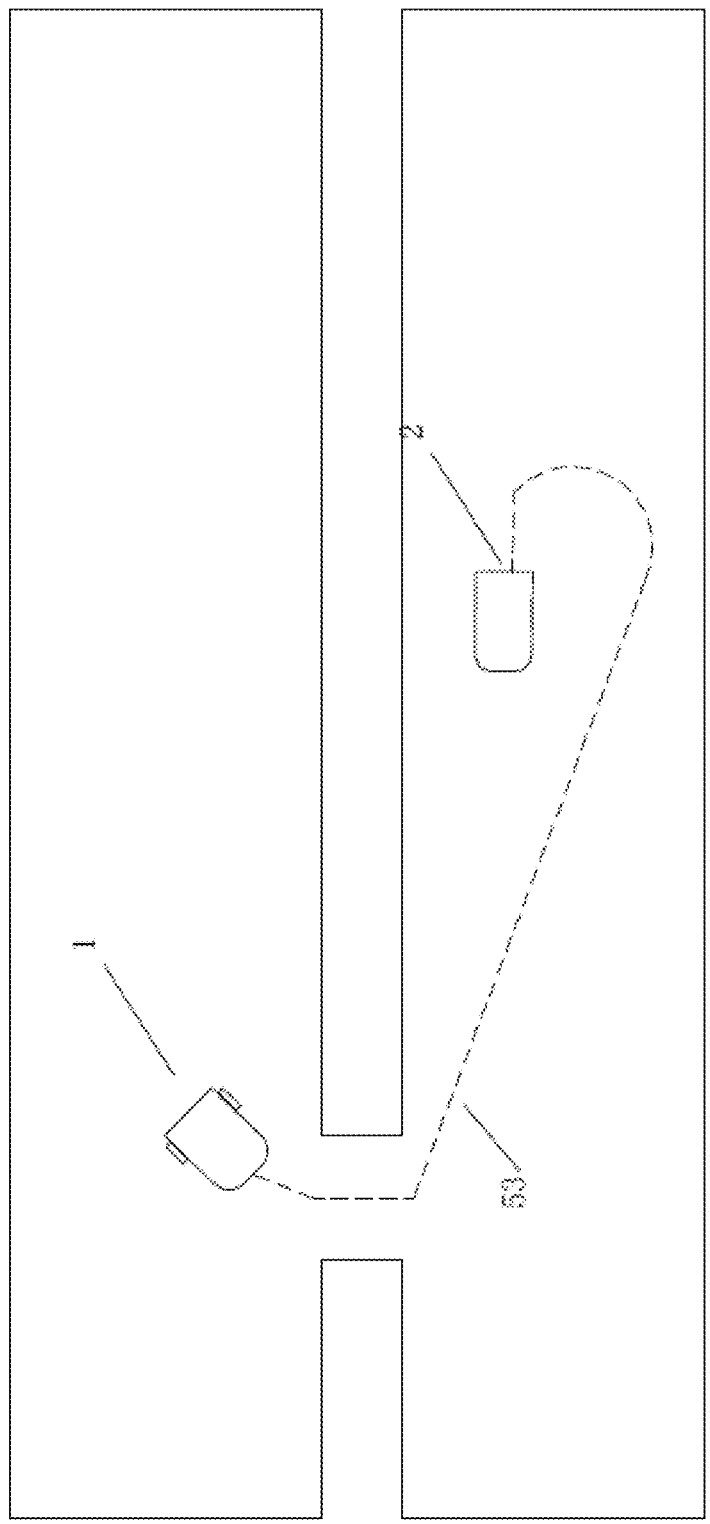
FIG. 11, FIG. 12, and FIG. 13 are schematic diagrams of a return path of an automatic lawn mower according to the first embodiment of the present invention.

In this embodiment, the path generation module is further configured to generate a return path. A working region in FIG. 11 is used as an example, and currently the charging station 2 is located inside the working region. When the automatic lawn mower 1 needs to return to the charging station 2, the path generation module calculates a shortest path from the automatic lawn mower 1 to the charging station 2 according to the current position information of the automatic lawn mower 1 and the map information and generates a return path 53. The control module controls the automatic lawn mower 1 to move along the return path 53 to return to the charging station 2. The calculation of a shortest path is related to a position of the charging station 2, and is further related to obstacle distribution in the working region and whether there is a passage between the automatic lawn mower 1 and the charging station 2. The automatic lawn mower 1 passes through the fewest raster squares when moving along the shortest path. In this embodiment, the control module records the return path of the automatic lawn mower 1. When the automatic lawn mower 1 starts to return again, the control module compares a newly generated return path with a previous return path or several previous return paths to determine whether an overlapping part exists between the newly generated return path and the previous return path or the several previous return paths. If an overlapping part exists, the return path is modified to avoid an overlap of return paths. For example, a part of the return path is offset by a distance. By using the foregoing method, if the automatic lawn mower 1 needs to pass through the passage when returning to the charging station 2, an overlap of a partial path from the passage to the charging station 2 can be effectively avoided, thereby preventing the automatic lawn mower 1 from repeatedly returning along a same segment of the path to crush the lawn.

Figure 12:
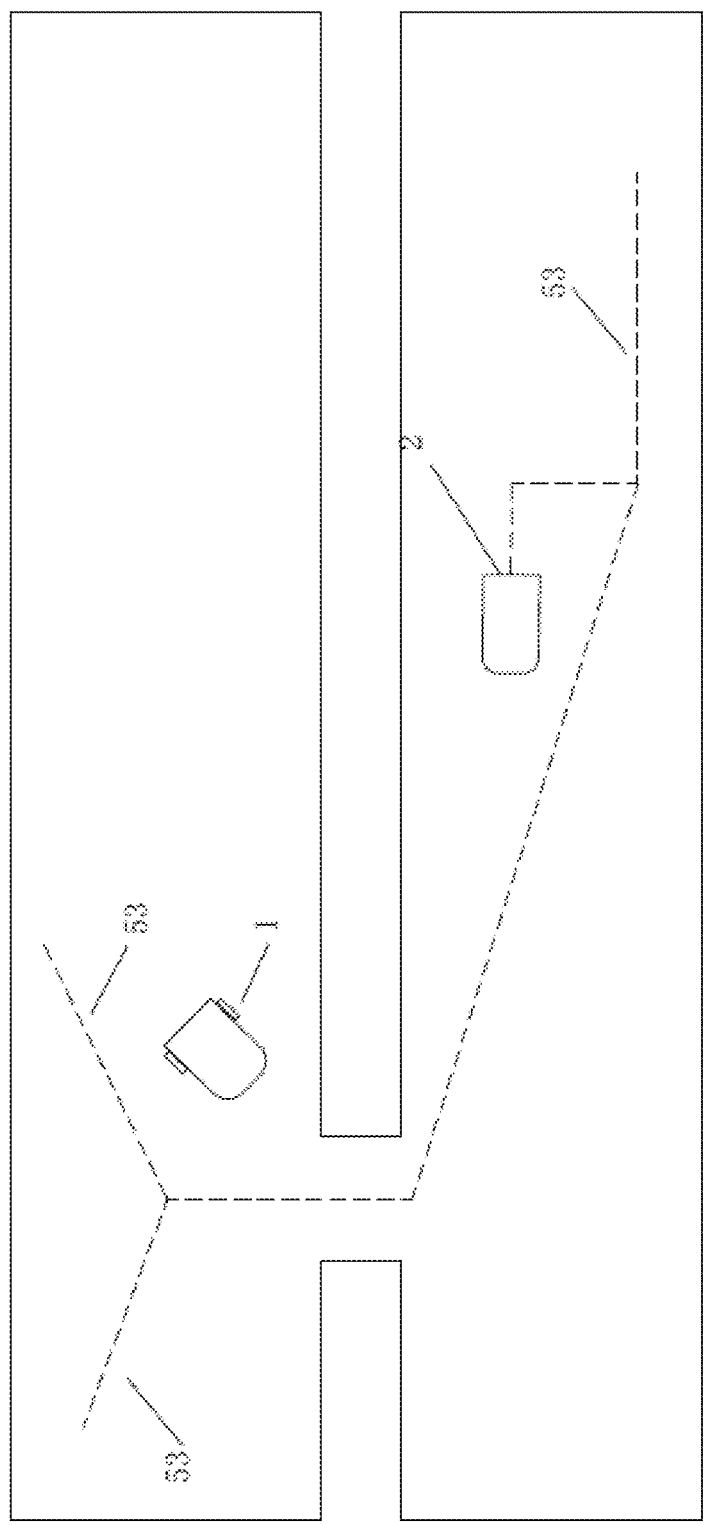

In a seventh embodiment of the present invention, a method for generating a return path by the path generation module and is different from the method in the first embodiment. As shown in FIG. 12, after the map generation module generates a map, the path generation module sets several return paths 53 according to the generated map. When needing to return to the charging station 2, the automatic lawn mower 1 moves to one of the return paths 53. Specifically, the control module determines shortest distances from the automatic lawn mower 1 to the several return paths 53, selects a closest return path 53, and controls the automatic lawn mower 1 to move to the closet return path 53 along a path with the shortest distance and return to the charging station 2 along the return path 53. Certainly, the automatic lawn mower 1 may alternatively move to the closet return path 53 randomly. Alternatively, when needing to return to the charging station 2, the automatic lawn mower 1 moves randomly, and when the control module determines that the automatic lawn mower 1 is located on one of the return paths 53, the automatic lawn mower 1 is controlled to return to the charging station 2 along the return path 53. By using the foregoing method, the automatic lawn mower 1 can be prevented from returning along a same path to crush the lawn. It may be understood that a return path may alternatively be recorded by a user during map recording. Specifically, the user holds the mobile station and moves from different positions in the working region to the charging station, and positions covered by the movement are recorded to form return paths.

Figure 13:
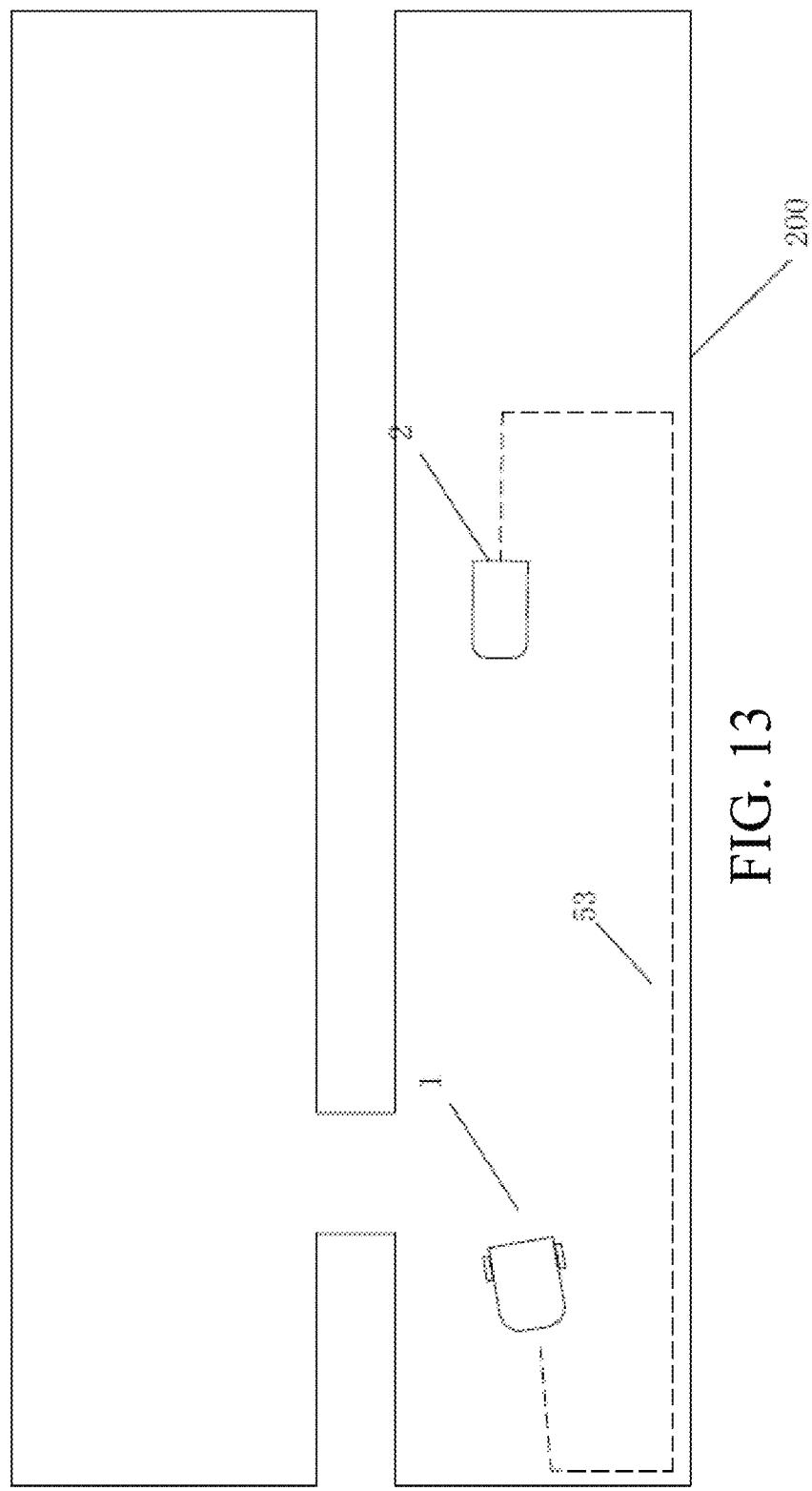

In an eighth embodiment of the present invention, a method for generating a return path by the path generation module and is different from the method in the first embodiment. As shown in FIG. 13, when needing to return to the charging station 2, the automatic lawn mower 1 first moves to the boundary 200, moves to a position of the charging station 2 along the boundary 200, and then moves to the charging station 2. Specifically, the path generation module determines a point, on the boundary 200, having the shortest distance from the automatic lawn mower 1 according to a current position of the automatic lawn mower 1 and a position of the boundary 200, connects the current position of the automatic lawn mower 1 and the point to form a first segment of the path, calculates, according to a position of the point and the position of the charging station 2, a shortest path for the automatic lawn mower 1 to move from the point along the boundary 200 and then move from the boundary 200 to a position right in front of the charging station 2, generates a second segment of the path according to the calculated shortest path, an joins the first segment of the path and the second segment of the path to generate the return path 53. In this embodiment, when the charging station 2 is located on the boundary 200, the automatic lawn mower 1 can directly move to the position right in front of the charging station 2 along the boundary 200. When the charging station 2 is not located on the boundary 200, the automatic lawn mower 1 approaches the charging station 2 along the boundary 200 and then moves to the position right in front of the charging station 2. In this embodiment, the automatic lawn mower 1 moves along the boundary 200 on a different path each time. Specifically, the automatic lawn mower 1 moves along the boundary 200 at a variable distance from the boundary 200. That is, during each return, the automatic lawn mower 1 moves along the boundary 200 at a different distance from the boundary 200. In this way, the automatic lawn mower 1 can be prevented from returning along the boundary 200 at a fixed distance to crush the lawn.

In the first embodiment of the present invention, after the automatic lawn mower 1 moves to the position right in front of the charging station 2, for example, at about 1 m in front, a docking process is started. Because a docking angle, a tilt angle, and the like are recorded during map recording, the automatic lawn mower 1 may be docked in a constant direction based on the information, so that a docking error is mitigated.

In the first embodiment of the present invention, the automatic lawn mower may further automatically determine a work schedule according to properties such as an area and a shape of a map. The work schedule includes a work time for each sub-region, a work order for the sub-regions, a quantity of times of covering each sub-region, and the like.

In this embodiment, a differential GPS clock may be used to replace a clock chip.

In this embodiment, the navigation module and an environment detection sensor are combined to address a safety problem. The environment detection sensor includes a step sensor, a lawn sensor, an optical sensor, a camera, a radar, an ultrasound sensor, a collision detection sensor, and the like. When the environment detection sensor detects an exception environment, the navigation module is used to record a current position and a corresponding exception on a map. When the automatic lawn mower moves to the position, the movement manner of the automatic lawn mower is adjusted to avoid a safety accident.

In this embodiment, the map and the path are respectively generated by the map generation module and the path generation module of the mobile station. It may be understood that in other embodiments, the control module of the automatic lawn mower acquires position coordinates recorded by the mobile station, and the control module may generate the map and the path.

In a ninth embodiment of the present invention, the charging station is a wireless charging station. The automatic lawn mower can approach the charging station from any direction to perform docking. Therefore, according to the current position of the automatic lawn mower and the position of the charging station, the automatic lawn mower can be conveniently guided by using differential GPS navigation to return to the charging station and be docked to the charging station.

Schematic Fault Handling Method

As discussed above, to enable the automatic lawn mower to recognize the working region and save the trouble of arranging a boundary line, a method for generating a map of a working region may be used, coordinates (referred to as a map) of the boundary of the working region are stored, and a machine acquires its coordinates in real time to determine whether the machine is located inside the working region.

A process of acquiring the coordinates of the machine is as follows: The mobile station is installed on the machine and can receive a satellite positioning signal. To improve positioning precision, a fixed base station is installed to provide a positioning correction signal. The base station is fixed inside or outside the working region, receives the satellite positioning signal, generates a positioning correction signal, and sends the positioning correction signal to the mobile station.

However, during working, the self-moving device may fail to accurately locate itself for various reasons.

These reasons for exceptions may be categorized into several types in the following: First, an exception occurs in the mobile station. The exception in the mobile station includes that the mobile station is damaged or the mobile station receives a weak satellite signal, and is reflected in two aspects:

First, an exception occurs in a data output. As discussed above, the mobile station is provided with a GPS module configured to receive a satellite signal and output coordinates. The GPS module has a check function that can determine whether an exception occurs in a data output.

Next, there is no data output. This may be acquired by a program, because no data is received.

Second, an exception occurs in a base station. A reason of the exception in the base station includes that the base station is offset, damaged or blocked, among other reasons. When the base station is offset, it indicates that the base station is supposed to be fixed, but during working, the base station may move under external impact (or for another reason). Herein, the base station can also recognize that the base station is offset, damaged or blocked, and notify the self-moving device by using a signal.

Third, an exception occurs in communication between the mobile station and the base station. As discussed above, a most common communication manner between the mobile station and the base station is radio station (or radio) communication. Certainly, a communication manner such as a cellular network, WiFi, and Bluetooth may alternatively be used. The exception in communication may be caused by damage in a communications module or a blocked signal.

Figure 14:
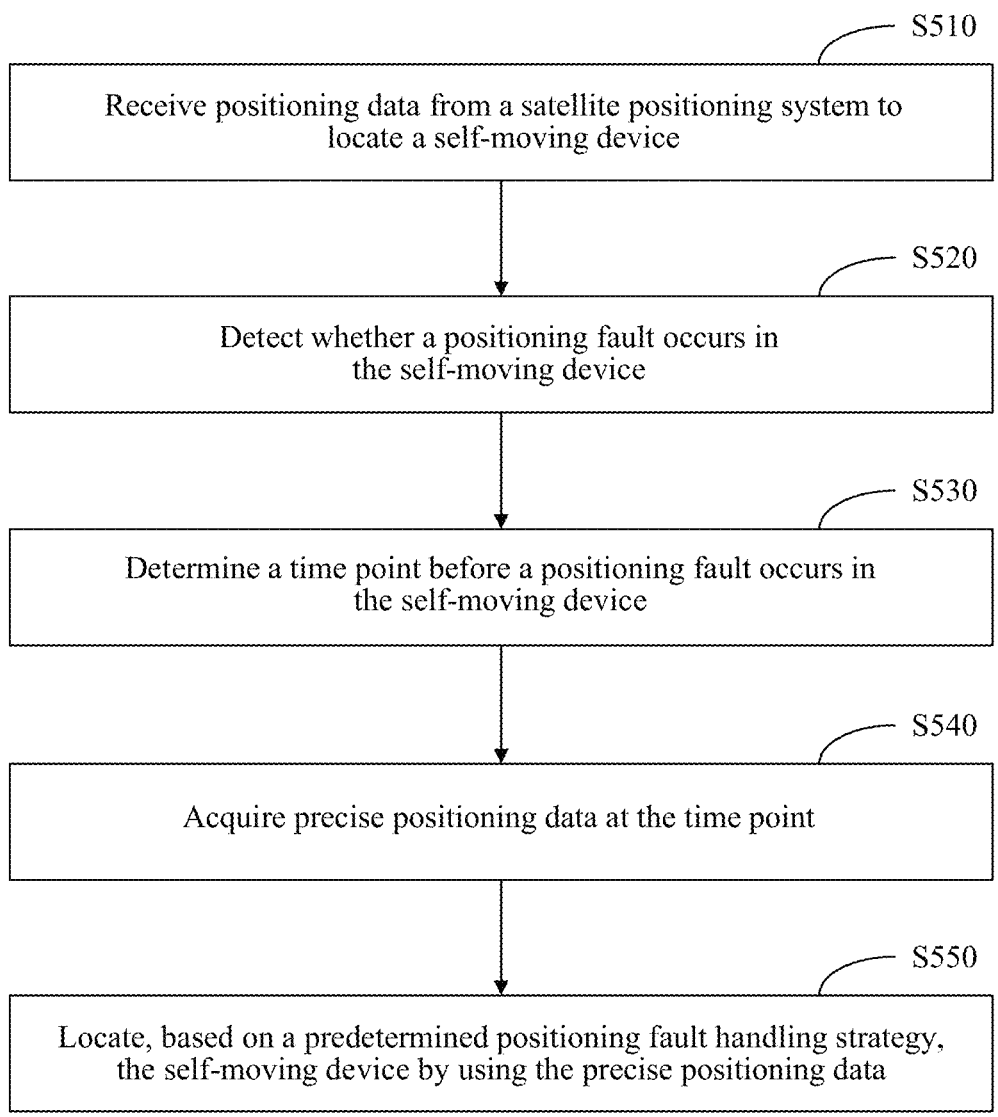
FIG. 14 is a schematic flowchart of a positioning fault handling method for a self-moving device according to an embodiment of the present invention.

FIG. 14 is a schematic flowchart of a positioning fault handling method for a self-moving device according to an embodiment of the present invention.

As shown in FIG. 14, in the positioning fault handling method for a self-moving device according to this embodiment, a self-moving device is configured to autonomously move, based on positioning of the self-moving device, inside a working region defined on a map. The positioning fault handling method includes: S510, receiving positioning data from a satellite positioning system to locate the self-moving device; S520, detecting whether a positioning fault occurs in the self-moving device; S530, in response to a detected positioning fault that occurs in the self-moving device, determining a time point before the positioning fault occurs in the self-moving device; S540, acquiring precise positioning data at the time point; and S550, locating, based on a predetermined positioning fault handling strategy, the self-moving device by using the precise positioning data.

As discussed above, the self-moving device can learn of the occurrence of a positioning fault in some manners mentioned in the foregoing. Positioning faults of a GPS receiver station and a GPS base station in a differential GPS method are used as an example. For a positioning fault in the GPS receiver station, the GPS receiver station has a self-detection system that can detect GPS data received by an antenna and detect whether a power supply system and a computing system are normal. If there is an abnormality, corresponding positioning fault information may be sent to an external control system. For a positioning fault in the GPS base station, the GPS base station has a self-detection system that can detect GPS data received by an antenna and detect whether a power supply system and a computing system are normal. If there is an abnormality, corresponding positioning fault information is sent by using a radio system.

In addition, for a positioning fault in communication between the GPS base station and the GPS receiver station, wireless network communication such as 868 MHz radio communication or 434 MHz radio communication is used between the GPS base station and GPS receiver station. A heartbeat packet technology is generally used in communication. To be specific, the GPS base station and the GPS receiver station send a fixed signal at a fixed frequency, for example, once per second, indicating that the communication is normal. Therefore, when the receiver station cannot receive a heartbeat packet, it is concluded that a positioning fault in communication or a positioning fault in the base station may occur.

After it is detected that a positioning fault occurs in the self-moving device, because positioning data of the self-moving device at a time point before the positioning fault occurs is still precise positioning data, the precise positioning data at the time point is acquired, and the self-moving device may be located by using the precise positioning data.

In this way, even if a positioning fault occurs in the self-moving device, it can still be ensured that the self-moving device accurately locates itself.

Further, as discussed above, positioning faults of the self-moving device may be categorized into several different types. Therefore, in the positioning fault handling method for a self-moving device in this embodiment, a different predetermined positioning fault handling strategy is further selected based on a type of a positioning fault to locate the self-moving device.

To be specific, in the positioning fault handling method for a self-moving device in this embodiment, the detecting whether a positioning fault occurs in the self-moving device includes: detecting a type of the positioning fault in the self-moving device; and the locating, based on a predetermined positioning fault handling strategy, the self-moving device by using the precise positioning data includes: selecting, based on the type of the positioning fault, the predetermined positioning fault handling strategy to locate the self-moving device by using the precise positioning data.

It is described below in detail how to select predetermined positioning fault handling strategies according to different types of positioning faults to use precise positioning data at a time point before a positioning fault occurs to locate the self-moving device.

First, for a positioning fault in the base station or a positioning fault in communication between the base station and a mobile station, a solution based on positioning correction data received at a time point before a fault occurs may be used.

As discussed above, the effect of the base station is to provide a reference point to a differential GPS system. Because a satellite positioning signal received by the mobile station/the base station drifts, and the base station is fixed, a positioning correction signal may be generated.

When an exception occurs in the base station or the mobile station cannot receive data of the base station, latest precise positioning correction data received before the exception occurs may be used to correct satellite positioning data of the mobile station. That is, latest precise data received before the exception occurs is used as the positioning correction data from the base station.

A virtual base station technology in this embodiment is further described below.

As discussed above, in this embodiment, the mobile station 15 receives a satellite signal by using a GPS antenna of the mobile station. The satellite signal includes an angle, a clock, and the like of a satellite.

The mobile station 15 further includes a data storage unit and a data correction processing unit. The data storage unit is configured to store data of a virtual base station and satellite data that is received in real time. The data correction processing unit is configured to compute and correct, based on the data of the virtual base station, the satellite data that is received in real time, to obtain high precision positioning data. A satellite signal receiver is a GPS receiver configured to receive a global navigation satellite system (GNSS) signal. The GPS receiver may communicate with a group of satellites to receive signals that indicate an actual position of the GPS receiver from the satellites. The data correction processing unit processes the received satellite signals, and generates a signal, that is, a first position signal, that indicates a current position of the automatic lawn mower 1. The processing process is a process of correcting the coordinates of the automatic lawn mower based on a differential GPS reference with known precise coordinates. The obtained first position signal is a differential GPS (DGPS) signal.

In the prior art, a base station is disposed, and a satellite signal obtained by the base station in real time is used to perform correction processing on the satellite signal received by the mobile station. The objective of the base station is to provide observed values of some satellites in real time, and the mobile station calculates positioning data based on its own observed values by using an RTK technology. In view of that within a short time, the states of the ionosphere, the environment, and the like change relatively slowly, it is considered that an error is relatively small within a relatively short time (approximately within 1 hour). Therefore, a machine may acquire satellite data at a point with a relatively strong signal. Meanwhile, the point is used as a virtual base station, and data at the point is used as a short-term base station data to perform RTK calculation, to obtain high precision positioning of the mobile station. In this manner, base station construction and communications links in the conventional RTK technology are omitted, and the costs are greatly reduced.

In this embodiment, a position of the self-moving device at a time point before a positioning fault occurs is a fixed physical position, and is therefore used as a virtual base station point.

In this way, if a positioning fault occurs in the automatic lawn mower 1, the satellite data received at the time point before the positioning fault occurs is stored in the mobile station 15 as the data of the virtual base station. As the automatic lawn mower 1 continues moving, RTK calculation is performed on satellite data that is received by the mobile station 15 in real time and the data of the virtual base station, to obtain high precision positioning data.

In addition, to obtain more accurate positioning data, at least one fixed mark point may further be set in the working region. These marks may be made in an RFID manner, a Hall sensor manner, and the like. These fixed mark points are manually or automatically made, so that fixed reference coordinates are obtained for the fixed mark points (for example, if the position of the self-moving device at a time point before a positioning fault occurs is a point (x0, y0), the physical mark point is a point (x, y1)). When the automatic lawn mower 1 reaches these physical mark points, the data correction processing unit corrects the coordinate data and current coordinate data, to obtain more precise positioning data.

In addition, the mobile station 15 further includes an error evaluation unit. Because the ionosphere, the environment, and the like still change slowly, after the automatic lawn mower 1 works for a long time, the positioning precision slowly decreases. Therefore, an error evaluation needs to be acquired for the positioning precision. The error evaluation may be determined according to information such as a geographical position, a positioning work time, a current actual time. A predetermined threshold is set in the error evaluation unit. When an error evaluation exceeds the predetermined threshold, it is concluded that the positioning precision is relatively low.

Therefore, the positioning fault handling method for a self-moving device in this embodiment further includes: receiving positioning correction data from a base station of the satellite positioning system to locate the self-moving device; the acquiring precise positioning data at the time point includes: acquiring precise positioning correction data at the time point; and the selecting, based on the type of the positioning fault, the predetermined positioning fault handling strategy to locate the self-moving device by using the precise positioning data includes: using the precise positioning correction data as the positioning correction data based on the type of the positioning fault being a positioning fault that the self-moving device cannot receive a signal from the base station, to locate the self-moving device.

In addition to a positioning fault handling strategy based on positioning correction data, as discussed above, the self-moving device further includes a navigation positioning system such as an inertial navigation system other than a satellite positioning system such as a GPS system. Herein, the inertial navigation system is configured to perform operation by using a known starting position and combining a movement parameter (for example, an acceleration and an angle) of the self-moving device, to obtain a travel path and a rotation angle of the self-moving device, so as to obtain the current position of the self-moving device. The inertial navigation system usually includes an odometer, an accelerator, a compass, a gyroscope, and the like.

Therefore, in the positioning fault handling method for a self-moving device in this embodiment, the inertial navigation system may be used to locate the self-moving device by using the precise positioning data of the self-moving device received at the time point before the positioning fault occurs.

Specifically, if the self-moving device cannot obtain precise positioning by using a satellite positioning system such as a differential GPS system, the latest precise position coordinates of the self-moving device at the time point before the positioning fault occurs are used as a starting point and a data output of the inertial navigation system is combined to calculate current position coordinates of the self-moving device.

In the self-moving device in this embodiment, the inertial navigation system and the satellite positioning system are integrated in real time to perform positioning. Therefore, if it is detected that a positioning fault occurs in the self-moving device, the weight of the inertial navigation system is increased. Certainly, a person skilled in the art may understand that the weight of the inertial navigation system may alternatively be increased to 1. That is, the satellite positioning system is not used, but the inertial navigation system alone is used to perform positioning.

In addition, in the self-moving device in this embodiment, in addition to the inertial navigation system, another positioning system such as a UWB positioning system, a capacitance detection system, and an image recognition system may alternatively be used as an assisted positioning system. In the UWB positioning system, several transmitters are erected, and one receiver is placed on the self-moving device to implement precise positioning. The capacitance detection system determines the condition of a working ground according to the humidity of a contact surface. The condition of the working ground is, for example, whether the working ground is a lawn. The capacitance detection system can ensure that the self-moving device is still in the working region when a GPS signal is weak, for example, ensure that the lawn mower can still work on the lawn without crossing a boundary. In the image recognition system, several cameras are installed on the self-moving device and configured to recognize the condition of a working object. For example, the condition of the working object is whether the working object is a lawn. When a GPS signal is poor, it is ensured that the self-moving device is still in the working region, for example, ensured that the lawn mower can still work on the lawn without crossing the boundary.

In addition, in the positioning fault handling method for a self-moving device in this embodiment, an assisted positioning system other than the satellite positioning system is applicable to any case in which the self-moving device cannot obtain precise positioning by using a satellite positioning system. Therefore, the method may be used as a supplement to a predetermined positioning fault handling strategy that uses data of a virtual base station, and may be separately used as a predetermined positioning fault handling strategy.

To be specific, in the positioning fault handling method for a self-moving device according to this embodiment, the locating, based on a predetermined positioning fault handling strategy, the self-moving device by using the precise positioning data includes: providing an assisted positioning system other than the satellite positioning system, and calibrating the assisted positioning system by using the precise positioning data, to locate the self-moving device.

In addition, in the positioning fault handling method for a self-moving device according to this embodiment, the assisted positioning system includes an inertial navigation system; and the calibrating the inertial navigation system by using the precise positioning data, to locate the self-moving device includes: calculating, by the inertial navigation system, current position coordinates of the self-moving device by using the precise positioning data as starting position coordinates, to locate the self-moving device.

Moreover, in the positioning fault handling method for a self-moving device according to this embodiment, the assisted positioning system is at least one of a UWB positioning system, a capacitance detection system, and an image recognition system.

As discussed above, in the self-moving device in this embodiment, based on the specific condition of a positioning fault, the fault may be automatically rectified after a period of time. For example, a fault exists in communication between a mobile station and a base station of the self-moving device due to signal interference or the like within a period of time. After the signal interference disappears, the fault in communication also disappears automatically. Therefore, a mechanism for determining that a positioning fault disappears may be further disposed, so that the positioning fault handling method for a self-moving device in this embodiment may be suitable for cases in which positioning faults with different duration are processed.

Therefore, the positioning fault handling method for a self-moving device according to this embodiment further includes: in response to the detected positioning fault that occurs in the self-moving device, detecting, after a predetermined time, whether the absence of the positioning fault; and in response to the absence of the positioning fault, controlling the self-moving device to restore normal operation.

Moreover, the positioning fault handling method for a self-moving device according to this embodiment further includes: in response to the presence of the positioning fault, controlling the self-moving device to stop.

In the foregoing solution, for a solution in which positioning correction data is used, the precision of positioning data obtained by the self-moving device at a time point before a positioning fault occurs can only last for a period of time. That is, the precision of positioning data decreases with time. Moreover, for a solution in which an assisted positioning system is used, errors of positioning results output by either the inertial navigation system or another assisted positioning system accumulate with time, and therefore, high precision also can only last for a period of time in the solution.

Therefore, in the positioning fault handling method according to this embodiment, a fault tolerance mechanism for the self-moving device is further set to adaptively change the behavior of the self-moving device.

Specifically, when an exception occurs, the self-moving device evaluates an error, and mainly two factors are evaluated. First, a distance between the self-moving device and a boundary of the working region is estimated. For example, a distance d is estimated according to the current position of the self-moving device and the stored boundary. An error range is then estimated. That is, a distance d' between a coordinate position estimated according to a precision level of a current positioning result and an actual (precise) position is calculated. If d'<d, the self-moving device may walk. If d'≥d, the self-moving device needs to stop or turn around, or continue walking in a small range (preferably, the self-moving device attempts to search for a signal while walking).

To be specific, the positioning fault handling method for a self-moving device according to this embodiment further includes: in response to the detected positioning fault that occurs in the self-moving device, estimating a distance d between a current position of the self-moving device and a boundary of the working region of the self-moving device; estimating a distance d' between the current position and an actual position of the self-moving device based on quality of a current positioning result; and in response to d'≥d, controlling the self-moving device to change a movement manner.

Moreover, in the positioning fault handling method for a self-moving device according to this embodiment, the controlling the self-moving device to change a movement manner includes: controlling the self-moving device to stop moving or reverse a moving direction or move inside a small range.

In addition, the positioning fault handling method for a self-moving device according to this embodiment further includes: in response to d'<d, controlling the self-moving device to continue moving.

In addition, for any exception, a user can receive an exception signal by using a terminal device such as a mobile phone, so as to determine the exception in time and eliminate the exception. For example, the user may determine whether the base station is moved, and determine to repair a damaged part.

To be specific, the positioning fault handling method for a self-moving device according to this embodiment further includes: in response to the detected positioning fault that occurs in the self-moving device, receiving confirmation information of the positioning fault from a user.

Moreover, to make it convenient for a user to handle a positioning fault, the self-moving device may stop when detecting a positioning fault.

To be specific, the positioning fault handling method for a self-moving device according to this embodiment further includes: in response to the detected positioning fault that occurs in the self-moving device, controlling the self-moving device to stop moving.

Figure 15:
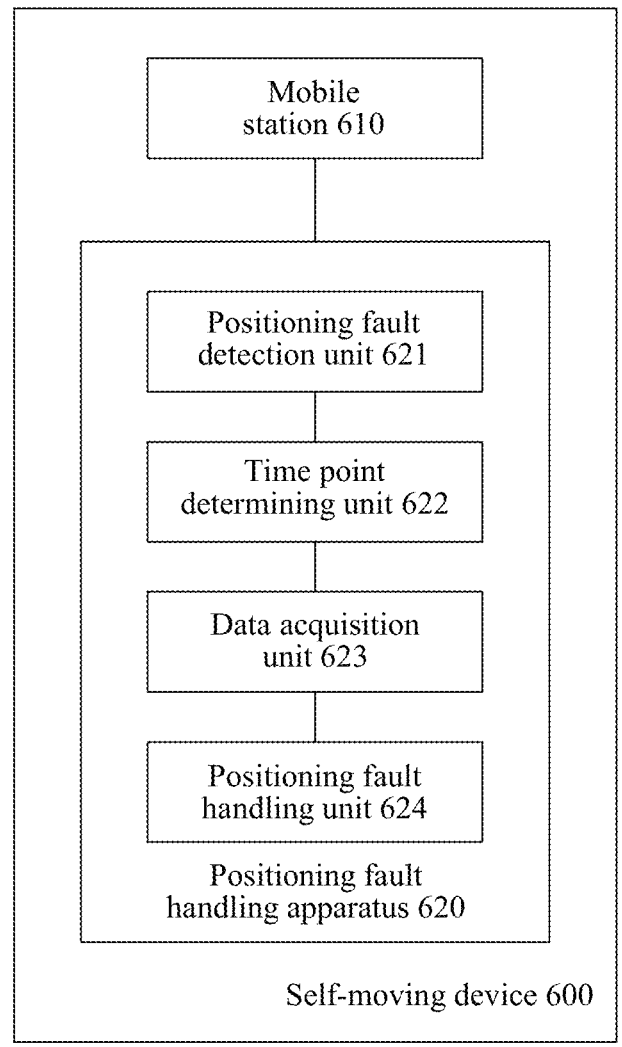
FIG. 15 is a schematic block diagram of a self-moving device according to an embodiment of the present invention.

Schematic self-moving device and automatic working system FIG. 15 is a schematic block diagram of a self-moving device according to an embodiment.

As shown in FIG. 15, a self-moving device 600 according to this embodiment includes: a mobile station 610, configured to: receive positioning data of a satellite positioning system, and communicate with a base station; a positioning fault handling apparatus 620, including: a positioning fault detection unit 621, configured to detect whether a positioning fault occurs in the self-moving device; a time point determining unit 622, configured to: in response to the positioning fault that occurs in the self-moving device and is detected by the positioning fault detection unit 621, determine a time point before the positioning fault occurs in the self-moving device; a data acquisition unit 623, configured to acquire precise positioning data at the time point determined by the time point determining unit 622; and a positioning fault handling unit 624, configured to locate, based on a predetermined positioning fault handling strategy, the self-moving device by using the precise positioning data acquired by the data acquisition unit 623.

In an example, in the foregoing self-moving device 600, the positioning fault detection unit 621 is configured to detect a type of the positioning fault in the self-moving device; and the positioning fault handling unit 624 is configured to select, based on the type of the positioning fault, the predetermined positioning fault handling strategy to locate the self-moving device by using the precise positioning data.

In an example, in the foregoing self-moving device 600, the mobile station 610 is configured to receive positioning correction data from the base station of the satellite positioning system to locate the self-moving device; the time point determining unit 622 is configured to acquire precise positioning correction data at the time point; and the positioning fault handling unit 624 is configured to use the precise positioning correction data as the positioning correction data based on the type of the positioning fault being a positioning fault that the self-moving device cannot receive a signal from the base station, to locate the self-moving device.

In an example, in the foregoing self-moving device 600, the positioning fault handling unit 624 is configured to: provide an assisted positioning system other than the satellite positioning system, and calibrate the assisted positioning system by using the precise positioning data, to locate the self-moving device.

In an example, in the foregoing self-moving device 600, the assisted positioning system includes an inertial navigation system; and the positioning fault handling unit 624 is configured to control the inertial navigation system to calculate current position coordinates of the self-moving device by using the precise positioning data as starting position coordinates, to locate the self-moving device.

In an example, in the foregoing self-moving device 600, the assisted positioning system is at least one of a UWB positioning system, a capacitance detection system, and an image recognition system.

In an example, in the foregoing self-moving device 600, the positioning fault detection unit 621 is configured to: in response to the detected positioning fault that occurs in the self-moving device, detect, after a predetermined time, whether the absence of the positioning fault; and the positioning fault handling unit 624 is configured to: in response to the absence of the positioning fault, control the self-moving device to restore normal operation.

In an example, in the foregoing self-moving device 600, the positioning fault handling unit 624 is configured to: in response to the presence of the positioning fault, control the self-moving device to stop.

In an example, the foregoing self-moving device 600 further includes a fault tolerance control unit, configured to: in response to the detected positioning fault that occurs in the self-moving device, estimate a distance d between a current position of the self-moving device and a boundary of the working region of the self-moving device; estimate a distance d' between the current position and an actual position of the self-moving device based on quality of a current positioning result; and in response to d'≥d, control the self-moving device to change a movement manner.

In an example, in the foregoing self-moving device 600, the fault tolerance control unit is configured to: control the self-moving device to stop moving or reverse a moving direction or move inside a small range.

In an example, in the foregoing self-moving device 600, the fault tolerance control unit is further configured to: in response to d'<d, control the self-moving device to continue moving.

In an example, in the foregoing self-moving device 600, the positioning fault handling unit is further configured to: in response to the detected positioning fault that occurs in the self-moving device, control the self-moving device to stop moving.

In an example, the foregoing self-moving device 600 further includes: a confirmation receiving unit, configured to: in response to the detected positioning fault that occurs in the self-moving device, receive confirmation information of the positioning fault from a user.

Herein, a person skilled in the art may understand that other details of the positioning fault handling apparatus of the self-moving device in this embodiment are identical with corresponding details of the positioning fault handling method for a self-moving device in the embodiment described above, and are not described again herein to avoid redundancy.

An embodiment of the present invention further relates to an automatic working system, including the foregoing self-moving device.

In the foregoing automatic working system, the self-moving device is an automatic lawn mower.

In the foregoing automatic working system, the automatic working system is an automatic lawn mower.

An embodiment of the present invention further relates to an electronic device, including: a memory, configured to store a computer executable instruction; and a processor, configured to execute the computer executable instruction stored in the memory, to perform the foregoing positioning fault handling method for a self-moving device.

An embodiment of the present invention further relates to a computer readable storage medium, storing a computer program instruction, where when being executed by a computing apparatus, the computer program instruction may operate to perform the foregoing positioning fault handling method for a self-moving device.

Compared with the prior art, the beneficial effect of the foregoing embodiment is as follows: Based on a predetermined positioning fault handling strategy, the self-moving device is located by using precise positioning data at a time point before a positioning fault occurs, so that it can be ensured that an automatic working system accurately locates itself.

Exemplary electronic device Below, an electronic device according to an embodiment of the present invention is described with reference to FIG. 16. The electronic device may be an electronic device integrated in a mobile station of a self-moving device, or a standalone device independent of the mobile station. The standalone device may communicate with the mobile station, to implement the positioning fault handling method for a self-moving device according to the foregoing embodiment.

Figure 16:
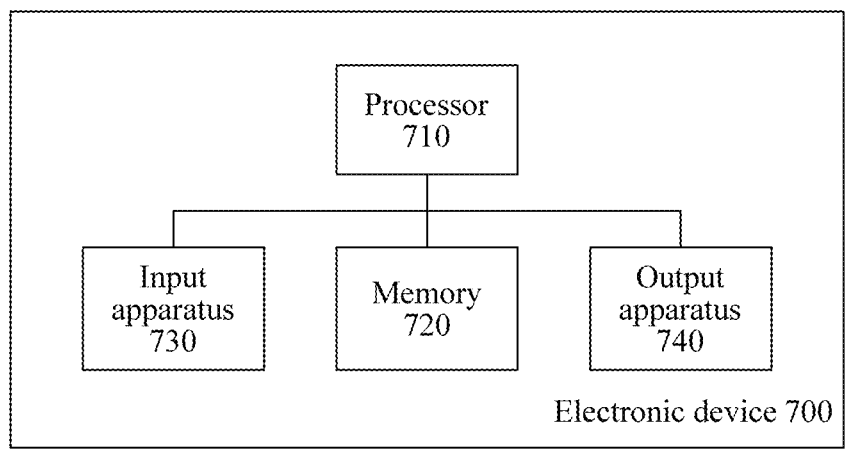
FIG. 16 is a schematic block diagram of an electronic device according to an embodiment of the present invention.

FIG. 16 is a schematic block diagram of an electronic device in this embodiment.

As shown in FIG. 16, an electronic device 700 includes one or more processors 710 and a memory 720.

The processor 710 may be a central processing unit (CPU) or another form of processing unit having a data processing capability and/or an instruction execution capability, and may control other components in the electronic device 700 to perform expected functions.

The memory 720 may include one or more computer program products. The computer program product may include various forms of computer readable storage media, for example, a volatile memory and/or a non-volatile memory. The volatile memory may include, for example, a random-access memory (RAM) and/or a cache. The non-volatile memory may include, for example, a read-only memory (ROM), a hard disk, and a flash memory. The computer readable storage medium may store one or more computer program instructions. The processor 710 may execute the program instruction to implement the foregoing positioning fault handling method for a self-moving device in the embodiments of the present invention and/or other expected functions. The computer readable storage medium may further store a variety of content such as a fault type and a predetermined fault handling strategy.

In an example, the electronic device 700 may further include an input apparatus 730 and an output apparatus 740. These components are interconnected through a bus system and/or another form of connection mechanism (not shown).

For example, the input apparatus 730 may be configured to receive an input from a user.

The output apparatus 740 may directly output a variety of information externally, or control a mobile station to send a signal.

Certainly, for simplicity, FIG. 16 shows only some of the components related to the present application in the electronic device 700, and components such as a bus, an input/output interface and the like are omitted. In addition, according to specific application, the electronic device 700 may further include any other appropriate component.

Exemplary Computer Program Product and Computer Readable Storage Medium

In addition to the foregoing method and device, an embodiment of the present application may further be a computer program product, including a computer program instruction, where when being executed by a processor, the computer program instruction enables the processor to perform the steps of the positioning fault handling method for a self-moving device according to various embodiments of the present invention described in the foregoing part "exemplary positioning fault handling method" in this specification.

In the computer program product, one or any combination of a plurality of programming languages may be used to compile a program code used to perform the operations in this embodiment of the present application. The programming languages include object-oriented programming languages such as Java and C++, and further include conventional procedural programming languages such as "C" language or similar programming languages. The program code may be completely executed on a user computing device, partially executed on user equipment, executed as an independent software package, partially executed on the user computing device and partially executed on a remote computing device, or completely executed on a remote computing device or server.

In addition, an embodiment of the present application may further be a computer readable storage medium, storing a computer program instruction, where when being executed by a processor, the computer program instruction enables the processor to perform the steps of the positioning fault handling method for a self-moving device according to various embodiments of the present invention described in the foregoing part "exemplary method" in this specification.

The computer readable storage medium may use one or any combination of a plurality of readable media. The readable medium may be a readable signal medium or a readable storage medium. The readable storage medium may include, but is not limited to, an electrical, magnetic, optical, electromagnetic, infrared or semiconductor system, apparatus or device or any combination of the foregoing. A more specific example (a nonexhaustive list) of the readable storage medium includes the following: an electrical connection with one or more leads, a portable disk, a hard disk, a RAM, a ROM, an erasable programmable ROM (EPROM or a flash memory), an optical fiber, a portable compact disc ROM (CD-ROM), an optical storage device, a magnetic storage device, or any suitable combination of the foregoing.

Schematic Method for Providing an Alarm about a Positioning Fault

As discussed above, to enable the automatic lawn mower to recognize a working region and save the trouble of arranging a boundary line, a method for generating a map of a working region may be used, coordinates (referred to as a map) of a boundary of the working region are stored, and a machine acquires its coordinates in real time to determine whether the machine is located inside the working region.

A process of acquiring the coordinates of the machine is as follows: A mobile station is installed on the machine and can receive a satellite positioning signal. To improve positioning precision, a fixed base station is installed to provide a positioning correction signal. The base station is fixed inside or outside the working region, receives the satellite positioning signal, generates a positioning correction signal, and sends the positioning correction signal to the mobile station.

However, during working, a self-moving device may fail to accurately locate itself for various reasons.

These reasons for exceptions may be categorized into several types in the following:

First, an exception occurs in the mobile station. The exception in the mobile station includes that the mobile station is damaged or the mobile station receives a weak satellite signal, and is reflected in two aspects:

First, an exception occurs in a data output. As discussed above, the mobile station is provided with a GPS module configured to receive a satellite signal and output coordinates. The GPS module has a check function that can determine whether an exception occurs in a data output.

Next, there is no data output. This may be acquired by a program, because no data is received.

Second, an exception occurs in a base station. A reason of the exception in the base station includes that the base station is offset, damaged or blocked, among other reasons. When the base station is offset, it indicates that the base station is supposed to be fixed, but during working, the base station may move under external impact (or for another reason). Herein, the base station can also recognize that the base station is offset, damaged or blocked, and notify the self-moving device by using a signal.

Third, an exception occurs in communication between the mobile station and the base station. As discussed above, a most common communication manner between the mobile station and the base station is radio station (or radio) communication. Certainly, a communication manner such as a cellular network, WiFi, and Bluetooth may alternatively be used. The exception in communication may be caused by damage in a communications module or a blocked signal.

Figure 17:
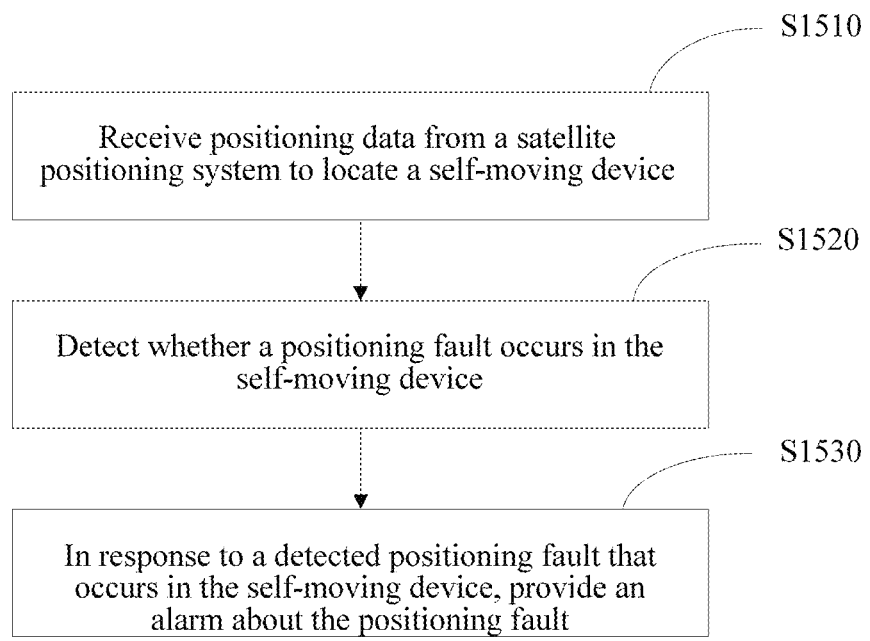
FIG. 17 is a schematic flowchart of a positioning fault handling method for a self-moving device according to an embodiment of the present invention.

FIG. 17 is a schematic flowchart of a method for providing an alarm about a positioning fault in a self-moving device according to an embodiment of the present invention. As shown in FIG. 17, in the method for providing an alarm about a positioning fault in a self-moving device in this embodiment, a self-moving device is configured to autonomously move, based on positioning of the self-moving device, inside a working region defined on a map. The method for providing an alarm about a positioning fault includes: S1510, receiving positioning data from a satellite positioning system to locate the self-moving device; S1520, detecting whether a positioning fault occurs in the self-moving device; and S1530, in response to a detected positioning fault that occurs in the self-moving device, providing an alarm about the positioning fault.

In this way, in the method for providing an alarm about a positioning fault in a self-moving device according to this embodiment, if it is detected that a positioning fault occurs in the self-moving device, an alarm may be provided to a user to enable the user to learn of a positioning fault that occurs in the self-moving device, so that the use of the user becomes more convenient.

In the foregoing method for providing an alarm about a positioning fault in a self-moving device, the providing an alarm about the positioning fault includes: providing an alarm locally at the self-moving device.

In the foregoing method for providing an alarm about a positioning fault in a self-moving device, the providing an alarm about the positioning fault includes: sending an alarm signal indicating the positioning fault in the self-moving device.

To be specific, the manner of providing an alarm about a positioning fault for the self-moving device may include providing an alarm locally and sending an alarm signal.

The providing an alarm locally may be providing an alarm about a positioning fault on the self-moving device in a manner such as an acoustic manner and an optical manner. In addition, the self-moving device may further include a display screen configured to display a positioning fault that occurs in the self-moving device and a fault detail.

Moreover, an alarm signal indicating the positioning fault in the self-moving device is sent, for example, is sent to a mobile phone of a user. The user may check, on the mobile phone, whether a positioning fault occurs in the self-moving device. Similarly, if the alarm signal indicating the positioning fault in the self-moving device includes a fault detail, the user may also check the fault detail on the mobile phone.

Therefore, in the method for providing an alarm about a positioning fault in a self-moving device according to this embodiment, the providing an alarm about the positioning fault includes: providing a fault detail of the positioning fault.

In the method for providing an alarm about a positioning fault in a self-moving device according to this embodiment, the fault detail may include various types of information related to the positioning fault. Specifically, the fault detail may include related information such as a fault type, a fault solution corresponding to the fault type, and the time and/or location of the fault. The location of the fault may be determined according to latest precise positioning data before the fault occurs, and may be displayed to a user for reference.

A possible fault type of the positioning fault in the self-moving device has been mentioned above, and a different fault type may be obtained through self-detection of the self-moving device. For example, the fault type may be acquired through the self-detection of the satellite positioning system such as a GPS module of the self-moving device or may be acquired by using a program installed in advance on the self-moving device. In addition, the self-moving device may perform self-detection based on a part in which the positioning fault occurs, a communication stage in which data flows in or out, and the like, to obtain the fault type of the positioning fault.

If an accurate fault type of the positioning fault in the self-moving device cannot be acquired, a possible fault type may be prompted.

In addition, for a different type of positioning fault, a possible fault type may further be determined according to a stage in which a fault occurs.

Therefore, in the method for providing an alarm about a positioning fault in a self-moving device according to this embodiment, the fault detail includes a fault type of the positioning fault.

Moreover, in the method for providing an alarm about a positioning fault in a self-moving device according to this embodiment, the fault detail includes a fault solution corresponding to the fault type.

In the foregoing method for providing an alarm about a positioning fault in a self-moving device, the fault type is self-detected by the self-moving device.

In the foregoing method for providing an alarm about a positioning fault in a self-moving device, the fault type is self-detected by the self-moving device based on at least one of the following: a part in which the positioning fault occurs; and a communication stage in which data flows in or out.

In the foregoing method for providing an alarm about a positioning fault in a self-moving device, the providing an alarm about the positioning fault includes: determining whether the fault type of the positioning fault can be determined; and in response to a failure to determine the fault type of the positioning fault, prompting a possible fault type.

In the foregoing method for providing an alarm about a positioning fault in a self-moving device, the fault detail includes at least one of the time and location of the positioning fault.

In addition, in the method for providing an alarm about a positioning fault in a self-moving device according to this embodiment, the fault detail may further include a customer service phone number of the self-moving device.

Correspondingly, after the fault type of the self-moving device is detected, a fault code corresponding to the fault type may be set in advance, so that the self-moving device may send the fault code to a background service center, for example, a post-sales service center of the self-moving device. In this way, based on the received fault code, the background service center may provide the fault solution corresponding to the fault type of the self-moving device.

To be specific, in the method for providing an alarm about a positioning fault in a self-moving device according to this embodiment, the fault detail includes a customer service phone number of the self-moving device.

In addition, in the method for providing an alarm about a positioning fault in a self-moving device according to this embodiment, the providing an alarm about the positioning fault includes: determining a fault code corresponding to the fault type of the positioning fault; sending the fault code to a background service center; and receiving the fault solution corresponding to the fault type from the background service center.

Moreover, the method for providing an alarm about a positioning fault in a self-moving device according to this embodiment further includes: in response to a detected positioning fault that occurs in the self-moving device, controlling the self-moving device to stop moving.

To be specific, if a positioning fault occurs in the self-moving device, when the self-moving device continues moving, an accurate position of the self-moving device cannot be determined. Therefore, to facilitate further operations of a user, the self-moving device is preferably controlled to stop. Meanwhile, to ensure the work safety of the self-moving device, so as to prevent the self-moving device from continuing moving in the case of a fault to leave the working region to cause a safety problem.

Below, an example of the fault solution is described.

In an example, the method for providing an alarm about a positioning fault in a self-moving device according to this embodiment further includes: in response to a detected positioning fault that occurs in the self-moving device, determining a time point before the positioning fault occurs in the self-moving device; acquiring precise positioning data at the time point; and locating, based on a predetermined positioning fault handling strategy, the self-moving device by using the precise positioning data.

Specifically, after it is detected that a positioning fault occurs in the self-moving device, because positioning data of the self-moving device at a time point before the positioning fault occurs is still precise positioning data, the precise positioning data at the time point is acquired, and the self-moving device may be located by using the precise positioning data. In this way, even if a positioning fault occurs in the self-moving device, it can still be ensured that the self-moving device accurately locates itself.

Further, as discussed above, positioning faults of the self-moving device may be categorized into several different types. Therefore, in a positioning fault handling method for a self-moving device in this embodiment, a different predetermined positioning fault handling strategy is further selected based on a type of the positioning fault to locate the self-moving device.

It is described below in detail how to select predetermined positioning fault handling strategies according to different types of positioning faults to use precise positioning data at a time point before a positioning fault occurs to locate the self-moving device.

First, for a positioning fault in a base station or a positioning fault in communication between the base station and the mobile station, a solution based on positioning correction data received at a time point before a fault occurs may be used.

As discussed above, the effect of the base station is to provide a reference point to a differential GPS system. Because a satellite positioning signal received by the mobile station/the base station drifts, and the base station is fixed, a positioning correction signal may be generated.

When an exception occurs in the base station or the mobile station cannot receive data of the base station, latest precise positioning correction data received before the exception occurs may be used to correct satellite positioning data of the mobile station. That is, latest precise data received before the exception occurs is used as the positioning correction data from the base station.

A virtual base station technology in this embodiment is further described below.

As discussed above, in this embodiment, the mobile station 15 receives a satellite signal by using a GPS antenna of the mobile station. The satellite signal includes an angle, a clock, and the like of a satellite.

The mobile station 15 further includes a data storage unit and a data correction processing unit. The data storage unit is configured to store data of a virtual base station and satellite data that is received in real time. The data correction processing unit is configured to compute and correct, based on the data of the virtual base station, the satellite data that is received in real time, to obtain high precision positioning data. A satellite signal receiver is a GPS receiver configured to receive a GNSS signal. The GPS receiver may communicate with a group of satellites to receive signals that indicate an actual position of the GPS receiver from the satellites. The data correction processing unit processes the received satellite signals, and generates a signal, that is, a first position signal, that indicates a current position of the automatic lawn mower 1. The processing process is a process of correcting the coordinates of the automatic lawn mower based on a differential GPS reference with known precise coordinates. The obtained first position signal is a DGPS signal.

In the prior art, a base station is disposed, and a satellite signal obtained by the base station in real time is used to perform correction processing on the satellite signal received by the mobile station. The objective of the base station is to provide observed values of some satellites in real time, and the mobile station calculates positioning data based on its own observed values by using an RTK technology. In view of that within a short time, the states of the ionosphere, the environment, and the like change relatively slowly, it is considered that an error is relatively small within a relatively short time (approximately within 1 hour). Therefore, a machine may acquire satellite data at a point with a relatively strong signal. Meanwhile, the point is used as a virtual base station, and data at the point is used as a short-term base station data to perform RTK calculation, to obtain high precision positioning of the mobile station. In this manner, base station construction and communications links in the conventional RTK technology are omitted, and the costs are greatly reduced.

In this embodiment, the position of the self-moving device at a time point before a positioning fault occurs is a fixed physical position, and is therefore used as a virtual base station point.

In this way, if a positioning fault occurs in the automatic lawn mower 1, satellite data received at the time point before the positioning fault occurs is stored in the mobile station 15 as the data of the virtual base station. As the automatic lawn mower 1 continues moving, RTK calculation is performed on satellite data that is received by the mobile station 15 in real time and the data of the virtual base station, to obtain high precision positioning data.

In addition, to obtain more accurate positioning data, at least one fixed mark point may further be set in the working region. These marks may be made in an RFID manner, a Hall sensor manner, and the like. These fixed mark points are manually or automatically made, so that fixed reference coordinates are obtained for the fixed mark points (for example, if the position of the self-moving device at a time point before a positioning fault occurs is a point (x0, y0), the physical mark point is a point (x, y1)). When the automatic lawn mower 1 reaches these physical mark points, the data correction processing unit corrects the coordinate data and current coordinate data, to obtain more precise positioning data.

In addition, the mobile station 15 further includes an error evaluation unit. Because the ionosphere, the environment, and the like still change slowly, after the automatic lawn mower 1 works for a long time, the positioning precision slowly decreases. Therefore, an error evaluation needs to be acquired for the positioning precision. The error evaluate may be determined according to information such as a geographical position, a positioning work time, a current actual time. A predetermined threshold is set in the error evaluation unit. When an error evaluation exceeds the predetermined threshold, it is concluded that the positioning precision is relatively low.

In addition to a positioning fault handling strategy based on positioning correction data, as discussed above, the self-moving device further includes a navigation positioning system such as an inertial navigation system other than a satellite positioning system such as a GPS system. Herein, the inertial navigation system is configured to perform operation by using a known starting position and combining a movement parameter (for example, an acceleration and an angle) of the self-moving device, to obtain a travel path and a rotation angle of the self-moving device, so as to obtain the current position of the self-moving device. The inertial navigation system usually includes an odometer, an accelerator, a compass, a gyroscope, and the like.

Therefore, in the self-moving device in this embodiment, the inertial navigation system may be used to locate the self-moving device by using the precise positioning data of the self-moving device received at the time point before the positioning fault occurs.

Specifically, if the self-moving device cannot obtain precise positioning by using a satellite positioning system such as a differential GPS system, the latest precise position coordinates of the self-moving device at the time point before the positioning fault occurs are used as a starting point and a data output of the inertial navigation system is combined to calculate the current position coordinates of the self-moving device.

In the self-moving device in this embodiment, the inertial navigation system and the satellite positioning system are integrated in real time to perform positioning. Therefore, if it is detected that a positioning fault occurs in the self-moving device, the weight of the inertial navigation system is increased. Certainly, a person skilled in the art may understand that the weight of the inertial navigation system may alternatively be increased to 1. That is, the satellite positioning system is not used, but the inertial navigation system alone is used to perform positioning.

In addition, in the self-moving device in this embodiment, in addition to the inertial navigation system, another positioning system such as a UWB positioning system, a capacitance detection system, and an image recognition system may alternatively be used as an assisted positioning system. In the UWB positioning system, several transmitters are erected, and one receiver is placed on the self-moving device to implement precise positioning. The capacitance detection system determines the condition of a working ground according to the humidity of a contact surface. The condition of the working ground is, for example, whether the working ground is a lawn. The capacitance detection system can ensure that the self-moving device is still in the working region when a GPS signal is poor, for example, ensure that the lawn mower can still work on the lawn without crossing a boundary. In the image recognition system, several cameras are installed on the self-moving device and configured to recognize the condition of a working object. For example, the condition of the working object is whether the working object is a lawn. When a GPS signal is poor, it is ensured that the self-moving device is still in the working region, for example, ensure that the lawn mower can still work on the lawn without crossing the boundary.

In addition, in the self-moving device in this embodiment, an assisted positioning system other than the satellite positioning system is applicable to any case in which the self-moving device cannot obtain precise positioning by using a satellite positioning system. Therefore, the method may be used as a supplement to a predetermined positioning fault handling strategy that uses data of a virtual base station, and may be separately used as a predetermined positioning fault handling strategy.

Certainly, the foregoing mentioned positioning fault handling strategy is only an example.

Schematic Self-Moving Device and Automatic Working System

Figure 18:
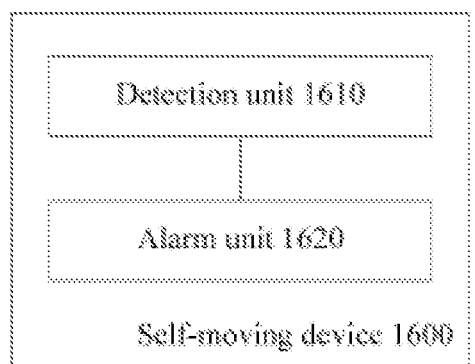
FIG. 18 is a schematic block diagram of a self-moving device according to an embodiment of the present invention.

FIG. 18 is a schematic block diagram of a self-moving device according to an embodiment of the present invention.

As shown in FIG. 18, a self-moving device 1600 according to this embodiment of the present invention is configured to autonomously move, based on positioning of the self-moving device, inside a working region defined on a map, and includes: a detection unit 1610, configured to detect whether a positioning fault occurs in the self-moving device; and an alarm unit 1620, configured to: in response to a positioning fault that occurs in the self-moving device and is detected by the detection unit 1610, provide an alarm about the positioning fault.

In an example, in the foregoing self-moving device 1600, the alarm unit 1620 is configured to provide an alarm locally at the self-moving device.

In an example, in the foregoing self-moving device 1600, the alarm unit 1620 is configured to send an alarm signal indicating the positioning fault in the self-moving device.

In an example, in the foregoing self-moving device 1600, the alarm unit 1620 is configured to provide a fault detail of the positioning fault.

In an example, in the foregoing self-moving device 1600, the fault detail includes a fault type of the positioning fault.

In an example, in the foregoing self-moving device 1600, the fault detail includes a fault solution corresponding to the fault type.

In an example, in the foregoing self-moving device 1600, the fault type is self-detected by the self-moving device 1600.

In an example, in the foregoing self-moving device 1600, the fault type is self-detected by the self-moving device 1600 based on at least one of the following: a part in which the positioning fault occurs; and a communication stage in which data flows in or out.

In an example, in the foregoing self-moving device 1600, the alarm unit 1620 is configured to: determine whether the fault type of the positioning fault can be determined; and in response to a failure to determine the fault type of the positioning fault, prompt a possible fault type.

In an example, in the foregoing self-moving device 1600, the fault detail includes at least one of the time and location of the positioning fault.

In an example, in the foregoing self-moving device 1600, the fault detail includes a customer service phone number of the self-moving device 1600.

In an example, in the foregoing self-moving device 1600, the alarm unit 1620 is configured to: determine a fault code corresponding to the fault type of the positioning fault; send the fault code to a background service center; and receive the fault solution corresponding to the fault type from the background service center.

In an example, the foregoing self-moving device 1600 further includes a control unit, configured to: in response to the detected positioning fault that occurs in the self-moving device, control the self-moving device to stop moving.

Herein, a person skilled in the art may understand that other details of the units of the self-moving device in this embodiment are identical with corresponding details of the method for providing an alarm about a positioning fault in a self-moving device in the embodiment of the present invention described above, and are not described again herein to avoid redundancy.

An embodiment of the present invention further relates to an automatic working system, including the foregoing self-moving device.

In the foregoing automatic working system, the self-moving device is an automatic lawn mower.

In the foregoing automatic working system, the automatic working system is an automatic lawn mower.

An embodiment of the present invention further relates to an electronic device, including: a memory, configured to store a computer executable instruction; and a processor, configured to execute the computer executable instruction stored in the memory, to perform the foregoing method for providing an alarm about a positioning fault in a self-moving device.

An embodiment of the present invention further relates to a computer readable storage medium, storing a computer program instruction, where when being executed by a computing apparatus, the computer program instruction may operate to perform the foregoing method for providing an alarm about a positioning fault in a self-moving device.

Compared with the prior art, the beneficial effect of the embodiments of the present invention is as follows: When a positioning fault in the self-moving device is detected, an alarm about the positioning fault is provided, so that a positioning exception in the self-moving device can be notified to a user.

Exemplary Electronic Device

Below, an electronic device according to an embodiment of the present invention is described with reference to FIG. 19. The electronic device may be an electronic device integrated in a mobile station of a self-moving device, or a standalone device independent of the mobile station. The standalone device may communicate with the mobile station, to implement a method for providing an alarm about a positioning fault in a self-moving device according to an embodiment of the present invention.

Figure 19:
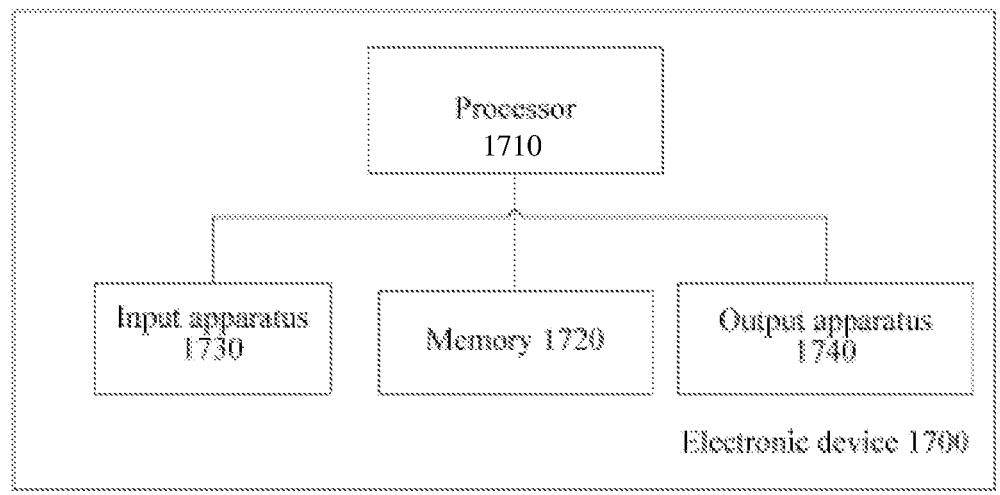
FIG. 19 is a schematic block diagram of an electronic device according to an embodiment of the present invention.

FIG. 19 is a schematic block diagram of an electronic device according to an embodiment of the present invention.

As shown in FIG. 19, an electronic device 1700 includes one or more processors 1710 and a memory 1720.

The processor 1710 may be a CPU or another form of processing unit having a data processing capability and/or an instruction execution capability, and may control other components in the electronic device 1700 to perform expected functions.

The memory 1720 may include one or more computer program products. The computer program product may include various forms of computer readable storage media, for example, a volatile memory and/or a non-volatile memory. The volatile memory may include, for example, a RAM and/or a cache. The non-volatile memory may include, for example, a ROM, a hard disk, and a flash memory. The computer readable storage medium may store one or more computer program instructions. The processor 1710 may execute the program instruction to implement the foregoing method for providing an alarm about a positioning fault in a self-moving device in the embodiments of the present invention and/or other expected functions. The computer readable storage medium may further store a variety of content such as a fault type and a predetermined fault solution.

In an example, the electronic device 1700 may further include an input apparatus 1730 and an output apparatus 1740. These components are interconnected through a bus system and/or another form of connection mechanism (not shown).

For example, the input apparatus 1730 may be configured to receive an input from a user.

The output apparatus 1740 may directly output a variety of information externally, or control a mobile station to send a signal.

Certainly, for simplicity, FIG. 19 shows only some of the components related to the present application in the electronic device 1700, and components such as a bus, an input/output interface and the like are omitted. In addition, according to specific application, the electronic device 1700 may further include any other appropriate component.

Exemplary Computer Program Product and Computer Readable Storage Medium

In addition to the foregoing method and device, an embodiment of the present application may further be a computer program product, including a computer program instruction, where when being executed by a processor, the computer program instruction enables the processor to perform the steps of the method for providing an alarm about a positioning fault in a self-moving device according to various embodiments of the present invention described in the foregoing part "exemplary method for providing an alarm about a positioning fault" in this specification.

In the computer program product, one or any combination of a plurality of programming languages may be used to compile a program code used to perform the operations in this embodiment of the present application. The programming languages include object-oriented programming languages such as Java and C++, and further include conventional procedural programming languages such as "C" language or similar programming languages. The program code may be completely executed on a user computing device, partially executed on user equipment, executed as an independent software package, partially executed on the user computing device and partially executed on a remote computing device, or completely executed on a remote computing device or server.

In addition, an embodiment of the present application may further be a computer readable storage medium, storing a computer program instruction, where when being executed by a processor, the computer program instruction enables the processor to perform the steps of the method for providing an alarm about a positioning fault in a self-moving device according to various embodiments of the present invention described in the foregoing part "exemplary method for providing an alarm about a positioning fault" in this specification.

The computer readable storage medium may use one or any combination of a plurality of readable media. The readable medium may be a readable signal medium or a readable storage medium. The readable storage medium may include, but is not limited to, an electrical, magnetic, optical, electromagnetic, infrared or semiconductor system, apparatus or device or any combination of the foregoing. A more specific example (a nonexhaustive list) of the readable storage medium includes the following: an electrical connection with one or more leads, a portable disk, a hard disk, a RAM, a ROM, an EPROM (or a flash memory), an optical fiber, a portable CD-ROM, an optical storage device, a magnetic storage device, or any suitable combination of the foregoing.

The map generation method and apparatus for an automatic working system and the automatic working system in the embodiments of the present invention are described below with reference to the accompanying drawings.

Figure 20:
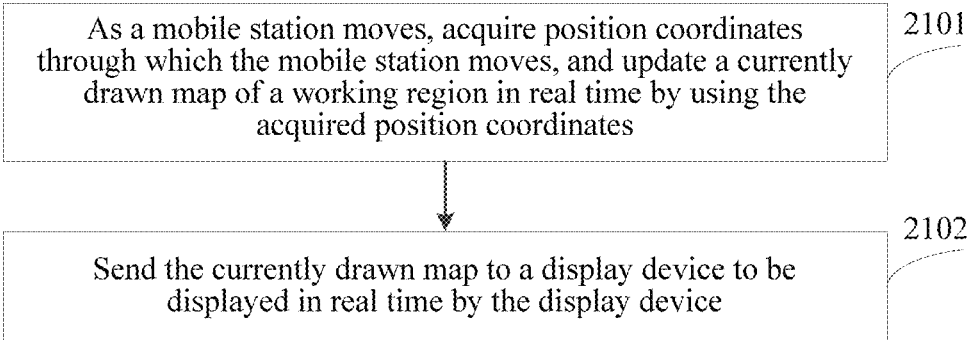
FIG. 20 is a schematic flowchart of a first map generation method for an automatic working system according to an embodiment of the present invention.

FIG. 20 is a schematic flowchart of a first map generation method for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring positioning information to generate the map.

The self-moving device may be an unattended device such as an automatic lawn mower, an automatic cleaning device, an automatic irrigation device, and an automatic snowplow.

Further, the automatic working system may further include a base station. The base station and the mobile station both receive a satellite signal, and the base station sends a positioning correction signal to the mobile station, to implement differential satellite positioning. For example, the base station and the mobile station may receive a GPS positioning signal to implement DGPS positioning. Alternatively, the base station and the mobile station may receive a Galileo satellite navigation system positioning signal, a Beidou satellite navigation system positioning signal, a GLONASS positioning signal or the like. This is not limited in this embodiment of the present invention.

In this embodiment of the present invention, an example in which the base station and the mobile station receive a GPS positioning signal is used.

In this embodiment of the present invention, the base station may include a satellite signal receiver, configured to receive the GPS positioning signal sent by a satellite; a signal processor, configured to generate a positioning correction signal according to the GPS positioning signal received by the satellite signal receiver; a wireless data transmission module, configured to send a positioning correction signal to the mobile station; and an indicator, configured to output an indication showing whether a satellite signal at a current position is desirable.

The wireless data transmission module may include a radio station and a radio station antenna. Further, to ensure reliable long-distance transmission between the base station and the mobile station, the wireless data transmission module may further include a Sub-1G module, a WiFi module, and a 2G/3G/4G/5G module. This is not limited.

Optionally, the base station may be disposed at a charging station, and is integrated with the charging station, and therefore the base station may be powered by the charging station. Certainly, the base station may be disposed separately from the charging station, for example, may be disposed at a position such as a roof where a satellite signal can be better received, and therefore the base station is powered in another manner. This is not limited.

Correspondingly, the mobile station may also include: a housing; a satellite signal receiver, configured to receive a GPS positioning signal sent by a satellite; a signal processor, configured to process the GPS positioning signal received by the satellite signal receiver; a wireless data transmission module, configured to receive a positioning correction signal sent by the base station, where the wireless data transmission module may include a radio station and a radio station antenna; and an indicator, configured to output an indication showing whether a satellite signal at a current position is desirable.

In this embodiment of the present invention, the mobile station may further integrate an inertial navigation apparatus, and the inertial navigation apparatus is configured to output inertial navigation data. When the mobile station is working, only the GPS positioning signal may be used for navigation, or a positioning signal obtained by combining a GPS positioning signal and inertial navigation data may be used for navigation, or, when the GPS positioning signal is weak, only inertial navigation data may be used for navigation.

In this embodiment of the present invention, the mobile station may be detachably connected to the housing of the self-moving device. Specifically, the mobile station may include a first interface connected to the housing of the self-moving device. When the self-moving device is working, the mobile station is installed at the housing of the self-moving device. When being connected to the housing of the self-moving device, the mobile station may be electrically connected to a control module of the self-moving device. The mobile station outputs current position coordinates of the self-moving device, so that the control module may control, according to the current position of the self-moving device, the self-moving device to move and work. Alternatively, the mobile station outputs a control instruction according to the current position coordinates, and the control module of the self-moving device controls, based on the control instruction, the self-moving device to move or work.

It should be noted that in this embodiment of the present invention, the mobile station may include an independent power supply module. When being separated from the housing of the self-moving device, the mobile station may work independently.

As shown in FIG. 20, the map generation method for an automatic working system includes the following steps.

An execution body in this embodiment of the present invention is a mobile station.

Step 2101: As the mobile station moves, acquire position coordinates through which the mobile station moves, and update a currently drawn map of a working region in real time by using the acquired position coordinates.

Specifically, the mobile station may be controlled to move along a boundary of the working region. As the mobile station moves, the position coordinates through which the mobile station moves are acquired, and the currently drawn map of the working region is updated in real time by using the acquired position coordinates.

In this embodiment of the present invention, the working region may include an outer boundary and an inner boundary. For example, when a self-moving device is an automatic lawn mower, a flower bed, a bush, and the like may exist in the working region. Therefore, in this embodiment of the present invention, to draw the map of the working region, the mobile station may be controlled to move along the outer boundary of the working region and/or the inner boundary of the working region.

In a possible implementation of this embodiment of the present invention, to record the map, a user may carry the mobile station to move along the boundary of the working region.

For example, the mobile station may be separated from the housing of the self-moving device, the mobile station works independently, and the user holds the mobile station and walks to record the map. The recording a map includes the following steps: The user may start to walk along the boundary of the working region from a starting point, for example, a position of a charging station, and the mobile station may record position coordinates of the boundary. The user walks along an obstacle in the working region, and the mobile station may record position coordinates of the obstacle. The user walks along a traffic island in the working region, and the mobile station may record position coordinates of the traffic island. The user walks along a passage connecting sub-working regions of the working region, and the mobile station may record position coordinates of the passage.

It should be noted that when the user holds the mobile station and moves, with the shaking of a hand, the mobile station may tilt around to severely interfere with an inertial navigation apparatus. Therefore, in this embodiment of the present invention, when the user holds the mobile station to record a map, the inertial navigation apparatus may be in an off state.

Alternatively, the mobile station may be separated from the housing of the self-moving device. To record a map, the mobile station is placed on a push device. For example, the mobile station may be installed on a hand-propelled device, so that the user may push a cart and walk to record the boundary of the working region, an obstacle, a passage or the like.

Alternatively, the self-moving device may include a pushing rod detachably installed at the housing of the self-moving device. To record a map, the mobile station is installed on the self-moving device, the pushing rod is installed at the housing of the self-moving device, and the user operates the pushing rod to push the self-moving device to move, so that the mobile station may record the boundary of the working region, an obstacle, a passage or the like.

In another possible implementation of this embodiment of the present invention, a detection signal may be transmitted externally by using the mobile station or a carrier of the mobile station, to detect a biometric feature signal of a user. The user moves along the boundary of the working region, and the biometric feature signal is a signal generated by the user. The biometric feature signal is followed to control the mobile station to move along the boundary of the working region.

For example, the self-moving device may include an ultrasonic apparatus, so that the self-moving device may follow the user at a distance. To record a map, the mobile station is installed on the self-moving device, the user walks along the boundary of the working region, an obstacle, a passage or the like, and then the self-moving device may follow the user, so that the mobile station may record a map.

In this embodiment of the present invention, when the mobile station starts to move from a starting point of movement, a currently drawn map may be updated by using currently acquired position coordinates. The map may include partial map information of the working region. Next, the mobile station may move along the boundary of the working region. As the mobile station moves, position coordinates through which the mobile station moves may be acquired in real time, and the currently drawn map of the working region is updated in real time by using the acquired position coordinates, so that the map of the working region can be dynamically maintained and supplemented.

Step 2102: Send the currently drawn map to a display device to be displayed in real time by the display device.

In this embodiment of the present invention, as the mobile station moves, the currently drawn map of the working region may be updated in real time by using the acquired position coordinates, and the currently drawn map is displayed. Specifically, the currently drawn map may be sent to the display device to be displayed in real time by the display device, so that the user can check the map in real time during map drawing.

After the mobile station finishes moving along the boundary of the working region, the currently drawn map may be updated by using the acquired position coordinates to generate the map of the working region. Further, based on a visual map, the user can conveniently make a modification or a mark on the map, making the map more accurate.

In a possible implementation, the display device may be an intelligent terminal of the user, and the intelligent terminal of the user may be used to display the currently drawn map. Specifically, to make it convenient for the user to hold both the mobile station and the intelligent terminal, the mobile station may include a second interface for connecting to the intelligent terminal of the user, so that the intelligent terminal may be installed on the mobile station through the second interface. The second interface may include an electrical interface, so that when being installed on the mobile station, the intelligent terminal is electrically connected to the mobile station.

In this embodiment of the present invention, the mobile station may wirelessly communicate with the intelligent terminal by using a wireless data transmission module. A manner of the wireless communication may be, for example, WiFi, a cellular network or Bluetooth. To record a map, the intelligent terminal is installed on the mobile station, the mobile station may send map data recorded in real time to the intelligent terminal, so that the intelligent terminal may display in real time the data recorded by the mobile station.

Further, the mobile station may further include several buttons configured to input instructions such as "Record a map" and "Complete recording".

In another possible implementation, to make it convenient for the user to check the drawn map in real time, in this embodiment of the present invention, the mobile station may include a display screen. The currently drawn map may be displayed in real time on the display screen of the mobile station to enable the user to intuitively check the currently drawn map in real time, thereby effectively improving user experience. Further, if the map is drawn inaccurately or there is a deviation due to a weak positioning signal, the user may make an adjustment in time, for example, correct the map or change a walking manner.

In the map generation method for an automatic working system in this embodiment, as a mobile station moves, position coordinates through which the mobile station moves are acquired, and a currently drawn map of a working region is updated in real time by using the acquired position coordinates; and the currently drawn map is sent to a display device to be displayed in real time by the display device. In this embodiment, during map drawing, the currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

In this embodiment of the present invention, before the currently drawn map of the working region is updated in real time by using the acquired position coordinates, a drawing instruction may be received from the user, so that the map is drawn according to the drawing instruction of the user. The user triggers the drawing instruction to draw the map, so that the flexibility of the method can be effectively improved.

In this embodiment of the present invention, an APP on the mobile station/intelligent terminal may further acquire a map image of the working region. For example, the map image of the working region may be acquired from an electronic map such as Google Map. Next, coordinate systems of the currently drawn map and the map image are aligned, and the currently drawn map is displayed on the map image for displaying by the display device.

In this embodiment of the present invention, a satellite positioning system is used for positioning, the mobile station acquires latitude and longitude coordinates, and coordinates on an electronic map are also latitude and longitude coordinates. Therefore, the position coordinates acquired by the mobile station may be displayed on the electronic map in real time.

Further, the currently drawn map is displayed on the map image, so that the user may check, based on the display screen of the intelligent terminal or the display screen of the mobile station, the map displayed on the map image, and when the displayed map is incorrect, the user may make an adjustment in time, for example, correct the map or change a walking manner.

In this embodiment of the present invention, after the display device displays the currently drawn map, the user may further correct as required the map currently displayed on the display device. Specifically, when the currently drawn map is displayed on the display screen of the mobile station, the user may input an adjustment instruction on the display screen of the mobile station. Correspondingly, after receiving the adjustment instruction, the mobile station may correct the currently displayed map by using the adjustment instruction. Alternatively, when the currently drawn map is displayed on the display screen of the intelligent terminal, the user may input an adjustment instruction on the display screen of the intelligent terminal. Correspondingly, after receiving the adjustment instruction, the intelligent terminal may correct the currently displayed map by using the adjustment instruction.

Figure 21:
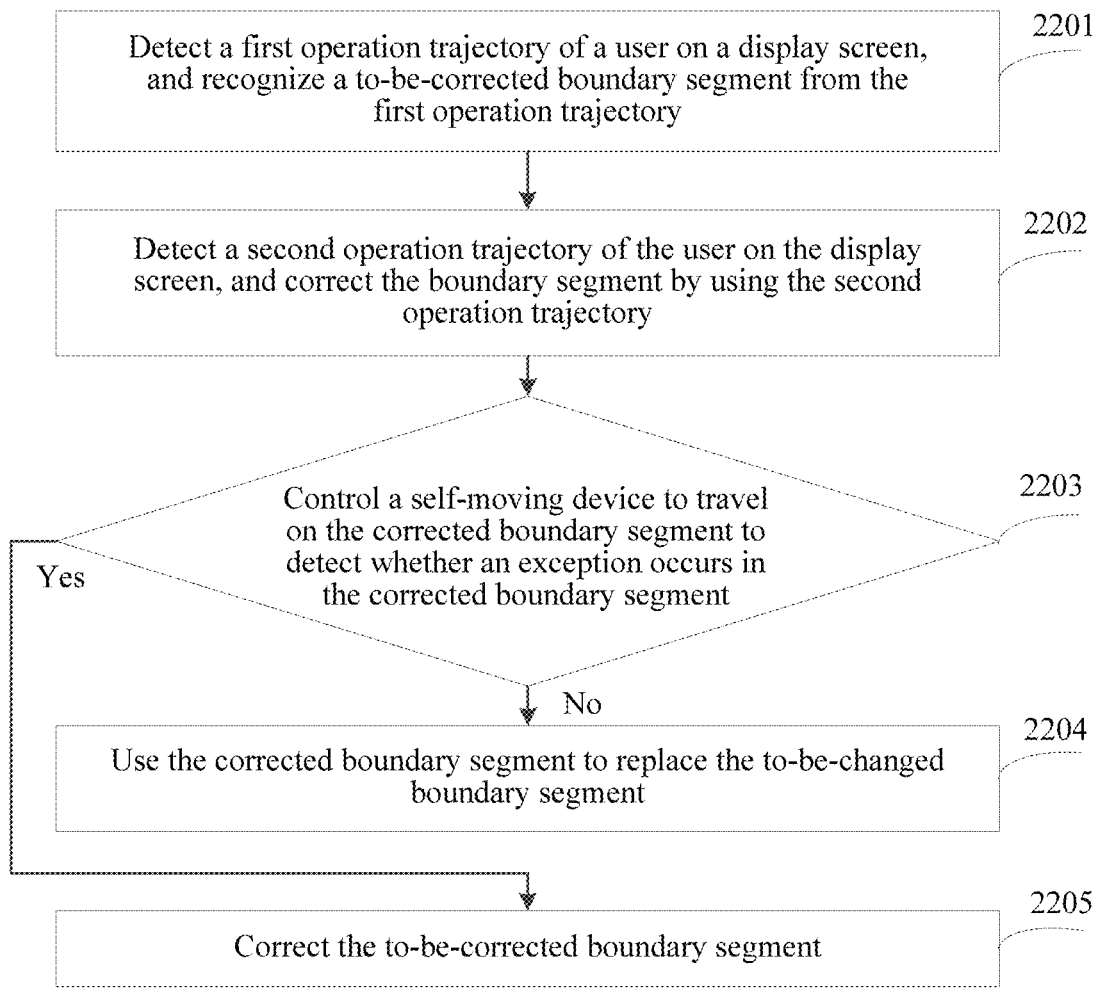
FIG. 21 is a schematic flowchart of a second map generation method for an automatic working system according to an embodiment of the present invention.

In a possible implementation, referring to FIG. 21, that the mobile station or the intelligent terminal receives an adjustment instruction input by a user via a display screen, and corrects a currently displayed map according to the adjustment instruction may specifically include the following steps.

Step 2201: Detect a first operation trajectory of a user on the display screen, and recognize a to-be-corrected boundary segment from the first operation trajectory.

In this embodiment of the present invention, the to-be-corrected boundary segment is a boundary segment that needs to be corrected.

It should be noted that after a map is generated, the map may need to be corrected. For example, when the self-moving device is an automatic lawn mower, a lawn, for example, a region A shown in FIG. 22, in a working region turns into a non-working region for another purpose of a user. Alternatively, as the self-moving device travels on trial, it is found that coordinates of a boundary on the map are incorrect. Therefore, in this embodiment of the present invention, when the map needs to be corrected, the user may use a finger to continuously move on the display screen to define the to-be-corrected boundary segment.

Figure 22:
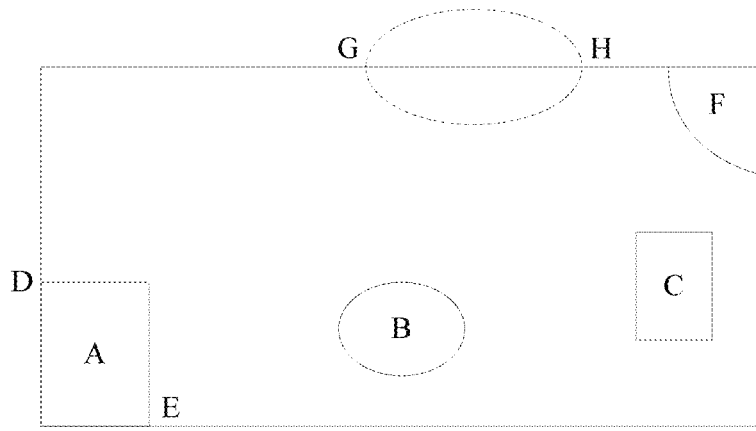
FIG. 22 is a schematic diagram of a boundary of a working region according to an embodiment of the present invention.

In an example, FIG. 22 is a schematic diagram of a boundary of a working region according to an embodiment of the present invention. For a region A, the user may manually define a to-be-corrected boundary segment DE on the display screen.

Step 2202: Detect a second operation trajectory of the user on the display screen, and correct the boundary segment by using the second operation trajectory.

It should be noted that the to-be-corrected boundary segment defined by the user by using the first operation trajectory on the display screen may fail to completely coincide an actual boundary segment that needs to be corrected. Therefore, in this embodiment of the present invention, according to the second operation trajectory of the user on the display screen, the boundary segment may be corrected by using the second operation trajectory.

For example, when the to-be-corrected boundary segment defined by the first operation trajectory of the user on the display screen is beyond the actual boundary segment that needs to be corrected, in this case, the second operation trajectory on the display screen may be used to drag inwardly the to-be-corrected boundary segment recognized from the first operation trajectory, so that the to-be-corrected boundary segment recognized from the first operation trajectory completely coincides with the actual boundary segment that needs to be corrected.

Step 2203: Control the self-moving device to travel on the corrected boundary segment to detect whether an exception occurs in the corrected boundary segment, and if yes, perform step 2205, or otherwise, perform step 2204.

In this embodiment of the present invention, after manually defining the to-be-corrected boundary segment, the user needs to control the self-moving device to travel on the corrected boundary segment to detect whether an exception occurs in the corrected boundary segment. When no exception occurs in the boundary segment, the corrected boundary segment may be directly used to replace the to-be-changed boundary segment. When an exception occurs in the boundary segment, the to-be-corrected boundary segment may be corrected.

It should be noted that when the self-moving device should stop working when travelling on the corrected boundary segment. For example, when the self-moving device is an automatic lawn mower, a cutter head may be turned off to prevent the cutter head from being damaged when an exception occurs in the boundary.

Step 2204: Use the corrected boundary segment to replace the to-be-changed boundary segment.

Step 2205: Correct the to-be-corrected boundary segment.

In the map generation method for an automatic working system in this embodiment, a first operation trajectory of a user on the display screen is detected, a to-be-corrected boundary segment is recognized from the first operation trajectory, a second operation trajectory of the user on the display screen is detected, the boundary segment is corrected by using the second operation trajectory, a self-moving device is controlled to travel on the corrected boundary segment to detect whether an exception occurs in the corrected boundary segment, and if yes, the to-be-corrected boundary segment is corrected, or otherwise, the corrected boundary segment is used to replace the to-be-changed boundary segment. Accordingly, map generation accuracy may further be improved. In addition, a user specifies the to-be-corrected boundary segment, so that the flexibility of the method can be improved.

Figure 23:
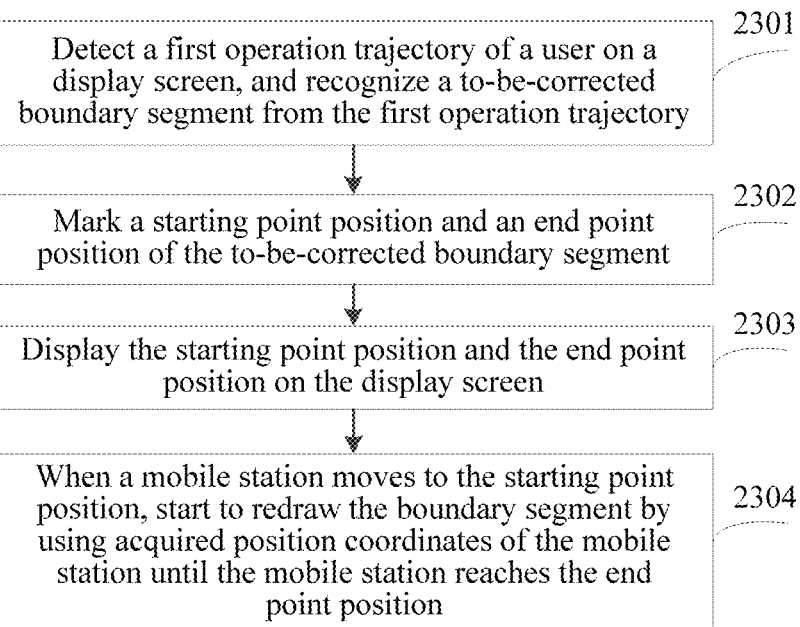
FIG. 23 is a schematic flowchart of a third map generation method for an automatic working system according to an embodiment of the present invention.

In a possible implementation, referring to FIG. 23, that the mobile station or the intelligent terminal receives an adjustment instruction input by a user via a display screen, and corrects a currently displayed map according to the adjustment instruction may specifically include the following steps.

Step 2301: Detect a first operation trajectory of a user on the display screen, and recognize a to-be-corrected boundary segment from the first operation trajectory.

Step 2302: Mark a starting point position and an end point position of the to-be-corrected boundary segment.

Step 2303: Display the starting point position and the end point position on a display screen.

Step 2304: When the mobile station moves to the starting point position, start to redraw the boundary segment by using acquired position coordinates of the mobile station until the mobile station reaches the end point position.

In this embodiment of the present invention, when defining a to-be-corrected boundary segment, a user may mark a starting point position and an end point position of the to-be-corrected boundary segment, so as to control the mobile station to start from the starting point position to move again along the boundary of the working region to the end point position. As the mobile station moves, position coordinates through which the mobile station moves are acquired in real time, and the acquired position coordinates are used to correct a currently displayed map.

In the map generation method for an automatic working system in this embodiment, a first operation trajectory of a user on a display screen is detected, a to-be-corrected boundary segment is recognized from the first operation trajectory, a starting point position and an end point position of the to-be-corrected boundary segment are marked, the starting point position and the end point position are displayed on the display screen, and when the mobile station moves to the starting point position, a boundary segment starts to be redrawn by using acquired position coordinates of the mobile station until the mobile station reaches the end point position. Accordingly, map generation accuracy may further be improved. In addition, the user specifies the to-be-corrected boundary segment, so that the flexibility of the method can be improved.

In this embodiment of the present invention, when the self-moving device travels according to the map of the working region, if an exception occurs, an alarm instruction may be sent to the mobile station. The alarm instruction is sent an exception occurs as the self-moving device travels according to the map of the working region. Correspondingly, after receiving the alarm instruction sent by the self-moving device, the mobile station may adjust the map of the working region according to the alarm instruction, so that map generation accuracy can be further improved.

For example, when the self-moving device travels according to the map of the working region, if the self-moving device encounters an obstacle in the working region, in this case, the alarm instruction may be sent to the mobile station, so that the mobile station may adjust the map of the working region according to the alarm instruction.

Figure 24:
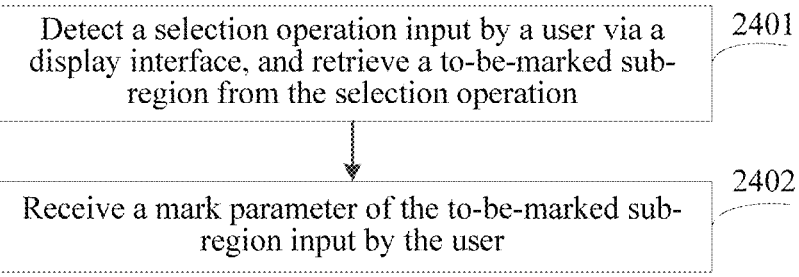
FIG. 24 is a schematic flowchart of a fourth map generation method for an automatic working system according to an embodiment of the present invention.

In a possible implementation, referring to FIG. 24, based on the embodiment shown in FIG. 20, after step 104, the map generation method for an automatic working system may further include the following steps.

Step 2401: Detect a selection operation input by a user via a display interface, and retrieve a to-be-marked sub-region from the selection operation.

In this embodiment of the present invention, the selection operation may be an operation such as a click and a movement.

In this embodiment of the present invention, the user may further make a mark on the map according to an actual scenario of the working region.

Optionally, the selection operation of the user may be monitored in real time. When it is detected that a finger of the user continuously moves on a screen to draw, for example, a square, a circle, and an ellipse, a to-be-marked sub-region may be determined according to a movement trajectory of the user.

Step 2402: Receive a mark parameter of the to-be-marked sub-region input by the user. In this embodiment of the present invention, the mark parameter may include a time period and/or a preset condition of permitting/forbidding entry of the self-moving device.

For example, when the self-moving device is an automatic lawn mower, referring to FIG. 22, it is assumed that the self-moving device cannot work between 6 am to 8 am each day in a region B in the working region because old people and children exercise in the region B in this time period. Therefore, after the region B is determined, the mark parameter input by the user may be received, and the mark parameter may be: a time period of forbidding entry of the self-moving device is 6:00:00 to 8:00:00.

Further, the mark parameter may further include danger description information and/or movement manner information of the self-moving device.

For example, when the self-moving device is an automatic lawn mower, referring to FIG. 22, it is assumed that a region C in the working region is a dangerous region. Therefore, after the region C is determined, a mark parameter input by the user may be received. The mark parameter may be danger description information, for example, "Region C is dangerous. Keep away!" Alternatively, it is set that a region F is another region in which the self-moving device needs to work carefully, or it is set that a boundary segment GH is a slope. When the self-moving device is near, the self-moving device needs to slow down, steer, or perform another action. Therefore, after the region F and the boundary segment GH are determined, a mark parameter input by the user may be received. The mark parameter may be movement manner information of the self-moving device.

In the map generation method for an automatic working system in this embodiment, a selection operation input by a user via a display interface is detected, a to-be-marked sub-region is retrieved from the selection operation, and a mark parameter of the to-be-marked sub-region input by the user is received. In this embodiment, the user may make a mark on a map according to an actual scenario of a working region, so that while map generation accuracy is ensured, user experience can be effectively improved.

Figure 25:
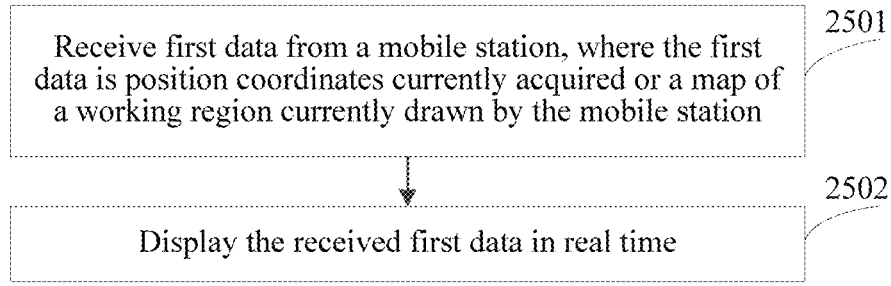
FIG. 25 is a schematic flowchart of a fifth map generation method for an automatic working system according to an embodiment of the present invention.

FIG. 25 is a schematic flowchart of a fifth map generation method for an automatic working system according to an embodiment of the present invention.

The map generation method for an automatic working system in this embodiment of the present invention is applied to an automatic working system. The automatic working system includes: a self-moving device, autonomously moving inside a working region defined on a map, and a positioning mobile station, the mobile station moving along a boundary of the working region and acquiring positioning information to generate the map.

As shown in FIG. 25, the map generation method for an automatic working system may include the following steps.

An execution body in this embodiment of the present invention is a display device, for example, is an intelligent terminal of a user. The intelligent terminal may be a hardware device such as an intelligent mobile phone, a tablet computer, a personal digital assistant, and an electronic book that have a variety of operating systems.

Step 2501: Receive first data from the mobile station, where the first data is position coordinates currently acquired or a map of a working region currently drawn by the mobile station.

Specifically, as the mobile station moves, the mobile station may acquire position coordinates through which the mobile station moves, and send the acquired position coordinates to the display device. Correspondingly, the display device may receive the position coordinates sent by the user.

Alternatively, after the mobile station acquires position coordinates through which the mobile station moves, and a currently drawn map of the working region is updated in real time by using the acquired position coordinates, the mobile station may send the currently drawn map of the working region to the display device. Correspondingly, the display device may receive the currently drawn map of the working region sent by the mobile station.

Step 2502: Display the received first data in real time.

In this embodiment of the present invention, after receiving the first data, the display device may display the first data on a display screen in real time. Specifically, when the first data is position coordinates currently acquired by the mobile station, the position coordinates may be displayed on the display screen in real time. When the first data is the map of the working region currently drawn by the mobile station, the map of the working region may be displayed on the display screen.

Further, when the first data is position coordinates currently acquired by the mobile station, the display device may further update the currently drawn map of the working region in real time by using the currently acquired position coordinates. For example, when the display device is an intelligent terminal, an application program on the intelligent terminal may update the currently drawn map of the working region in real time by using the currently acquired position coordinates.

Further, the display device may further acquire an electronic map. For example, the display device may browse a web page to acquire an electronic map in a webpage version. Optionally, an APP of an electronic map may be alternatively installed on the display device. An electronic map is built in the display device in advance by using the APP. For example, the electronic map may be Google Map. Next, the currently drawn map is displayed in real time on the acquired electronic map. Specifically, coordinate systems of the currently drawn map and the electronic map may be aligned, and the currently drawn map is displayed in real time on the electronic map.

In this embodiment of the present invention, a satellite positioning system is used for positioning, the mobile station acquires latitude and longitude coordinates, and coordinates on an electronic map are also latitude and longitude coordinates. Therefore, the position coordinates acquired by the mobile station may be displayed on the electronic map in real time.

In the map generation method for an automatic working system in this embodiment, first data is received from a mobile station, where the first data is position coordinates currently acquired or a map of a working region currently drawn by the mobile station; and the received first data is displayed in real time. In this embodiment, during map drawing, a currently drawn map may be displayed in real time by using a display device to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To implement the foregoing embodiments, the present invention further provides a map generation apparatus for an automatic working system.

Figure 26:
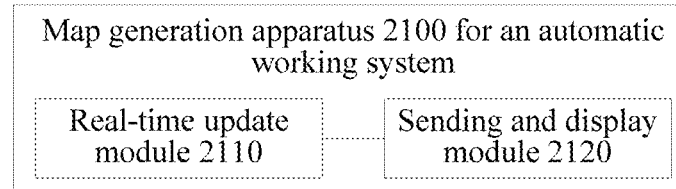
FIG. 26 is a schematic structural diagram of a first map generation apparatus for an automatic working system according to an embodiment of the present invention.

FIG. 26 is a schematic structural diagram of a first map generation apparatus for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

As shown in FIG. 26, a map generation apparatus 2100 for an automatic working system includes a real-time update module 2110 and a sending and display module 2120.

The real-time update module 2110 is configured to: as the mobile station moves, acquire position coordinates through which the mobile station moves, and update a currently drawn map of the working region in real time by using the acquired position coordinates.

In a possible implementation, the real-time update module 2110 is specifically configured to: update, starting from a starting point of movement of the mobile station, the currently drawn map in real time by using currently acquired position coordinates, where the map includes partial map information of the working region; and after the mobile station finishes moving along the boundary of the working region, update the currently drawn map by using the acquired position coordinates to generate the map of the working region.

The sending and display module 2120 is configured to send the currently drawn map to a display device to be displayed in real time by the display device.

In a possible implementation, the sending and display module 2120 is specifically configured to: connect the mobile station to an intelligent terminal of a user; and display the currently drawn map by using the intelligent terminal of the user.

After the mobile station finishes moving along the boundary of the working region, the currently drawn map is updated by using the acquired position coordinates to generate the map of the working region.

Figure 27:
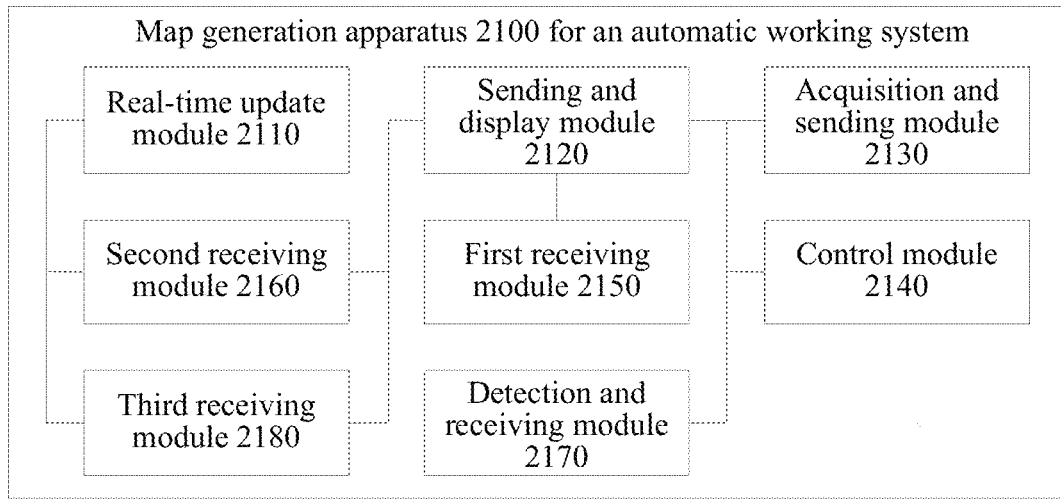
FIG. 27 is a schematic structural diagram of a second map generation apparatus for an automatic working system according to an embodiment of the present invention.

Further, in a possible implementation of this embodiment of the present invention, referring to FIG. 27, based on the embodiment shown in FIG. 26, the map generation apparatus 2100 for an automatic working system may further include an acquisition and sending module 2130, a control module 2140, a first receiving module 2150, a second receiving module 2160, a detection and receiving module 2170, and a third receiving module 2180.

The acquisition and sending module 2130 is configured to: acquire a map image of the working region; align coordinate systems of the currently drawn map and the map image; and display the currently drawn map on the map image, and send the currently drawn map and the map image to the display device.

The control module 2140 is configured to control the mobile station to move along an outer boundary of the working region and/or an inner boundary of the working region.

In a possible implementation, the control module 2140 is specifically configured to: transmit a detection signal externally by using the mobile station or a carrier of the mobile station, to detect a biometric feature signal of a user, where the user moves along the boundary of the working region, and the biometric feature signal is a signal generated by the user; and follow the biometric feature signal to control the mobile station to move along the boundary of the working region.

In another possible implementation, the control module 2140 is specifically configured to carry, by the user, the mobile station to move along the boundary of the working region.

The first receiving module 2150 is configured to: after the currently drawn map is sent to the display device to be displayed in real time by the display device, receive an adjustment instruction input by a user via a display screen, and correct a currently displayed map according to the adjustment instruction.

In a possible implementation, the first receiving module 2150 is specifically configured to: detect a first operation trajectory of a user on the display screen, and recognize a to-be-corrected boundary segment from the first operation trajectory; and detect a second operation trajectory of the user on the display screen, and correct the boundary segment by using the second operation trajectory.

Optionally, the first receiving module 2150 is further configured to: after a boundary segment is corrected by using the second operation trajectory, control the self-moving device to travel on the corrected boundary segment to detect whether an exception occurs in the corrected boundary segment; and if no exception occurs in the corrected boundary segment, use the corrected boundary segment to replace the to-be-changed boundary segment; or if an exception occurs in the corrected boundary segment, correct the to-be-corrected boundary segment.

In another possible implementation, the first receiving module 2150 is specifically configured to: detect a first operation trajectory of a user on the display screen, and recognize a to-be-corrected boundary segment from the first operation trajectory; mark a starting point position and an end point position of the to-be-corrected boundary segment; display the starting point position and the end point position on the display screen; and when the mobile station moves to the starting point position, start to redraw the boundary segment by using acquired position coordinates of the mobile station until the mobile station reaches the end point position.

The second receiving module 2160 is configured to: after the map of the working region is generated, receive an alarm instruction sent by the self-moving device, where the alarm instruction is sent when an exception occurs as the self-moving device travels according to the map of the working region; and adjust the map of the working region according to the alarm instruction.

The detection and receiving module 2170 is configured to: after the currently drawn map is sent to a display device to be displayed in real time by the display device, detect a selection operation input by a user via a display interface, and retrieve a to-be-marked sub-region from the selection operation; and receive a mark parameter of the to-be-marked sub-region input by the user.

In this embodiment of the present invention, the mark parameter includes danger description information and/or movement manner information of the self-moving device.

Further, the mark parameter may further include a time period and/or a preset condition of permitting/forbidding entry of the self-moving device.

The third receiving module 2180 is configured to: before the currently drawn map of the working region is updated in real time by using the acquired position coordinates, receive a drawing instruction from the user.

It should be noted that the foregoing description of the embodiments of the map generation method for an automatic working system in FIG. 20 to FIG. 26 is also applicable to the map generation apparatus 2100 for an automatic working system in this embodiment. Details are not described herein again.

In the map generation apparatus for an automatic working system in this embodiment, as a mobile station moves, position coordinates through which the mobile station moves are acquired, and a currently drawn map of a working region is updated in real time by using the acquired position coordinates; and the currently drawn map is sent to a display device to be displayed in real time by the display device. In this embodiment, during map drawing, the currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To implement the foregoing embodiments, the present invention further provides a map generation apparatus for an automatic working system.

Figure 28:
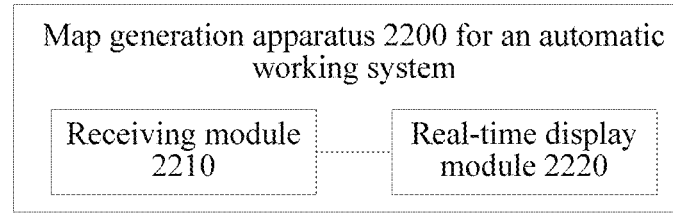
FIG. 28 is a schematic structural diagram of a third map generation apparatus for an automatic working system according to an embodiment of the present invention.

FIG. 28 is a schematic structural diagram of a third map generation apparatus for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

As shown in FIG. 28, a map generation apparatus 2200 for an automatic working system includes a receiving module 2210 and a real-time display module 2220.

The receiving module 2210 is configured to receive first data from the mobile station, where the first data is position coordinates currently acquired or a map of a working region currently drawn by the mobile station.

The real-time display module 2220 is configured to display the received first data in real time.

Figure 29:
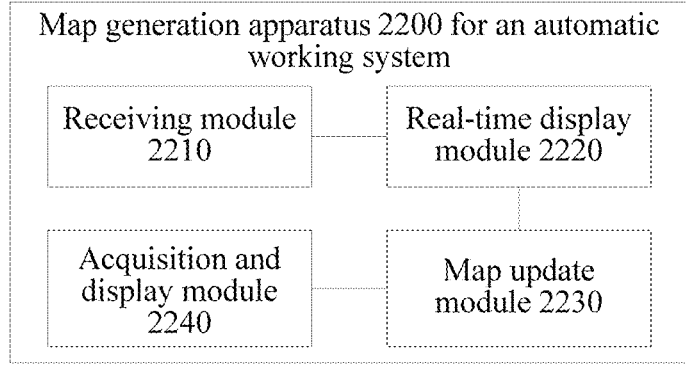
FIG. 29 is a schematic structural diagram of a fourth map generation apparatus for an automatic working system according to an embodiment of the present invention.

Further, in a possible implementation of this embodiment of the present invention, referring to FIG. 29, based on the embodiment shown in FIG. 28, the map generation apparatus 2200 for an automatic working system may further include a map update module 2230 and an acquisition and display module 2240.

The map update module 2230 is configured to: when the first data is position coordinates currently acquired by the mobile station, update the currently drawn map of the working region in real time by using the currently acquired position coordinates.

The acquisition and display module 2240 is configured to: acquire an electronic map, and display the currently drawn map in real time on the electronic map.

It should be noted that the foregoing description of the embodiment of the map generation method for an automatic working system in FIG. 25 is also applicable to the map generation apparatus 2200 for an automatic working system in this embodiment. Details are not described herein again.

For the map generation apparatus for an automatic working system in this embodiment, first data is received from a mobile station, where the first data is position coordinates currently acquired or a map of a working region currently drawn by the mobile station; and the received first data is displayed in real time. In this embodiment, during map drawing, a currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To implement the foregoing embodiments, the present invention further provides an automatic working system.

Figure 30:
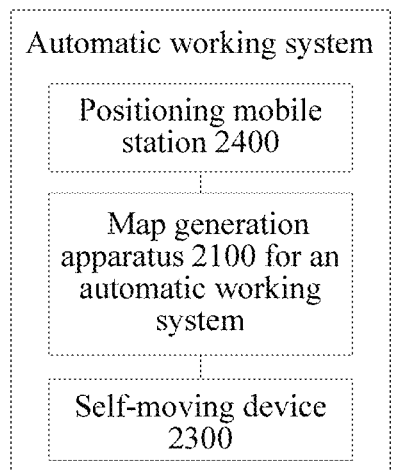
FIG. 30 is a schematic structural diagram of an automatic working system according to an embodiment of the present invention.

FIG. 30 is a schematic structural diagram of an automatic working system according to an embodiment of the present invention.

As shown in FIG. 30, the automatic working system includes: the foregoing map generation apparatus 2100 for an automatic working system provided in the embodiments in FIG. 26 and FIG. 27, a self-moving device 2300, and a positioning mobile station 2400.

The self-moving device 2300 moves and works based on a map of a working region.

In the automatic working system in this embodiment, during map drawing, a currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

To implement the foregoing embodiments, the present invention further provides an automatic working system.

Figure 31:
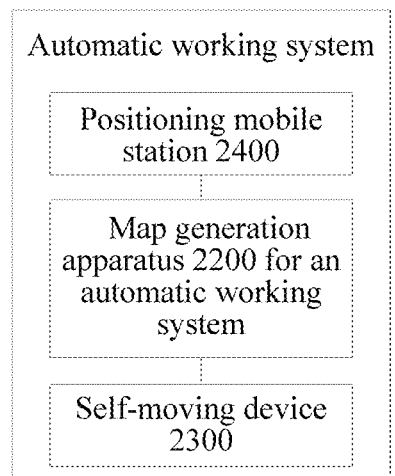
FIG. 31 is a schematic structural diagram of another automatic working system according to an embodiment of the present invention.

FIG. 31 is a schematic structural diagram of an automatic working system according to an embodiment of the present invention.

As shown in FIG. 31, the automatic working system includes: the foregoing map generation apparatus 2200 for an automatic working system provided in the embodiments in FIG. 28 and FIG. 29, a self-moving device 2300, and a positioning mobile station 2400.

The self-moving device 2300 moves and works based on a map of a working region.

In the automatic working system in this embodiment, during map drawing, a currently drawn map can be displayed in real time to enable a user to intuitively check the currently drawn map in real time, thereby effectively improving user experience. Further, if the map is drawn inaccurately or there is a deviation due to a weak positioning signal, the user can adjust the map in time by correcting the map, changing a walking manner or the like, so that map generation accuracy can be effectively improved. Moreover, based on a visual map, the user can conveniently make a modification and a mark on the map, so that user experience is further improved while map generation accuracy is ensured.

In the description of this specification, the description of reference terms such as "an embodiment", "some embodiments", "an example", "specific example", and "some examples" means that specific features, structures, materials or characteristics that are described with reference to the embodiments or examples are included in at least one embodiment or example of the present invention. In this specification, the schematic description of the foregoing terms is not required to involve a same embodiment or example. Moreover, the described specific features, structures, materials or characteristics may be appropriately combined in any one or more embodiments or examples. In addition, without causing any contradiction, a person skilled in the art may combine different embodiments or examples and features in different embodiments or examples described in this specification.

In addition, the terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included. In the description of the present invention, unless otherwise particularly defined, "a plurality of" means at least two, for example, two or three.

The description of any process or method in the flowcharts or described herein in other manners may be understood as represents a module, a segment or a part that includes one or more codes of executable instructions used to implement the steps of a customized logic function or process, and the scope of preferred implementations of the present invention include other implementations. The functions may be executed in a basically simultaneous manner or an opposite order according to the related functions instead of the shown or described order. This should be understood by a person skilled in the art of the embodiments of the present invention.

The logic and/or steps represented in the flowcharts or described herein in other manners may be, for example, regarded as a sequenced list of executable instructions for implementing logic functions, and may be specifically implemented in any computer readable medium for use by instruction execution systems, apparatuses or devices (for example, a computer-based system, a system including a processor or another system that may take an instruction from the instruction execution systems, apparatuses or devices and execute the instruction), or for use in combination with these instruction execution systems, apparatuses or devices. In this specification, "the computer readable medium" may be any apparatus that may include, store, communicate, propagate or transmit a program for use by instruction execution systems, apparatuses or devices or for use in combination with these instruction execution systems, apparatuses or devices. A more specific example (a nonexhaustive list) of the computer readable medium includes the following: an electrical connection portion (electronic apparatus) with one or more wires, a portable computer cassette (magnetic apparatus), a RAM, a ROM, an EPROM (or a flash memory), a fiber apparatus, and a CD-ROM. In addition, the computer readable medium may even be paper or another suitable medium on which the program may be printed, because, for example, optical scanning may be performed on the paper or the another medium, the program is then obtained in an electronic manner by means of editing, deciphering or processing in another suitable manner when necessary, and the program is then stored in a computer memory.

It should be understood that the parts of the present invention may be implemented by using hardware, software, firmware or a combination thereof. In the foregoing implementations, a plurality of steps or methods may be implemented by using software or firmware that is stored in a memory and executed by a suitable instruction execution system. For example, during implementation of hardware, as in other implementations, any one or a combination of the following technologies well known in the art may be used for implementation: a discrete logic circuit having a logic gate circuit configured to implement a logic function on a data signal, an application-specific integrated circuit having a suitable combinational logic gate circuit, a programmable gate array (PGA), a field-PGA (FPGA), and the like.

A person of ordinary skill in the art may understand that all or some steps carried in the methods of the foregoing embodiments may be implemented by a program instructing relevant hardware. The program may be stored in a computer readable storage medium. When the program runs, one or a combination of the steps of the method embodiments is performed.

In addition, the functional units in the embodiments of the present invention may either be integrated in a processing module or separate physical units. Alternatively, two or more of the foregoing units may be integrated in one module. The foregoing integrated modules may be implemented in the form of hardware or software functional modules. If implemented in the form of software function modules and sold or used as an independent product, the integrated modules may also be stored in a computer readable storage medium.

The storage medium mentioned in the foregoing may be a ROM, a magnetic disk, an optical disc or the like. Although the embodiments of the present invention are shown and described above, it should be understood that the foregoing embodiments are exemplary and should not be construed as limitations to the present invention. A person of ordinary skill in the art may make changes, modifications, replacements, and variations to the foregoing embodiments within the scope of the present invention.

The present invention provides a state detection method for an automatic working system is mainly to resolve a problem in the prior art that after an exception occurs in a mobile station or a base station, a movement region of a self-moving device deviates, an automatic working system becomes less reliable, and the use of a user is affected.

In the state detection method for an automatic working system provided in the present invention, a mobile station determines quality of a signal received by a first antenna, and determines an indication manner of a first indication module according to the quality of the signal. Accordingly, during working of the mobile station, information such as the quality of the signal is indicated to a user to enable the user to intuitively learn about an operating state of an automatic working system in real time, thereby improving the reliability of using the automatic working system and improving user experience.

The state detection method for an automatic working system provided in this embodiment of the present invention is described below in detail with reference to the accompanying drawings.

It should be noted that in this embodiment, the automatic working system may include: a mobile station, configured to determine position information of one or more positions inside or outside a working region of a self-moving device, and the foregoing the mobile station includes a first antenna configured to receive a satellite signal and a first indication module.

In this embodiment, the mobile station may receive a satellite signal. For example, the mobile station may receive a GPS signal. Alternatively, the mobile station may alternatively receive a Galileo satellite navigation system signal, a Beidou satellite navigation system signal, a GLONASS signal or the like. This is not limited in this embodiment of the present invention.

In this embodiment of the present invention, an example in which the mobile station receives a GPS signal is used. Specifically, the mobile station may include a GPS antenna, and the mobile station may receive a GPS signal by using the GPS antenna.

The self-moving device may be, but is not limited to, an unattended device such as an automatic lawn mower, an automatic cleaning device, an automatic irrigation device, and an automatic snowplow.

Figure 32:
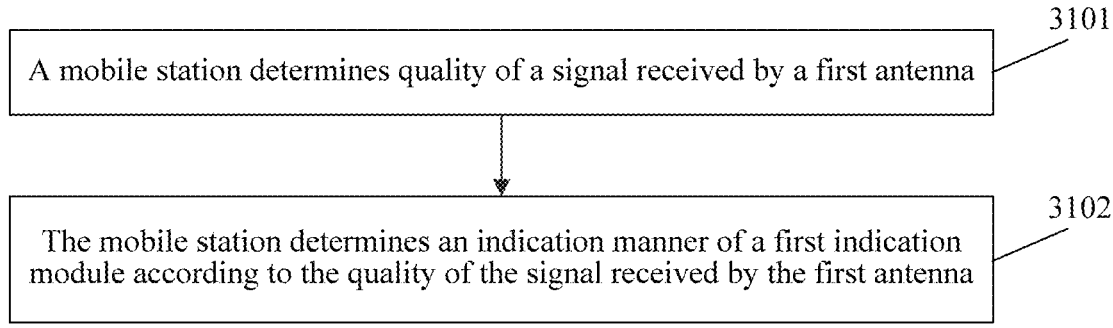
FIG. 32 is a flowchart of a state detection method for an automatic working system according to an embodiment of the present invention.

FIG. 32 is a flowchart of a state detection method for an automatic working system according to an embodiment of the present invention.

As shown in FIG. 32, the state detection method for an automatic working system may include the following steps.

Step 3101: A mobile station determines quality of a signal received by a first antenna.

The quality of the signal may include: excellent, good, and poor. This is not specifically limited herein.

Specifically, when the mobile station is working, the first antenna of the mobile station receives a satellite signal sent by a satellite. The foregoing satellite signal includes longitude and latitude coordinates of a current position of the mobile station.

Generally, when a receiving surface of the first antenna of the mobile station perpendicularly faces the sky, the quality of the received signal is high. However, during actual use, as the mobile station moves, the quality of the signal received by the first antenna may be relatively poor due to some external factors. For example, the first antenna is blocked, or the attitude of the first antenna is incorrect, and as a result, the quality of the information received by the first antenna is lowered.

In view of this, to learn about accurately in time whether the quality of the signal received by the first antenna is desirable, in this embodiment, as the mobile station moves, the quality of the signal received by the first antenna may be determined according to a parameter of a satellite signal received by the first antenna. The parameter of the satellite signal may include a quantity of satellite signals and a signal-to-noise ratio of each satellite signal.

To be specific, when the mobile station determines that the quantity of satellite signals received by the first antenna is larger and a signal-to-noise ratio of each satellite signal is larger, it indicates that the quality of the signal received by the first antenna is higher.

For example, if the mobile station can normally receive 20 satellite signals in a current region, when the mobile station determines at a position during movement that the first antenna receives only 5 satellite signals, it may be determined that quality of a currently received signal is relatively poor.

In another example, if the mobile station can normally receive 20 satellite signals in a current region, when the mobile station determines that the first antenna receives 19 satellite signals at a position during movement and the signal-to-noise ratio of each satellite signal is greater than a threshold, it may be determined that quality of a currently received signal is high.

Step 3102: The mobile station determines an indication manner of a first indication module according to the quality of the signal received by the first antenna.

Specifically, after the quality of the signal received by the first antenna is determined, in this embodiment, the quality of the signal may be indicated by using the first indication module, so that a user can learn about a working state of an automatic working system in time.

During specific implementation, the first indication module may be implemented by using different assemblies such as a vibration assembly, an indicator lamp, a display screen, a sound assembly, and a communications assembly as required. Correspondingly, the quality of the signal may be indicated in several manners in the following. Examples of the manners are described as follows:

Manner 1:

Determine a display manner of the first indication module.

The display manner may be turning on indicator lamps with different colors according to the quality of the signal. For example, when the quality of the signal is excellent, a green indicator lamp is turned on, and if the quality of the signal is poor, a red indicator lamp is turned on.

Manner 2:

Determine a vibration manner of the first indication module.

For example, when the quality of the signal is poor, vibration lasts 2 seconds (s).

Manner 3:

Determine voice content of the first indication module.

The voice content is announced to a user and may be that the quality of the signal received by the first antenna is high or low. For example, when the quality of the signal is low, in a voice announcement manner, "A currently received signal has poor quality. Please adjust the direction of the mobile station." is announced to the user.

Manner 4:

Determine content sent to a terminal by using the first indication module.

The terminal in this embodiment may be, but is not limited to, a device such as an intelligent mobile phone, a personal digital assistant, and a tablet computer.

Specifically, the mobile station usually can establish a connection to a terminal during use. After determining the quality of the signal, the mobile station may directly send a signal detection result to the associated terminal, so that the user may learn about, by using the terminal, the quality of the signal received by the mobile station.

It should be noted that several indication manners in the foregoing are only exemplary, but do not constitute specific limitations to the present invention.

Further, because the attitude of the first antenna is incorrect, the quality of the signal received by the first antenna may be poor. Therefore, to assist the user in accurately learning about in time whether the quality of the received signal is desirable and a cause of poor quality of a signal, in this embodiment, an attitude sensor on the first antenna of the mobile station may be used to monitor the attitude of the first antenna and indicate in real time a detection result to the user by using the first indication module, so that when the attitude of the first antenna is incorrect, the user adjusts the attitude of the first antenna in time according to information indicated by the first indication module.

Specifically, when detecting that the attitude of the first antenna is abnormal, the attitude sensor sends an exception result to the first indication module to enable the first indication module to display corresponding exception information. For example, the first indication module announces "The current attitude of the antenna is incorrect. Please adjust the attitude in time." to the user in a voice announcement manner.

Alternatively, when the attitude of the first antenna is normal, the attitude sensor sends a normal result to the first indication module to enable the first indication module to display corresponding normal information. For example, a green indicator lamp is turned on.

It should be noted that as required, the same module or different modules may be configured to indicate the attitude of an antenna and indicate the quality of a signal on an antenna. Correspondingly, the same manner or different manners may be used to indicate the attitude of an antenna and indicate the quality of a signal on an antenna. This is not limited in this embodiment.

In addition, another factor that affects the quality of the signal received by the first antenna is whether a receiving surface of the first antenna is blocked. Therefore, in this embodiment, a first contact sensor disposed on the receiving surface of the first antenna may further be used to monitor whether the receiving surface of the first antenna is blocked and output in real time a detection result to the first indication module, so as to provide an indication to the user by using the first indication module, so that the user can learn about in time whether the first antenna of the mobile station is blocked.

Specifically, when detecting that the first antenna is blocked, the first contact sensor sends an exception result to the first indication module to enable the first indication module to display corresponding exception information. For example, when the first antenna is blocked, a red indicator lamp is turned on.

Alternatively, when detecting that the first antenna is not blocked, the first contact sensor sends a normal result to the first indication module to enable the first indication module to display corresponding normal information. For example, when the first antenna is not blocked, a green indicator lamp is turned on.

Further, if the mobile station is held by the user during working, the attitude of the first antenna may be related to a holding attitude of the user. That is, when the holding attitude of holding the mobile station by the user is incorrect, the attitude of the first antenna incorrect accordingly, and as a result, the quality of the signal received by the first antenna is poor. Therefore, in this embodiment, a handle portion configured to assist the user in keeping the first antenna in a correct attitude may further be disposed in the mobile station, and the second contact sensor disposed at the handle portion monitors whether the attitude of holding the foregoing handle portion by the user is correct, and sends a detection result to the first indication module, so that the first indication module indicates corresponding prompt information to the user according to the detection result to enable the user to learn about in time whether the holding attitude of the mobile station is correct.

A handle touch point may be set in advance at the handle portion in this embodiment, so that the second contact sensor determines, by monitoring the touch point, whether the attitude of holding the foregoing handle portion by the user is correct.

Specifically, when detecting that the attitude of holding the handle portion by the user is incorrect, the second contact sensor sends an exception result to the first indication module to enable the first indication module to display corresponding exception information. For example, a red indicator lamp is turned on.

Alternatively, when detecting that the attitude of holding the handle portion by the user is correct, the second contact sensor sends a normal result to the first indication module to enable the first indication module to display corresponding normal information. For example, a green indicator lamp is turned on.

It should be noted that the detecting, by using the second contact sensor, whether the attitude of holding the handle portion by the user is accurate in the foregoing is only schematic description, and another manner of detecting whether the attitude of holding the handle portion by the user is accurate also falls within the protection scope of the present application.

Further, the mobile station further includes an energy source module to further improve the reliability of the mobile station. In this embodiment, the remaining capacity of the energy source module may further be monitored in real time, and the first indication module indicates a detection result to assist the user in learning about in real time the power in the energy source module to make work arrangement and the like according to the power in the energy source module.

Specifically, for example, when it is detected that the energy source module has insufficient power, an insufficient power result may be sent to the first indication module to enable the first indication module to turn on a red indicator lamp to prompt the user to charge the energy source module in time.

Alternatively, when it is detected that the energy source module has sufficient power, a result indicating remaining power is sent to the first indication module to enable the first indication module to display the remaining power to the user to assist the user in properly planning use tasks according to the displayed remaining power.

In the state detection method for an automatic working system provided in this embodiment of the present invention, a mobile station may determine in real time a state such as quality of a signal received by a first antenna, and determine an indication manner of a first indication module according to the state. Accordingly, during working of the mobile station, information such as the quality of the signal is indicated to a user to enable the user to intuitively learn about an operating state of an automatic working system in real time, thereby improving the reliability of using the automatic working system and improving user experience.

A state such as whether an attitude of an antenna is correct or whether the antenna is blocked is indicated, so that the user determines a cause of poor quality of a signal. For example, if it indicates that the attitude of the antenna is incorrect, the user may adjust the attitude of the antenna according to a prompt. If it indicates that the attitude of the antenna is correct but the quality of the signal is poor, the user may determine, according to the prompt, that a satellite signal at a current position is poor.

An antenna attitude sensor includes a 6-axis/9-axis sensor or the like, and may recognize a tilt angle to determine whether the antenna faces upward.

It can be learned from the foregoing analysis that during working, the mobile station of the present invention may indicate in real time information such as the quality of the signal acquired by an antenna to enable the user to intuitively learn about an operating state of the automatic working system in real time. During actual use, the mobile station may further indicate in real time working state information or the like.

For example, when the mobile station works in a state of creating a map according to a satellite signal received by the first antenna, map information at any position determined by the mobile station may be marked and indicated according to quality of a signal received by the first antenna at the any position, so that the user learns about in time whether the map information created by the mobile station is accurate.

It may be understood that the mobile station may alternatively only mark map information at each position according to quality of a satellite signal acquired at the position, so that when subsequently a self-moving device is controlled to work, a working region at any position is further adjusted according to mark information corresponding to the position. This is not limited in this embodiment.

During specific implementation, the mobile station may generate a working map in the following manners. Examples of the manners are described as follows:

First Implementation

The user separates the mobile station from a housing of an automatic lawn mower, and then holds the mobile station and walks to record a map. The recording a map includes the following steps: The user may start from a starting point such as any position in the working region to walk along a boundary of the working region, and the mobile station may record position coordinates of the boundary. The user walks along an obstacle in the working region, and the mobile station may record position coordinates of the obstacle. The user walks along a traffic island in the working region, and the mobile station may record position coordinates of the traffic island. The user walks along a passage connecting sub-working regions of the working region, and the mobile station may record position coordinates of the passage.

Second Implementation

The mobile station is installed on the self-moving device. For example, the mobile station may be detachably connected to the housing of the self-moving device, so that the mobile station may move synchronously with the self-moving device. To record a map, the mobile station is installed on the self-moving device, and the user uses an intelligent terminal device such as a mobile phone and a tablet to remotely control the self-moving device to move. Similarly, a map recording step includes recording a boundary of the working region, an obstacle in the working region, a passage connecting sub-regions or the like.

Third Implementation

The self-moving device may include a pushing rod detachably installed at the housing of the self-moving device. To record a map, the mobile station is installed on the self-moving device, the pushing rod is installed at the housing of the self-moving device, and the user operates the pushing rod to push the self-moving device to record a boundary of the working region, an obstacle, a passage or the like.

Fourth Implementation

The self-moving device may include an ultrasonic apparatus, so that the self-moving device may follow the user at a distance. To record a map, the mobile station is installed on the self-moving device, the user walks along a boundary of the working region, an obstacle, a passage or the like, and the self-moving device automatically follows the user to record the map.

Fifth Implementation

The mobile station may be separated from the self-moving device. Therefore, to record a map, the mobile station may be placed on a pushcart. For example, the mobile station may be installed on a hand-propelled device, and the user pushes a cart and walks, to record a boundary of the working region, an obstacle, a passage or the like.

Sixth Implementation

A Cartesian coordinate system is established to generate a map. Specifically, a first point from which recording is started is used as the origin (0, 0) of the coordinate axes. The position coordinates that correspond to the origin and are output by the mobile station are (x0, y0). As the user records a map, the mobile station outputs position coordinates (x1, y1), and converts the position coordinates (x1, y1) into (x1-x0, y1-y0) when generating the map, so as to convert a satellite positioning coordinate system into a Cartesian coordinate system.

It should be noted that in this embodiment, on the map of the working region generated by the mobile station, absolute coordinates, that is, the latitude and longitude, of position points relative to the Earth may be recorded, or, coordinates in a coordinate system XY may be recorded. This is not limited.

Further, the automatic working system may further include a charging station configured to charge the mobile station and a base station configured to send differential information to the mobile station to enable the mobile station to perform positioning according to the differential information. Therefore, in the present invention, the mobile station may further be used to select positions to arrange the charging station and the base station, so that during working, the self-moving device can perform a communication operation with the base station or perform a charging operation by using the charging station. The state detection method for an automatic working system of the present invention is further described below with reference to FIG. 33.

Figure 33:
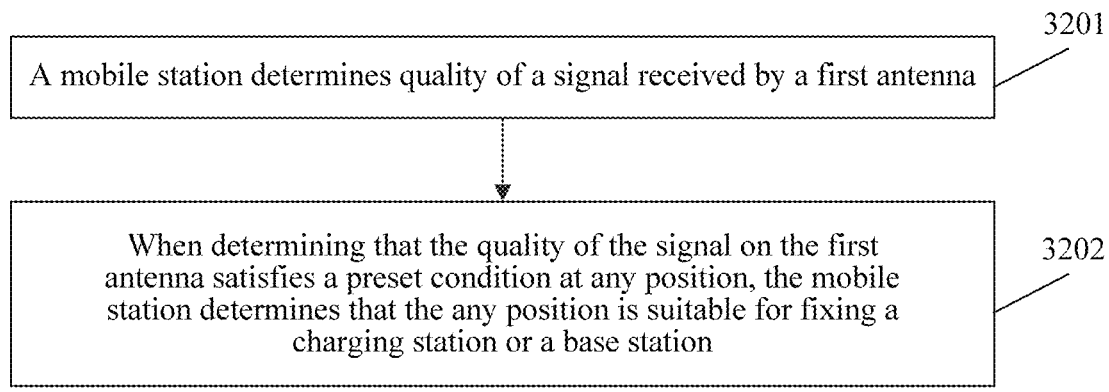
FIG. 33 is a flowchart of a state detection method for an automatic working system according to another embodiment of the present invention.

FIG. 33 is a flowchart of a state detection method for an automatic working system according to another embodiment of the present invention.

As shown in FIG. 33, the state detection method for an automatic working system may include the following steps:

Step 3201: A mobile station determines quality of a signal received by a first antenna.

Step 3202: When determining that the quality of the signal on the first antenna satisfies a preset condition at any position, the mobile station determines that the any position is suitable for fixing a charging station or a base station.

The preset condition may be adaptively set according to an actual use requirement. This is not specifically limited in this embodiment. For example, a quantity of acquired signals is greater than 324, and signal-to-noise ratios of at least 20 signals are greater than 45 dB. This is not specifically limited herein.

A condition of selecting a position for the base station is stricter than that for the charging station to ensure that the base station can always provide a precise positioning correction signal to the mobile station.

Specifically, after a requirement of quality of a signal of an antenna is determined for a position of arranging the base station or the charging station, during map recording, the mobile station may determine whether the quality of the signal received by the first antenna at any position satisfies a condition of arranging the base station or the charging station, and if yes, make a special mark at the position, so that a user fixes the charging station or the base station according to the special mark of the mobile station on map information.

Generally, to enable the base station and the mobile station to reliably and efficiently provide navigation data to an automatic working system, in this embodiment, the base station may be arranged in several manners in the following. Examples of the manners are described as follows:

First Implementation

The base station is disposed at the same position as the charging station and is powered by the charging station.

Second Implementation

The base station is disposed separately from the charging station, and the base station is powered by an independent energy source.

For example, a power form such as solar energy and wind energy may be used.

Further, the base station may further be provided with an acoustic, optical, electrical apparatus or the like configured to feed back the condition of a satellite signal to indicate whether an installing position or receiving quality of the base station is appropriate.

In addition, in this embodiment, to ensure a good satellite signal at a position of the charging station, before the charging station is installed, the user first places a self-moving device installed with the mobile station at a position where the user intends to install the charging station. Alternatively, the user detaches the mobile station from the self-moving device and then moves the mobile station to the position where the user intends to install the charging station. The user turns on positioning, determines positioning precision, and confirms that the positioning precision is high before fixing the charging station. Therefore, when the self-moving device has insufficient power, the self-moving device can return to the charging station to perform docking and charging. In this embodiment, the charging station may be a wireless charging station.

In addition, in this embodiment, the base station and the mobile station may separately include a communications module. The base station and the mobile station may communicate with each other by using the communications modules. The communications modules may include a radio station and a radio station antenna. Further, to ensure reliable long-distance transmission between the base station and the mobile station, the communications modules may further include a Sub-1G module, a WiFi module, and a 2G/3G/4G/5G module. This is not limited.

Optionally, after receiving a GPS signal by using a GPS antenna, the base station may send the GPS signal to the mobile station by using its communications module. Correspondingly, the mobile station may receive differential information of the base station by using the communications module corresponding to the base station. Meanwhile, the mobile station may receive the GPS signal by using the GPS antenna.

Therefore, according to a state of a signal acquired by the communications module at a current position and/or time, the mobile station may determine a working state of the communications module at the current position, or, determine a working state of a peer end in communication connection with the mobile station by using the communications module.

The working state of the communications module at the current position may include a normal working state and an abnormal working state.

The peer end in communication connection with the mobile station in this embodiment may be, but is not limited to, a hardware device such as a base station or an intelligent mobile phone that has a communication function. This is not specifically limited herein.

Specifically, in this embodiment, it may be determined whether communication information is received within a preset time or whether a state of a received signal is good to determine whether the working state of the communications module of the mobile station is normal.

In addition, in this embodiment, the communications module of the mobile station may further be connected to a terminal to send the working state of the mobile station at the current position to the terminal, so that the user can learn about a working condition of the mobile station by using the terminal.

In this embodiment, the mobile station wirelessly communicates with a terminal by using the communications module. A manner of the wireless communication may be, for example, WiFi, a cellular network or Bluetooth. This is not specifically limited herein.

Further, during actual use, in the automatic working system, a base station configured to send differential information to a mobile station to enable the mobile station to perform positioning according to the differential information is fixed, and when the base station moves, a deviation occurs in the positioning of the mobile station. Therefore, it may be detected whether the base station is moved in this embodiment.

A detection process for determining whether a base station is moved is described below in detail with reference to FIG. 34.

Figure 34:
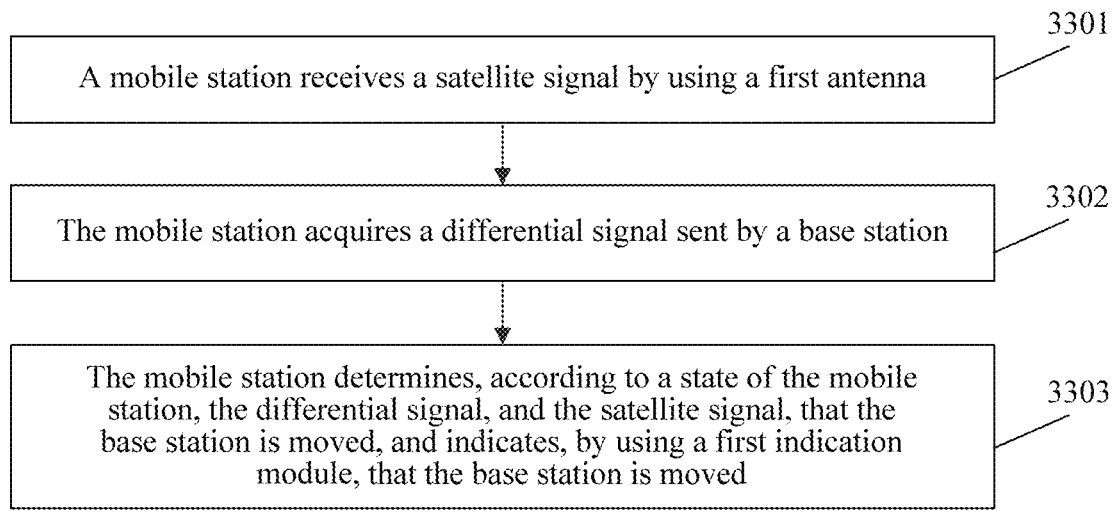
FIG. 34 is a flowchart of a detection process for determining whether a base station is moved according to an embodiment of the present invention.

As shown in FIG. 34, the detection process for determining whether a base station is moved may include the following steps:

Step 3301: A mobile station receives a satellite signal by using a first antenna.

Step 3302: The mobile station acquires a differential signal sent by the base station.

Step 3303: The mobile station determines, according to the state of the mobile station, the differential signal, and the satellite signal, that the base station is moved, and indicates, by using a first indication module, that the base station is moved.

Specifically, the mobile station further includes a first displacement sensor. Therefore, when determining that the base station is moved, the mobile station may calculate a calculated position of the mobile station at a current moment according to the differential signal and the satellite signal. The mobile station then determines, according to an output value of the first displacement sensor, whether the mobile station is in a stationary state; if yes, determines that whether the calculated position at the current moment is consistent with a calculated position at a previous moment; and if not, determines that the base station is moved.

Further, the mobile station is provided with a first displacement sensor. If the mobile station determines, according to an output value of the first displacement sensor, that the mobile station is not moved, but a difference between the calculated position at the current moment and the calculated position at the previous moment is greater than a threshold, the mobile station may determine that the base station is moved.

It should be noted that the mobile station may further determine, in another manner, whether the mobile station is moved. For example, the mobile station detects, by using a vibration sensor, whether a movement wheel moves.

Further, during actual use, in an automatic working system, the base station configured to send differential information to the mobile station to enable the mobile station to perform positioning according to the differential information may also include a second antenna configured to receive a satellite signal and a second indication module. Therefore, in this embodiment, the base station may further determine quality of a signal received by the second antenna and indicate, by using the second indication module, the quality of the signal received by the second antenna.

For a specific implementation process, refer to a determination manner for the mobile station. Details are not elaborated herein.

Further, the base station in this embodiment may further determine, according to a satellite signal acquired by the second antenna and an output value of a second displacement sensor, that the base station is moved.

During specific implementation, it may be determined, in the following manners, that the base station is moved. Examples of the manners are described as follows:

First Implementation Case:

A difference between the satellite signal acquired by the second antenna and a locally stored position signal is calculated, and when it is determined that the difference is greater than a threshold, it may be determined that the base station is moved.

The value of the threshold may be set according to a precision level of a satellite signal acquired by the base station or the like, and is, for example, set to zero or the like. This is not specifically limited in this embodiment.

Specifically, the base station is usually fixed at a position. Therefore, a local storage unit stores information about a position where the base station is fixed. The second antenna of the base station may receive in real time a satellite positioning signal sent by a satellite. Therefore, in the present application, the difference between the locally stored position information and the received satellite information may be calculated to determine whether the base station is moved. If the difference is below the threshold, it indicates that the base station is not moved. If the difference is greater than the threshold, it indicates that the base station is moved.

Second Implementation Case:

It is determined, according to an output value of the second displacement sensor disposed in the base station, that the base station is moved.

Specifically, the second displacement sensor can detect displacement information of the base station. Therefore, it may be determined, according to the output value of the second displacement sensor, whether the base station is moved.

It should be noted that there may further be manners other than the foregoing two determination manners in the present invention. This is not specifically limited in the present application.

In the state detection method for an automatic working system provided in this embodiment of the present invention, a mobile station may make a mark and an indication on a recorded map according to quality of a signal received on an antenna, and when it is determined, according to the acquired signal, that a base station is moved, may indicate, by using the indication module, information about that the base station is moved, so that a user can learn about an operating state of an automatic working system anywhere at any time, thereby improving the reliability of using the automatic working system and improving user experience.

To implement the foregoing embodiments, the present invention further provides a mobile station.

Figure 35:
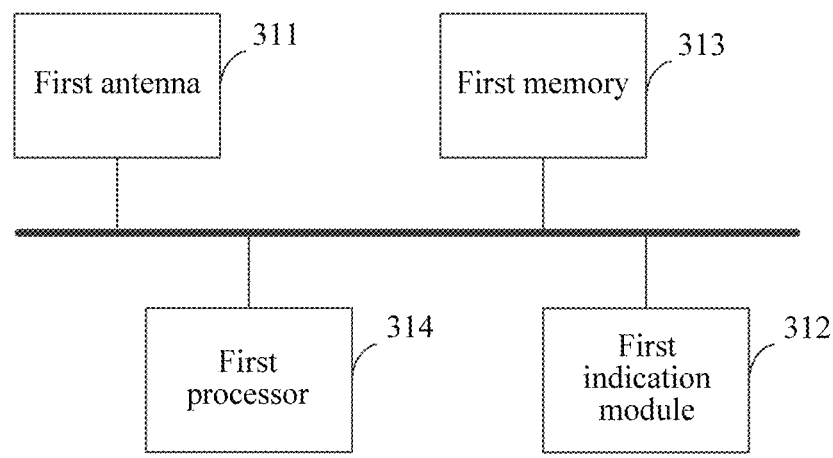
FIG. 35 is a schematic structural diagram of a mobile station according to an embodiment of the present invention.

FIG. 35 is a schematic structural diagram of a mobile station according to an embodiment of the present invention.

The mobile station in this embodiment is configured to determine position information of one or more positions inside or outside a working region of a self-moving device.

Referring to FIG. 35, the foregoing the mobile station may include a first antenna 311 configured to receive a satellite signal, a first indication module 312, a first memory 313, a first processor 314, and a computer program that is stored in the first memory 313 and can be executed on the first processor 314.

The first antenna 311 is configured to acquire a satellite signal.

The first processor 314 is configured to invoke and execute the computer program stored in the first memory, to control the first indication module 312 to perform indication, thereby implementing the state detection method for an automatic working system in the foregoing embodiments.

The first indication module 312 includes at least one of the following assemblies: an optical assembly, a vibration assembly, an acoustic assembly, and a communications assembly.

Further, the mobile station in this embodiment further includes at least one of the following assemblies: a first contact sensor disposed on a receiving surface of the first antenna 311, an attitude sensor disposed on the first antenna 311, an energy source module, a communications module, a handle portion, and a second contact sensor disposed at the handle portion.

It should be noted that for the implementation process and technical principle of the mobile station in this embodiment, refer to the foregoing description of the embodiment of the state detection method for an automatic working system. Details are not described herein again.

For the mobile station provided in this embodiment of the present invention, a mobile station may determine in real time quality of a signal received by the first antenna, and determine an indication manner of a first indication module according to the quality of the signal. Accordingly, during working of the mobile station, information such as the quality of the signal is indicated to a user to enable the user to intuitively learn about an operating state of an automatic working system in real time, thereby improving the reliability of using the automatic working system and improving user experience.

To implement the foregoing embodiments, the present invention further provides a base station.

The base station in this embodiment is configured to send differential information to the mobile station to enable the mobile station to perform positioning according to the differential information.

Figure 36:
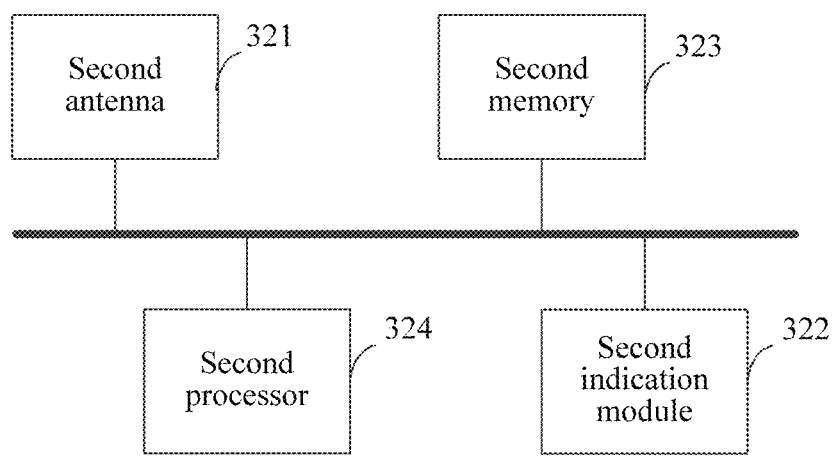
FIG. 36 is a schematic structural diagram of a base station according to an embodiment of the present invention.

FIG. 36 is a schematic structural diagram of a base station according to an embodiment of the present invention.

Referring to FIG. 36, the base station of the present invention includes: a second antenna 321 configured to receive a satellite signal, a second indication module 322, a second memory 323, a second processor 324, and a computer program that is stored in the second memory 323 and can be executed on the second processor 324.

The second antenna 321 is configured to acquire a satellite signal.

The second processor 324 is configured to invoke and execute the computer program stored in the second memory 323, to control the second indication module 322 to perform indication, thereby implementing the state detection method for an automatic working system in the foregoing embodiments.

It should be noted that for the implementation process and technical principle of the base station in this embodiment, refer to the foregoing description of the embodiment of the state detection method for an automatic working system. Details are not described herein again.

In the base station provided in this embodiment of the present invention, the base station may determine in real time quality of a signal received by a second antenna, and determine an indication manner of the second indication module according to the quality of the signal. Accordingly, during working, an automatic working system indicates information such as the quality of the signal of the base station to a user to enable the user to intuitively learn about an operating state of the automatic working system in real time, thereby improving the reliability of using the automatic working system and improving user experience.

To implement the foregoing embodiments, the present invention further provides a computer readable storage medium.

The computer readable storage medium, storing a computer program, when being executed by a processor, the program implements the state detection method for an automatic working system in the embodiment of the first aspect. The state detection method for an automatic working system includes: determining, by a mobile station, quality of a signal received by a first antenna; and determining, by the mobile station, an indication manner of a first indication module according to the quality of the signal received by the first antenna.

In the description of this specification, the description of reference terms such as "an embodiment", "some embodiments", "an example", "specific example", and "some examples" means that specific features, structures, materials or characteristics that are described with reference to the embodiments or examples are included in at least one embodiment or example of the present invention.

In addition, the terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included.

The description of any process or method in the flowcharts or described herein in other manners may be understood as represents a module, a segment or a part that includes one or more codes of executable instructions used to implement the steps of a specific logic function or process, and the scope of preferred implementations of the present invention include other implementations. The functions may be executed in a basically simultaneous manner or an opposite order according to the related functions instead of the shown or described order. This should be understood by a person skilled in the art of the embodiments of the present invention.

It should be understood that the parts of the present invention may be implemented by using hardware, software, firmware or a combination thereof. In the foregoing implementations, a plurality of steps or methods may be implemented by using software or firmware that is stored in a memory and executed by a suitable instruction execution system. For example, during implementation of hardware, as in other implementations, any one or a combination of the following technologies well known in the art may be used for implementation: a discrete logic circuit having a logic gate circuit configured to implement a logic function on a data signal, an application-specific integrated circuit having a suitable combinational logic gate circuit, a PGA, an FPGA, and the like.

A person of ordinary skill in the art may understand that all or some steps carried in the methods of the foregoing embodiments may be implemented by a program instructing relevant hardware. The program may be stored in a computer readable storage medium. When the program runs, one or a combination of the steps of the method embodiments is performed.

The storage medium mentioned in the foregoing may be a ROM, a magnetic disk, an optical disc or the like. Although the embodiments of the present invention are shown and described above, it should be understood that the foregoing embodiments are exemplary and should not be construed as limitations to the present invention. A person of ordinary skill in the art may make changes, modifications, replacements, and variations to the foregoing embodiments within the scope of the present invention.

The base station based on a differential positioning technology and the automatic working system in the embodiments of the present invention are described below with reference to the accompanying drawings.

In the prior art, a charging station is integrated with the base station, and the charging station powers the base station. However, to ensure quality of a satellite signal received by the base station, the base station needs to be disposed in a relatively open region. Because the base station is integrated with the charging station, an installing position of the base station is restricted. For example, the base station cannot be disposed on a roof or at another high, relatively open position.

If the base station is disposed separately from the charging station, the powering of the base station needs to be resolved. In this case, if an electric cable is guided from the charging station to the base station, although the powering of the base station can be resolved, inconvenience is caused, and user experience is undesirable.

Therefore, in this embodiment of the present invention, the base station may be disposed separately from the charging station. The base station is self-powered by using its own wind power generation part and/or solar power generation part. Therefore, the installing position of the base station is not restricted. In addition, it is not necessary to use an electric cable from the charging station to power the base station, so that the trouble of arranging a line for the base station is avoided, thereby effectively improving use experience for a user.

In addition, in the prior art, a boundary line is arranged around a preset working region of a self-moving device. Next, a current is conducted in the boundary line. The self-moving device detects a magnetic field signal around the current, so as to determine, according to the magnetic field signal, whether the self-moving device is located inside the preset working region.

In this embodiment of the present invention, the base station may receive or send a signal by using its power unit to locate a mobile station, so that the self-moving device can move inside the preset working region according to the positioning of the mobile station by the base station. In this way, the trouble of arranging a line in the prior art can be avoided for an automatic working system, thereby further improving user experience.

Figure 37:
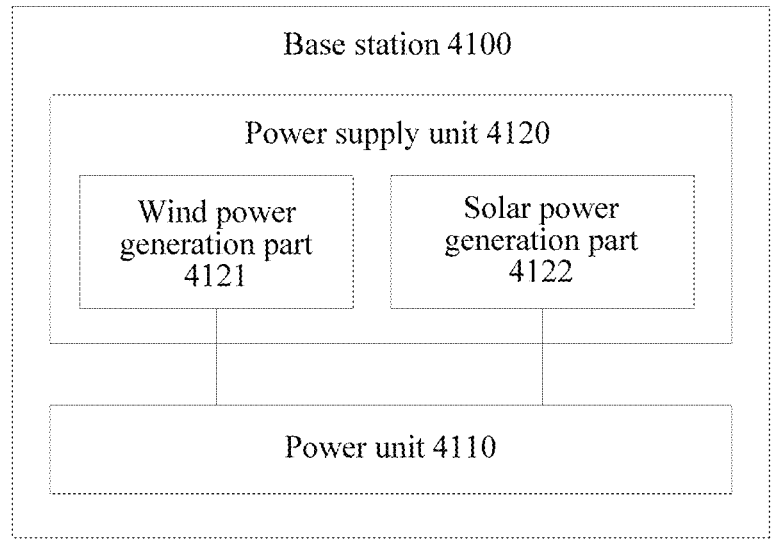
FIG. 37 is a schematic structural diagram of a first base station based on a differential positioning technology according to an embodiment of the present invention.

FIG. 37 is a schematic structural diagram of a first base station based on a differential positioning technology according to an embodiment of the present invention.

A base station 4100 in this embodiment of the present invention is configured to locate a mobile station to enable a self-moving device installed with the mobile station to move inside a preset working region. The self-moving device may be an unattended device such as an automatic lawn mower, an automatic cleaning device, an automatic irrigation device, and an automatic snowplow.

In this embodiment of the present invention, the mobile station and the base station 4100 may both receive a satellite signal. The base station 4100 may send a positioning correction signal to the mobile station, to implement differential satellite positioning. For example, the base station 4100 and the mobile station may receive a GPS positioning signal to implement DGPS positioning. Alternatively, the base station 4100 and the mobile station may receive a Galileo satellite navigation system positioning signal, a Beidou satellite navigation system positioning signal, a GLONASS positioning signal or the like. This is not limited.

In this embodiment of the present invention, before working, the mobile station needs to generate a map of the preset working region.

In a first possible implementation of this embodiment of the present invention, a user may hold the mobile station and walk to record a map. The recording a map includes the following steps: The user may start to walk along a boundary of the working region from a starting point, for example, a position of a charging station, and the mobile station may record position coordinates of the boundary. The user walks along an obstacle in the working region, and the mobile station may record position coordinates of the obstacle. The user walks along a traffic island in the working region, and the mobile station may record position coordinates of the traffic island. The user walks along a passage connecting sub-working regions of the working region, and the mobile station may record position coordinates of the passage.

In a second possible implementation of this embodiment of the present invention, the mobile station may be installed on the self-moving device. For example the mobile station may be detachably connected to the housing of the self-moving device, so that the mobile station may move synchronously with the self-moving device. To record a map, the mobile station may be installed on the self-moving device. The user may use an intelligent terminal device such as a mobile phone and a tablet to remotely control the self-moving device to move, so that the mobile station may record coordinates of the position points. Similarly, a map recording step includes recording a boundary of the working region, an obstacle in the working region, a passage connecting sub-regions or the like.

In a third possible implementation of this embodiment of the present invention, the self-moving device may include a pushing rod detachably installed at the housing of the self-moving device. To record a map, the mobile station is installed on the self-moving device, the pushing rod is installed at the housing of the self-moving device, and the user operates the pushing rod to push the self-moving device to move, so that the mobile station may record a boundary of the preset working region, an obstacle, a passage or the like.

In a fourth possible implementation of this embodiment of the present invention, the self-moving device may include an ultrasonic apparatus, so that the self-moving device may follow the user at a distance. To record a map, the mobile station is installed on the self-moving device, the user walks along a boundary of the preset working region, an obstacle, a passage or the like, and then the self-moving device may follow the user, so that the mobile station may record the map.

In a fifth possible implementation of this embodiment of the present invention, to record a map, the mobile station is separated from the self-moving device, and the mobile station is placed on a pushcart. For example, the mobile station may be installed on a hand-propelled device, and the user pushes a cart and walks, so that the mobile station may record a boundary of the preset working region, an obstacle, a passage or the like.

In this embodiment of the present invention, a preset coordinate system, for example, a Cartesian coordinate system XY may be created to generate a map. Specifically, a first point from which recording is started is used as the origin (0, 0) of the coordinate axes. For example, the position of the charging station may be used as the origin (0, 0) of the coordinate axes. The position coordinates that correspond to the origin and are output by the mobile station are $(x_0, y_0)$. As the user records the map, the mobile station outputs position coordinates $(x_1, y_1)$, and converts the position coordinates $(x_1, y_1)$ into $(x_1-x_0, y_1-y_0)$ when generating the map, so as to convert a satellite positioning coordinate system into a Cartesian coordinate system.

It should be noted that, on the map of a preset working region generated by the mobile station, absolute coordinates, that is, the latitude and longitude, of position points relative to the Earth may be recorded, or, coordinates in the coordinate system XY may be recorded. This is not limited.

In this embodiment of the present invention, the base station 4100 may be located inside the preset working region, or may be not located inside the preset working region. Optionally, to facilitate working of the self-moving device and improve quality of a positioning signal that is sent by a satellite and received by the base station, the base station may be installed outside the preset working region, for example, may be installed on a roof or at another high, relatively open position.

As shown in FIG. 37, the base station based on a differential positioning technology 4100 includes a power unit 4110 and a power supply unit 4120 electrically connected to the power unit 4110.

The power unit 4110 is configured to receive or send a signal to locate the mobile station.

Specifically, the power unit 4110 may receive a positioning signal such as a GPS positioning signal sent by a satellite. After the positioning signal is received, an internal processor may process the received positioning signal to generate a differential signal. The power unit 4110 may further send the differential signal to the mobile station. Correspondingly, the mobile station may receive the differential signal sent by the base station 4100, so as to provide navigation data to the self-moving device.

The power supply unit 4120 is configured to power the power unit 4110.

The power supply unit 4120 includes a wind power generation part 4121 and/or a solar power generation part 4122.

The wind power generation part 4121 is electrically connected to the power unit 4110, and is configured to: convert wind energy into electrical energy, and output the electrical energy to the power unit 4110.

The solar power generation part 4122 is electrically connected to the power unit 4110, and is configured to: convert solar energy into electrical energy, and output the electrical energy to the power unit 4110.

It may be understood that there is usually light wind in sunny weather and high wind in rainy weather. Therefore, in this embodiment of the present invention, the power supply unit 4120 may include both the wind power generation part 4121 and the solar power generation part 4122 to implement complementary wind energy and solar energy to maximize the utilization of natural resources. Alternatively, the power supply unit 4120 may include only the wind power generation part 4121 or the solar power generation part 4122. When the power supply unit 4120 includes only the solar power generation part 4122, a relatively large solar cell panel may be disposed in the solar power generation part 4122, and the powering capability of the power supply unit 4120 is improved by increasing a light receiving area of the solar cell panel.

For the base station based on a differential positioning technology in this embodiment, a power unit receives or sends a signal to locate a mobile station, so that a self-moving device can move inside a preset working region according to positioning. In this way, the trouble of arranging a boundary line around the preset working region of the self-moving device in the prior art can be avoided for an automatic working system, thereby effectively improving user experience. In addition, the base station may be disposed separately from a charging station. The base station is self-powered by using its own wind power generation part and/or solar power generation part. Therefore, an installing position of the base station is not restricted, quality of a positioning signal received by the base station is further ensured, and the base station and the mobile station provide more reliable navigation data to the automatic working system. In addition, it is not necessary to use an electric cable from the charging station to power the base station, so that the trouble of arranging a line for the base station is avoided, thereby further improving use experience of a user.

In a possible implementation, the base station 4100 may further include a support assembly. The wind power generation part 4121 and the solar power generation part 4122 of the power supply unit 4120 are both fixedly connected to the support assembly of the base station 4100.

In this embodiment of the present invention, to ensure the powering capability of the power supply unit 4120, the wind power generation part 4121 and the solar power generation part 4122 of the power supply unit 4120 may be separately disposed. Specifically, a solar cell panel in the solar power generation part 4122 is fixedly connected to a first position of the support assembly, and a fan in the wind power generation part 4121 is fixedly connected to a second position of the support assembly. Preferably, to improve the powering capability of the wind power generation part 4121 and enable the wind power generation part 4121 to maximally convert wind energy into electrical energy, in this embodiment of the present invention, the second position may be higher than the first position.

Further, to prevent an overlapping part that exists between a shadow region of the fan and a surface of the solar cell panel from decreasing the powering capability of the solar cell panel, in this embodiment of the present invention, a preset angle exists between the surface of the solar cell panel and a solar radiation direction.

Figure 38:
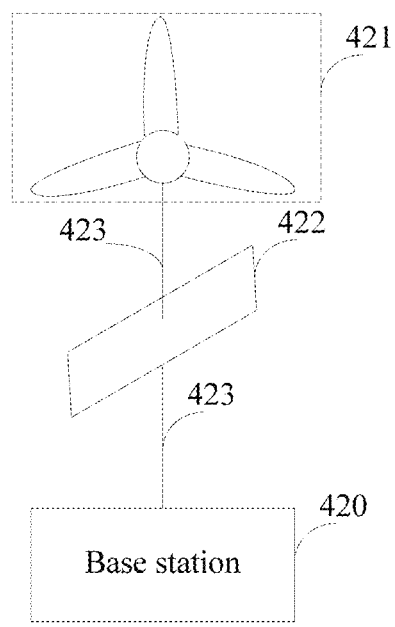
FIG. 38 is a schematic diagram of a position relationship between a wind power generation part and a solar power generation part according to an embodiment of the present invention.

In an example, FIG. 38 is a schematic diagram of a position relationship between the wind power generation part and the solar power generation part according to an embodiment of the present invention. FIG. 38 includes a base station 420, a fan 421 in the wind power generation part, a solar cell panel 422 in the solar power generation part, and a support assembly 423 (the power unit is not shown in FIG. 38). A shadow region of the fan 421 and a surface of the solar cell panel 422 do not have an overlapping part, and a preset angle exists between the surface of the solar cell panel 422 and a solar radiation direction.

In this embodiment of the present invention, to fully utilize the electrical energy converted by the wind power generation part 4121 and the solar power generation part 4122 in the power supply unit 4120, a storage battery may be disposed at the power supply unit 4120 to utilize electrical energy stored in the storage battery.

Figure 39:
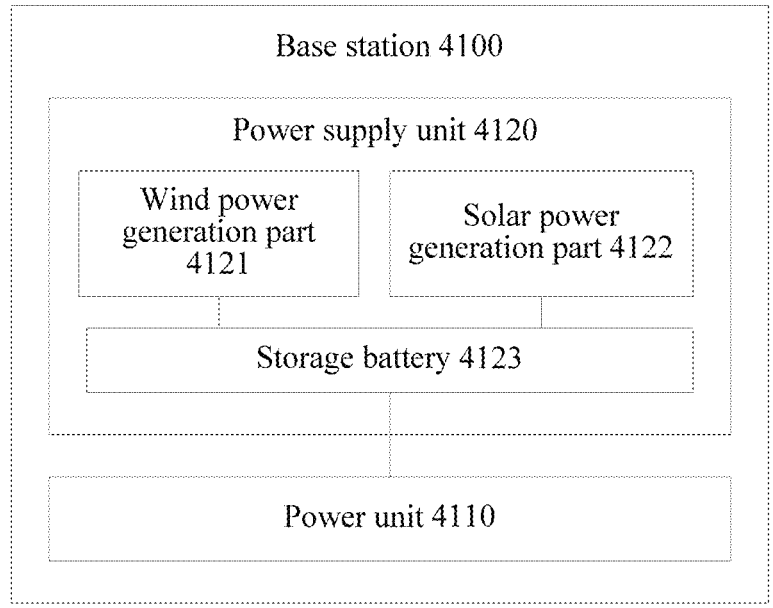
FIG. 39 is a schematic structural diagram of a second base station based on a differential positioning technology according to an embodiment of the present invention.

Specifically, referring to FIG. 39, based on the embodiment shown in FIG. 37, the power supply unit 4120 may further include a storage battery 4123. When being connected to the wind power generation part 4121 and/or the solar power generation part 4122, the storage battery 4123 is electrically connected to the power unit 4110, and is configured to: store electrical energy, and output the stored electrical energy to the power unit 4110.

Figure 40:
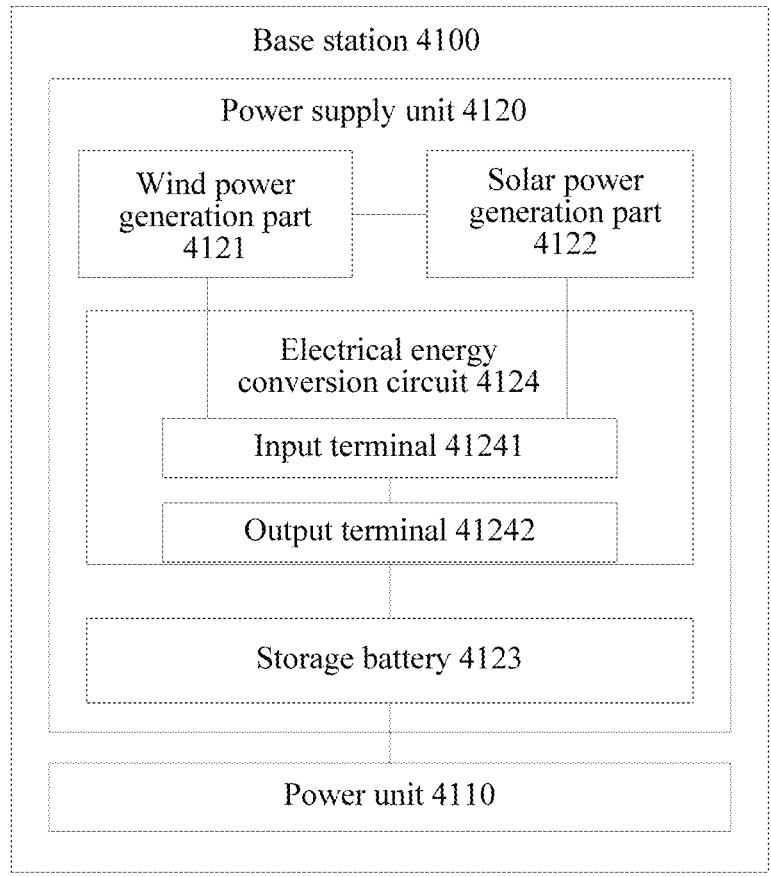
FIG. 40 is a schematic structural diagram of a third base station based on a differential positioning technology according to an embodiment of the present invention.

In a possible implementation, to enable the base station to normally work, an electrical parameter of electrical energy output by the wind power generation part 4121 and the solar power generation part 4122 needs to be adjusted to meet the working voltage and/or current of the base station 4100. Therefore, in this embodiment of the present invention, as shown in FIG. 40, the power supply unit 4120 may further include an electrical energy conversion circuit 4124. The electrical energy conversion circuit 4124 is electrically connected to the wind power generation part 4121 and the solar power generation part 4122, and is configured to adjust the electrical parameter of the electrical energy output by the wind power generation part 4121 and the solar power generation part 4122.

Specifically, the electrical energy conversion circuit 4124 includes an input terminal 41241 and an output terminal 41242. The input terminal 41241 of the electrical energy conversion circuit 4124 is connected in parallel to the solar power generation part 4122 and the wind power generation part 4121 that are connected in series, and the output terminal 41242 of the electrical energy conversion circuit 4124 is connected in parallel to the storage battery 4123.

Figure 41:
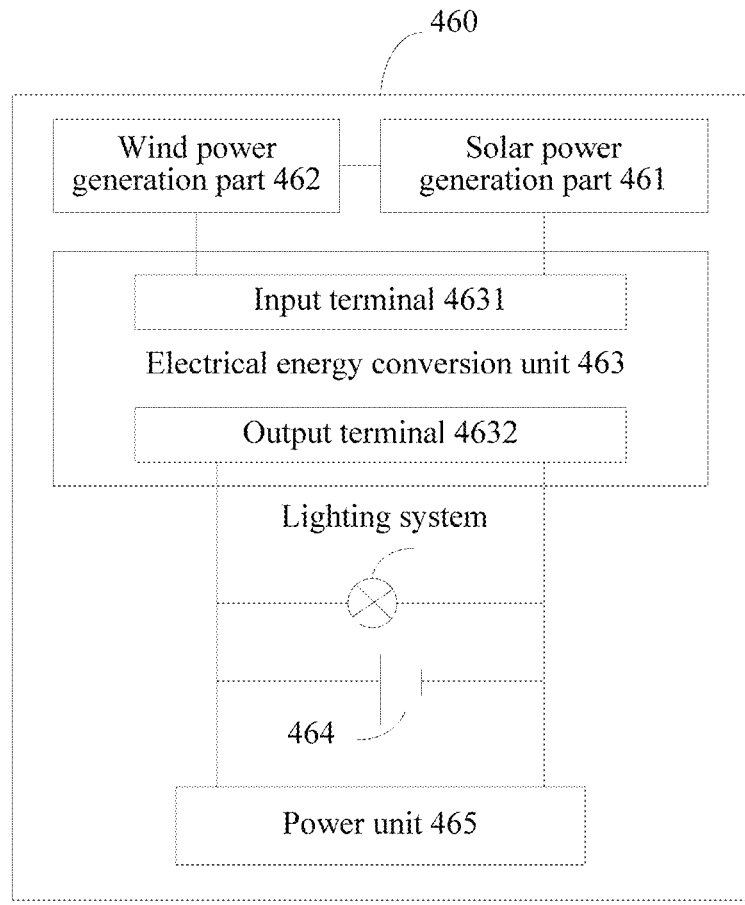
FIG. 41 is a schematic structural diagram of a base station according to an embodiment of the present invention.

In an example, FIG. 41 is a schematic structural diagram of a base station according to an embodiment of the present invention. A base station 460 includes a solar power generation part 461, a wind power generation part 462, an electrical energy conversion unit 463, a storage battery 464, and a power unit 465. The electrical energy conversion unit 463 the calculated position at the current momentincludes an input terminal 4631 and an output terminal 4632. The solar power generation part 461 and the wind power generation part 462 are connected in series and then connected in parallel to the input terminal 4631 of the electrical energy conversion unit 463. The output terminal 4632 of the electrical energy conversion unit 463 is connected in parallel to the storage battery 464. The storage battery 464 outputs the stored electrical energy to the power unit 465. Further, the storage battery 464 may further power a lighting system, so as to save electrical energy, thereby further improving user experience.

Figure 42:
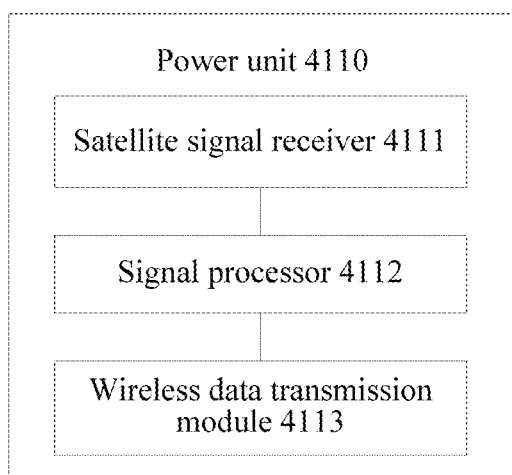
FIG. 42 is a schematic structural diagram of a power unit according to an embodiment of the present invention.

In a possible implementation of this embodiment of the present invention, referring to FIG. 42, based on the embodiment shown in FIG. 37, the power unit 4110 includes a satellite signal receiver 4111, a signal processor 4112, and a wireless data transmission module 4113 that are electrically connected.

The satellite signal receiver 4111 is configured to receive a positioning signal such as a GPS positioning signal sent by a satellite.

The signal processor 4112 is configured to generate a differential signal according to the positioning signal received by the satellite signal receiver 4111.

The wireless data transmission module 4113 is configured to send the differential signal to a mobile station.

In this embodiment of the present invention, the base station receives, by using a satellite receiver, a positioning signal sent by a satellite. Next, the signal processor processes the positioning signal to generate a differential signal. The wireless data transmission module further sends the differential signal to a mobile station. Accordingly, the mobile station may be located, so that a self-moving device can move inside a preset working region according to positioning. In this way, the trouble of arranging a line in the prior art can be avoided for an automatic working system, and improving user experience.

To implement the foregoing embodiments, the present invention further provides an automatic working system.

Figure 43:
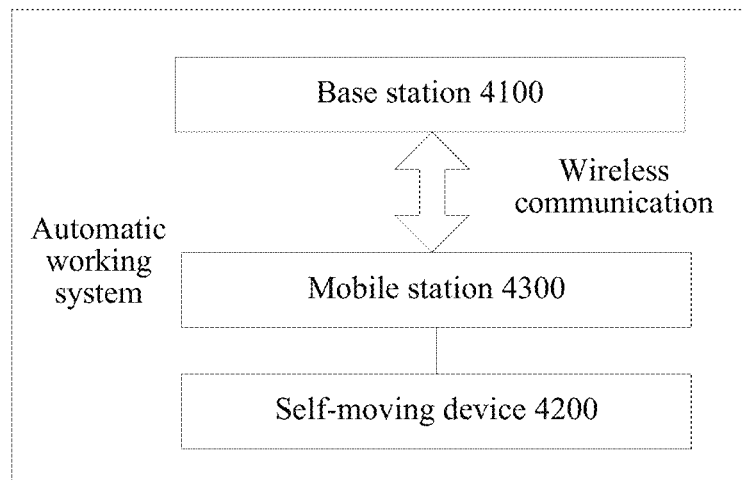
FIG. 43 is a schematic structural diagram of an automatic working system according to an embodiment of the present invention.

FIG. 43 is a schematic structural diagram of an automatic working system according to an embodiment of the present invention.

As shown in FIG. 43, the automatic working system includes: the foregoing base station 4100 based on a differential positioning technology provided in any embodiment, a self-moving device 4200, and a mobile station 4300 installed at the self-moving device 4200.

The self-moving device 4200 installed with the mobile station 4300 is configured to move inside a preset working region according to the positioning of the mobile station 4300 by the base station 4100.

Figure 44:
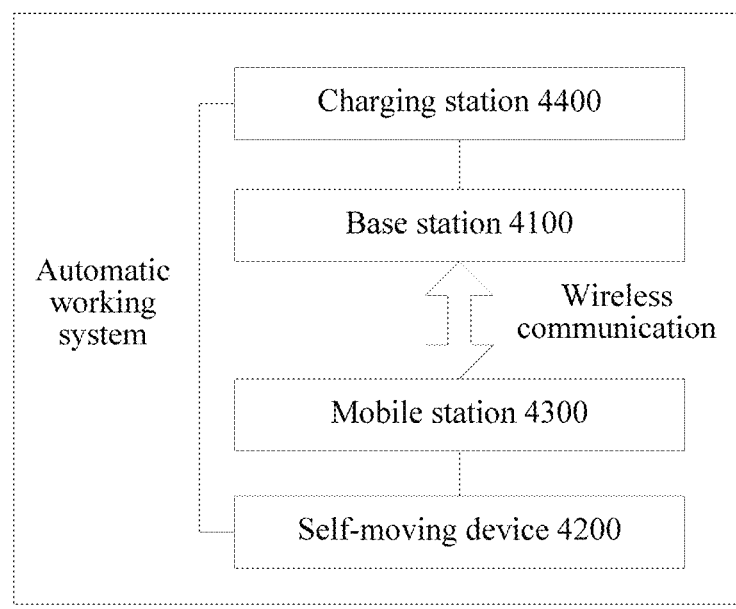
FIG. 44 is a schematic structural diagram of another automatic working system according to an embodiment of the present invention.

Further, in a possible implementation of this embodiment of the present invention, referring to FIG. 44, based on the embodiment shown in FIG. 43, the automatic working system may further include a charging station 4400 configured to charge the self-moving device 4200.

In a possible implementation of this embodiment of the present invention, the base station 4100 is electrically isolated from the charging station 4400.

Optionally, the base station 4100 may be self-powered by a power supply unit 4120, and the charging station 4400 may be connected to an alternating-current power supply in a user's home through an adapter.

In another possible implementation of this embodiment of the present invention, the base station 4100 is electrically connected to the charging station 4400.

Specifically, the storage battery 4123 of the power supply unit 4120 in the base station 4100 is connected in parallel to the charging station 4400, and is configured to power the charging station 4400.

Figure 45:
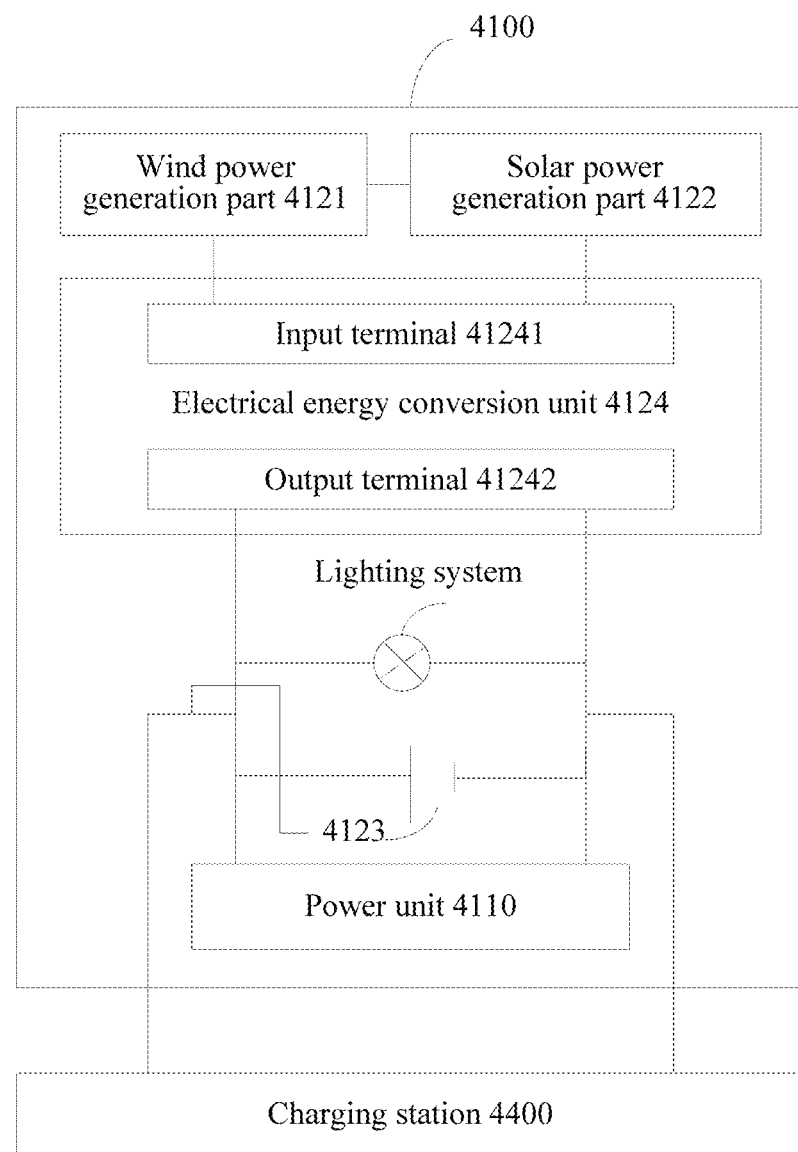
FIG. 45 is a schematic diagram of a connection between a base station and a charging station according to an embodiment of the present invention.

In this embodiment of the present invention, an example in which the base station 4100 is electrically connected to the charging station 4400 is used. For example, referring to FIG. 45, based on FIG. 40, a charging station 4400 is connected in parallel to the storage battery 4123, so that the storage battery 4123 may charge the charging station 4400.

In this embodiment of the present invention, the base station 4100 may power the charging station 4400 by using the storage battery 4123, so that it is not necessary to guide an electrical cable from the charging station 4400 to an alternating-current power supply in the user's home, and the trouble of arranging a line is avoided for the automatic working system.

It should be noted that in this embodiment of the present invention, the storage battery 4123 may further power a lighting system, so as to save electrical energy, thereby further improving user experience.

In an example, FIG. 46 is a schematic diagram of a working scenario of a self-moving device according to an embodiment of the present invention. FIG. 46 uses an example in which the self-moving device is an automatic lawn mower, and includes: a self-moving device 481, a mobile station 482 installed at the self-moving device 481, a charging station 483, a base station 484, and a satellite 485. During actual application, the charging station 483 may be not located on a boundary of the preset working region, for example, may be located inside the preset working region. The base station 484 may be located inside the preset working region or may be located outside the preset working region. This is not limited. To facilitate working of the self-moving device, FIG. 46 only uses an example in which the charging station 483 is located on the boundary of the preset working region and the base station 484 is located outside the preset working region.

In the automatic working system in this embodiment of the present invention, the self-moving device moves inside the preset working region according to the positioning of the mobile station by the base station, so that the trouble of arranging a line in the prior art can be completely avoided for the automatic working system, thereby effectively improving user experience.

In the description of this specification, the description of reference terms such as "an embodiment", "some embodiments", "an example", "specific example", and "some examples" means that specific features, structures, materials or characteristics that are described with reference to the embodiments or examples are included in at least one embodiment or example of the present invention. In this specification, the schematic description of the foregoing terms is not required to involve a same embodiment or example. Moreover, the described specific features, structures, materials or characteristics may be appropriately combined in any one or more embodiments or examples. In addition, without causing any contradiction, a person skilled in the art may combine different embodiments or examples and features in different embodiments or examples described in this specification.

In addition, the terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included. In the description of the present invention, unless otherwise particularly defined, "a plurality of" means at least two, for example, two or three.

The description of any process or method in the flowcharts or described herein in other manners may be understood as represents a module, a segment or a part that includes one or more codes of executable instructions used to implement the steps of a customized logic function or process, and the scope of preferred implementations of the present invention include other implementations. The functions may be executed in a basically simultaneous manner or an opposite order according to the related functions instead of the shown or described order. This should be understood by a person skilled in the art of the embodiments of the present invention.

The logic and/or steps represented in the flowcharts or described herein in other manners may be, for example, regarded as a sequenced list of executable instructions for implementing logic functions, and may be specifically implemented in any computer readable medium for use by instruction execution systems, apparatuses or devices (for example, a computer-based system, a system including a processor or another system that may take an instruction from the instruction execution systems, apparatuses or devices and execute the instruction), or for use in combination with these instruction execution systems, apparatuses or devices. In this specification, "the computer readable medium" may be any apparatus that may include, store, communicate, propagate or transmit a program for use by instruction execution systems, apparatuses or devices or for use in combination with these instruction execution systems, apparatuses or devices. A more specific example (a nonexhaustive list) of the computer readable medium includes the following: an electrical connection portion (electronic apparatus) with one or more wires, a portable computer cassette (magnetic apparatus), a RAM, a ROM, an EPROM (or a flash memory), a fiber apparatus, and a CD-ROM. In addition, the computer readable medium may even be paper or another suitable medium on which the program may be printed, because, for example, optical scanning may be performed on the paper or the another medium, the program is then obtained in an electronic manner by means of editing, deciphering or processing in another suitable manner when necessary, and the program is then stored in a computer memory.

It should be understood that the parts of the present invention may be implemented by using hardware, software, firmware or a combination thereof. In the foregoing implementations, a plurality of steps or methods may be implemented by using software or firmware that is stored in a memory and executed by a suitable instruction execution system. For example, during implementation of hardware, as in other implementations, any one or a combination of the following technologies well known in the art may be used for implementation: a discrete logic circuit having a logic gate circuit configured to implement a logic function on a data signal, an application-specific integrated circuit having a suitable combinational logic gate circuit, a PGA, an FPGA, and the like.

A person of ordinary skill in the art may understand that all or some steps carried in the methods of the foregoing embodiments may be implemented by a program instructing relevant hardware. The program may be stored in a computer readable storage medium. When the program runs, one or a combination of the steps of the method embodiments is performed.

In addition, the functional units in the embodiments of the present invention may either be integrated in a processing module or separate physical units. Alternatively, two or more of the foregoing units may be integrated in one module. The foregoing integrated modules may be implemented in the form of hardware or software functional modules. If implemented in the form of software function modules and sold or used as an independent product, the integrated modules may also be stored in a computer readable storage medium.

The storage medium mentioned in the foregoing may be a ROM, a magnetic disk, an optical disc or the like. Although the embodiments of the present invention are shown and described above, it should be understood that the foregoing embodiments are exemplary and should not be construed as limitations to the present invention. A person of ordinary skill in the art may make changes, modifications, replacements, and variations to the foregoing embodiments within the scope of the present invention.

The map generation method and apparatus for an automatic working system and the automatic working system in the embodiments of the present invention are described below with reference to the accompanying drawings.

FIG. 47 is a schematic flowchart of a first map generation method for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

The self-moving device may be an unattended device such as an automatic lawn mower, an automatic cleaning device, an automatic irrigation device, and an automatic snowplow.

Further, the automatic working system may further include a base station. The base station and the mobile station both receive a satellite signal, and the base station sends a positioning correction signal to the mobile station, to implement differential satellite positioning. For example, the base station and the mobile station may receive a GPS positioning signal to implement DGPS positioning. Alternatively, the base station and the mobile station may receive a Galileo satellite navigation system positioning signal, a Beidou satellite navigation system positioning signal, a GLONASS positioning signal or the like. This is not limited in this embodiment of the present invention.

In this embodiment of the present invention, an example in which the base station and the mobile station receive a GPS positioning signal is used.

In this embodiment of the present invention, the base station may include: a satellite signal receiver, configured to receive a GPS positioning signal sent by a satellite; a signal processor, configured to generate a positioning correction signal according to the positioning signal received by the satellite signal receiver; a wireless data transmission module, configured to send the positioning correction signal to the mobile station; and an indicator, configured to output an indication showing whether a satellite signal at a current position is desirable.

The wireless data transmission module may include a radio station and a radio station antenna. Further, to ensure reliable long-distance transmission between the base station and the mobile station, the wireless data transmission module may further include a Sub-1G module, a WiFi module, and a 2G/3G/4G/5G module. This is not limited.

Optionally, the base station may be disposed at a charging station, and is integrated with the charging station, so that the base station may be powered by the charging station. Certainly, the base station may be disposed separately from the charging station, for example, may be disposed at a position such as a roof where a satellite signal can be better received.

Correspondingly, the mobile station and may also include: a housing; a satellite signal receiver, configured to receive a GPS positioning signal sent by a satellite; a signal processor, configured to process the positioning signal received by the satellite signal receiver; a wireless data transmission module, configured to receive a positioning correction signal sent by the base station, where the wireless data transmission module may include a radio station and a radio station antenna; an indicator, configured to output an indication showing whether a satellite signal at a current position is desirable.

In this embodiment of the present invention, the mobile station may further integrate an inertial navigation apparatus, and the inertial navigation apparatus is configured to output inertial navigation data. When the mobile station is working, only the GPS positioning signal may be used for navigation, or a positioning signal obtained by combining a GPS positioning signal and inertial navigation data may be used for navigation, or only inertial navigation data may be used for navigation if a GPS signal is weak.

In this embodiment of the present invention, the mobile station may be detachably connected to the housing of the self-moving device. Specifically, the mobile station may include a first interface connected to the housing of the self-moving device. When the self-moving device is working, the mobile station is installed at the housing of the self-moving device. When being connected to the housing of the self-moving device, the mobile station may be electrically connected to a control module of the self-moving device. The mobile station outputs current position coordinates of the self-moving device, so that the control module may control, according to a current position of the self-moving device, the self-moving device to move and work. Alternatively, the mobile station outputs a control instruction according to the current position coordinates, and the control module of the self-moving device controls, based on the control instruction, the self-moving device to move or work.

It should be noted that in this embodiment of the present invention, the mobile station may include an independent power supply module. When being separated from the housing of the self-moving device, the mobile station may work independently.

As shown in FIG. 47, the map generation method for an automatic working system includes the following steps.

Step S101: Receive confirmation information from a user to confirm target position points, and acquire information about the target position points, where the target position points include position points on a boundary of a working region, and the information about the target position points includes coordinate information of the target position points.

In this embodiment of the present invention, the working region may include an outer boundary and an inner boundary. The target position points include position points on the outer boundary of the working region and/or position points on the inner boundary of the working region. For example, when the self-moving device is an automatic lawn mower, a flower bed, a bush, and the like may exist in the working region. In this case, the boundary of the working region may include the outer boundary and the inner boundary. The inner boundary may be a boundary of a flower bed, a boundary of a bush, and the like. Therefore, in this embodiment of the present invention, when drawing a map of the working region, the user may specify target position points on the outer boundary and/or the inner boundary of the working region. Next, the mobile station may acquire the information about the target position points, so that the flexibility of the method can be improved.

In a possible implementation, the mobile station may include several buttons configured to input instructions such as "Record a map", "Confirm", and "Complete recording". The user may carry the mobile station and move to a target position point. Next, a confirmation button on the mobile station is triggered to confirm the target position point, so that the mobile station may record the information about the target position point.

For example, the mobile station may be separated from the housing of the self-moving device, and the mobile station works independently. The user may hold the mobile station and move to a target position point. Next, the user triggers the confirmation button on the mobile station to confirm the target position point, so that the mobile station may record information about the target position point. It should be noted that when the user holds the mobile station and moves, with the shaking of a hand, the mobile station may tilt around to severely interfere with the inertial navigation apparatus. Therefore, in this embodiment of the present invention, when the user holds the mobile station and moves, the inertial navigation apparatus may be in an off state.

Alternatively, the mobile station may be separated from the housing of the self-moving device. To record a map, the mobile station is placed on a push device. For example, the mobile station may be installed on a hand-propelled device, so that the user may push a cart and walk to a target position point. Next, the user may trigger the confirmation button on the mobile station to confirm the target position point, so that the mobile station may record information about the target position point.

Alternatively, the self-moving device may include a pushing rod detachably installed at the housing of the self-moving device. To record a map, the mobile station is installed on the self-moving device, the pushing rod is installed at the housing of the self-moving device, and the user operates the pushing rod to push the self-moving device to move to a target position point. Next, the user may trigger the confirmation button on the mobile station to confirm the target position point, so that the mobile station may record information about the target position point.

In another possible implementation of this embodiment of the present invention, a detection signal may be transmitted externally by using the mobile station or a carrier of the mobile station, to detect a biometric feature signal of a user, where the user moves along the boundary of the working region, and the biometric feature signal is a signal generated by the user; and the biometric feature signal is tracked to control the mobile station moves to a target position point. Next, the mobile station may receive the confirmation information of the user to confirm the target position point, so that the mobile station may record information about the target position point.

For example, the self-moving device may include an ultrasonic apparatus, so that the self-moving device may follow the user at a distance. To record a map, the mobile station is installed on the self-moving device, the user walks along the boundary of the working region, an obstacle, a passage or the like to a target position point, and then the self-moving device may follow the user to the target position point. The user may then trigger the confirmation button on the mobile station to confirm the target position point, so that the mobile station may record information about the target position point.

Step S102: Connect the target position points to obtain at least one boundary to generate a map.

In this embodiment of the present invention, the target position points are position points specified by the user. The target position points may be spatially separated position points in the working region. Specifically, the target position points may be position points having feature information on the boundary of the working region. For example, the target position points may be turning points on the boundary of the working region. Alternatively, the target position points may be end points on straight line segments on the boundary of the working region. This is not limited.

In this embodiment of the present invention, the quantity of the target position points may be set. During specific implementation, the quantity of the target position points may be set according to the complexity of shape of the working region. Specifically, when the shape of the working region is relatively simple, the quantity of the target position points may be set relatively small. When the shape of the working region is relatively complex, the quantity of the target position points may be set relatively large.

For example, when the self-moving device is an automatic lawn mower, if the shape of the working region is relatively simple, that is, referring to FIG. 48a, if the shape of the working region is a rectangle, and there is only one house in the working region, the target position points may be turning points on the boundary of the working region. The quantity of the target position points acquired on the outer boundary of the working region may be 4. To be specific, the target position points are A, B, C, and D. The quantity of the target position points acquired on the inner boundary of the working region is also 4. To be specific, the target position points are E, F, G, and H. Alternatively, referring to FIG. 48b, if the outer boundary of the working region is a hexagon, and there is only one triangular flower bed in the working region, the target position points may include turning points on the outer boundary of the working region and/or turning points on the inner boundary of the working region. The quantity of the target position points acquired on the outer boundary may be 6. To be specific, the target position points are A, B, C, D, E, and F. The quantity of the target position points acquired on the inner boundary of the working region may be 3. To be specific, the target position points are G, H, and I.

Optionally, after acquiring the information about target position points, the mobile station may connect the target position points to obtain the at least one boundary to generate the map of the working region.

Specifically, several target position points on the outer boundary of the working region may be connected to obtain a map of the outer boundary of the working region. Similarly, several target position points on the inner boundary of the working region may be connected to obtain a map of the inner boundary of the working region. Eventually, the map of the outer boundary and the map of the inner boundary are combined to generate the map of the working region.

In a possible implementation, a first position of the map of the outer boundary on the map of the working region may be determined according to the coordinate information of the target position points on the outer boundary. The map of the working region may be acquired from an electronic map such as Google Map. Next, a second position of the map of the inner boundary on the map of the working region is determined according to the coordinate information of the target position points on the inner boundary. Further, the map of the outer boundary is positioned at the first position and the map of the inner boundary is positioned at the second position to generate the map of the working region.

It should be noted that the map generation method for an automatic working system in this embodiment of the present invention is particularly applicable to the working region having a regular shape. The user may specify target position points having feature information. Next, the mobile station only acquires information about the target position points specified by the user, and the target position points are then connected to obtain the at least one boundary to generate the map of the working region. Because it is not necessary to record the coordinates of position points on an entire boundary of the working region, map generation efficiency can be improved.

For example, referring to FIG. 48a, the target position points may be turning points on the boundary of the working region. Specifically, coordinates of four turning points on the outer boundary and the inner boundary of the working region may be acquired respectively, so that the four turning points on the outer boundary of the working region are connected to obtain a map of the outer boundary of the working region, and the four turning points on the inner boundary of the working region are connected to obtain a map of the inner boundary of the working region. Next, the map of the outer boundary and the map of the inner boundary are combined to generate the map of the working region, so that map generation efficiency can be effectively improved.

In the map generation method for an automatic working system in this embodiment, confirmation information is received from a user to confirm target position points, and information about the target position points is acquired, where the target position points include position points on a boundary of a working region, and the information about the target position points includes coordinate information of the target position points; and the target position points are then connected to obtain at least one boundary to generate a map. In this embodiment, a mobile station only acquires information about target position points specified by the user, and then connects the target position points to obtain the at least one boundary to generate the map. Because it is not necessary to record the coordinates of position points on an entire boundary of the working region, map generation efficiency can be improved. In addition, the user specifies the target position points, so that the method can be more flexible and adaptable. Moreover, information about only several target position points on the boundary of the working region is acquired, and it can be avoided that the mobile station passes through a region in which a positioning signal may be relatively poor in the working region, thereby improving map generation accuracy. When the user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

FIG. 49 is a schematic flowchart of a second map generation method for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

The map generation method in this embodiment is basically the same as the first map generation method for an automatic working system. A difference lies in that, as shown in FIG. 49, the map generation method for an automatic working system includes the following steps:

Step S201: Acquire information about several target position points, where the several target position points include discrete position points on the boundary of the working region, and the information about the target position points includes coordinate information of the target position points.

Step S202: Connect the target position points to obtain at least one boundary to generate a map of the working region.

In this embodiment, the discrete position points are position points that are spatially separated by an interval, for example, two end points of a straight line segment. Referring to FIG. 48a and FIG. 48b, position points A, B, C, D, and the like on the boundary of the working region are discrete position points. In contrast to discrete position points, there are continuous position points. It may be understood that when target position points are confirmed according to confirmation information of a user and information about the target position points are acquired, information about discrete target position points is obtained. When the mobile station moves and automatically acquires information about the target position points, information about continuous target position points is obtained.

In a possible implementation, the mobile station may acquire information about the target position points according to a preset sampling period. The sampling period may be preset in a built-in program of the mobile station. Alternatively, the sampling period may be set by the user. This is not limited. For example, the sampling period may be 2 s.

In the map generation method for an automatic working system in this embodiment, information about several target position points is acquired, where the several target position points include discrete position points on a boundary of a working region, and the information about the target position points includes coordinate information of the target position points; and the target position points are then connected to obtain at least one boundary to generate a map of the working region. In this embodiment, information about several target position points on the boundary of the working region is acquired, and the target position points are then connected to obtain the at least one boundary. Because it is not necessary to record the coordinates of position points on an entire boundary of the working region, map generation efficiency can be improved. In addition, information about only several target position points on the boundary of the working region is acquired, and it can be avoided that a mobile station passes through a region in which a positioning signal may be relatively poor in the working region, thereby improving map generation accuracy. When a user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

In the foregoing embodiment, before the target position points are connected to obtain at least one boundary, a boundary drawing instruction may be received from a user, so that a map is drawn according to the boundary drawing instruction of the user. When the user triggers the boundary drawing instruction to draw the map, the flexibility of the method can be effectively improved.

Figure 50:
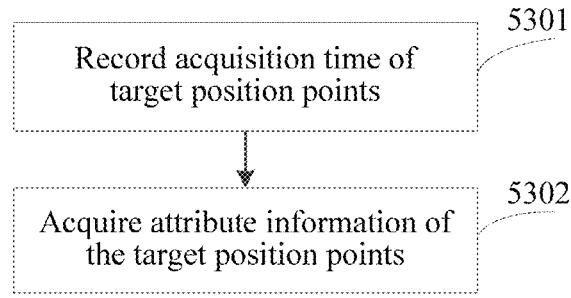
FIG. 50 is a schematic flowchart of a third map generation method for an automatic working system according to an embodiment of the present invention.

In a possible implementation, in this embodiment of the present invention, the target position points may be recorded in a preset order, so that each time target position points of one closed ring are recorded, the target position points may be sequentially connected according to acquisition time of each target position point to obtain a boundary of the closed ring. Therefore, referring to FIG. 50, based on the embodiment shown in FIG. 47 or FIG. 49, the acquiring information about the target position points specifically includes the following substeps:

Step S301: Record acquisition time of target position points.

In this embodiment of the present invention, after moving to a target position point, the mobile station may record coordinate information of the target position point, and record the acquisition time of the target position point.

Step S302: Acquire attribute information of the target position points.

Figure 51:
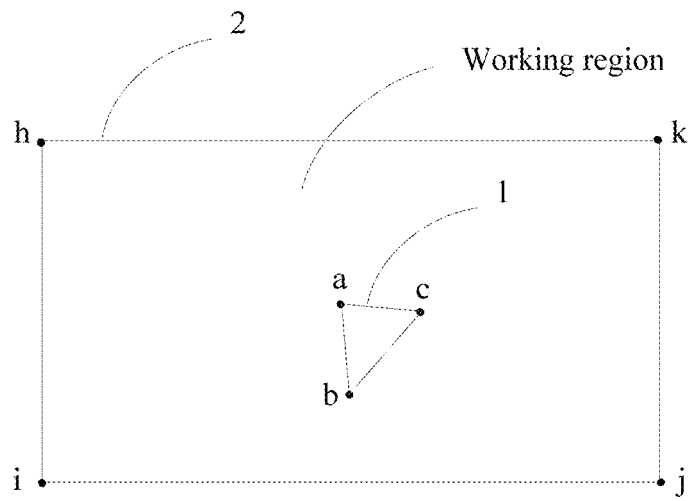
FIG. 51 is a schematic diagram of target position points according to an embodiment of the present invention.

In this embodiment of the present invention, the attribute information of the target position point is used to indicate a boundary to which the target position point belongs. For example, FIG. 51 is a schematic diagram of target position points according to an embodiment of the present invention. As can be learned from FIG. 51, it may be obtained from attribute information of target position points a, b, and c that a boundary to which the target position points a, b, and c belong is a boundary 1. It may be obtained from attribute information of target position points h, i, j, and k that a boundary to which the target position points h, i, j, and k belong is a boundary 2.

In this embodiment of the present invention, after the acquisition time and the attribute information of the target position points are obtained, target position points having the same attribute information may be classified to form a position point set. The target position points in the position point set may be connected according to the acquisition time of each target position point in the position point set, so that a boundary corresponding to the position point set may be obtained. The foregoing process is described below in detail with reference to FIG. 52.

Figure 52:
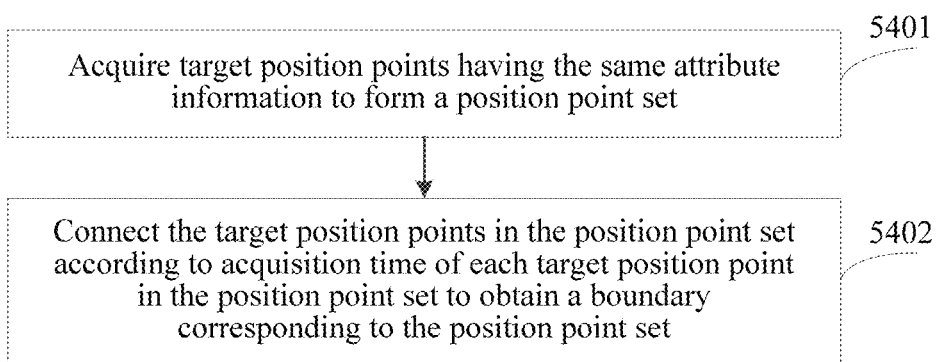
FIG. 52 is a schematic flowchart of a fourth map generation method for an automatic working system according to an embodiment of the present invention.

FIG. 52 is a schematic flowchart of a fourth map generation method for an automatic working system according to an embodiment of the present invention.

As shown in FIG. 52, the connecting the target position points to obtain at least one boundary specifically includes the following substeps.

Step S401: Acquire target position points having the same attribute information to form a position point set.

In this embodiment of the present invention, the target position points having the same attribute information belong to a same boundary. Therefore, the target position points having the same attribute information may be used to form the position point set.

In an example, referring to FIG. 51, the target position points a, b, and c have the same attribute information, and therefore, the target position points a, b, and c may be used to form a position point set 1. The target position points h, i, j, and k have the same attribute information, and therefore the target position points h, i, j, and k may be used to form a position point set 2.

Step S402: Connect the target position points in the position point set according to acquisition time of each target position point in the position point set to obtain a boundary corresponding to the position point set.

In this embodiment of the present invention, after the position point set is obtained, the target position points in the position point set may be sequentially connected according to the acquisition time of each target position point in the position point set and two sequential ends of a set of the target position points are connected to obtain a closed boundary to generate a map of a working region.

The foregoing example is still used. For the target position points a, b, and c in the position point set 1, the target position points are sequentially connected according to the acquisition time, and two sequential ends of a set of the target position points are connected, so that a closed boundary 1 can be obtained. For the target position points h, i, j, and k in the position point set 2, the target position points are sequentially connected according to the acquisition time, and two sequential ends of a set of the target position points are connected, so that a closed boundary 2 can be obtained.

In the map generation method for an automatic working system in this embodiment, target position points having the same attribute information are acquired to form a position point set, and the target position points in the position point set are connected according to acquisition time of each target position point in the position point set to obtain a boundary corresponding to the position point set. Because it is not necessary to record coordinates of position points on an entire boundary of a working region, map generation efficiency can be improved. In addition, information about only several target position points on the boundary of the working region is acquired, and it can be avoided that a mobile station passes through a region in which a positioning signal may be relatively poor in the working region, thereby improving map generation accuracy. When a user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

The map generation method for an automatic working system in this embodiment of the present invention is also applicable to a working region having an irregular shape. For example, a user may specify continuous position points on a boundary of the working region. Next, the mobile station may acquire information about the continuous position points, and connect the target position points and at least boundary segments that are obtained by acquiring the information about the continuous position points to obtain at least one boundary. Correspondingly, the mobile station may automatically acquire information about position points on the boundary of the working region, and connect the target position points and at least boundary segments that are obtained by automatically acquiring the information about the position points to obtain the at least one boundary.

For example, FIG. 53 is a schematic diagram of the shape of a working region according to still another embodiment of the present invention. For straight line segments in the working region, the method in FIG. 47 or FIG. 49 may be used to obtain a boundary. Specifically, the mobile station may sequentially acquire coordinate information of target position points A, B, C, D, E, and F. Next, the acquired target position points A, B, C, D, E, and F are connected according to an acquisition sequence to obtain at least one boundary, that is, obtain straight line segments AB, BC, CD, DE, and EF. For an arc-shaped segment FA, the mobile station may acquire information about continuous position points on the arc-shaped segment FA. Next, the target position points F and A and at least boundary segments that are obtained by acquiring the information about the continuous position points are connected to obtain the arc-shaped segment FA.

It should be noted that FIG. 53 uses an example in which a quantity of continuous position points acquired on the arc-shaped segment FA is 4. During actual application, the quantity of acquired position points may be set by the user, or, the quantity of the acquired position points may be automatically set by the mobile station according to the shape of the boundary. This is not limited.

In a possible implementation, for a working region having an irregular shape, referring to FIG. 54, a map of the working region may also be generated by using the following steps:

Step S501: Control the mobile station to start to move from a starting position point to a corresponding end position point, and continuously acquire information about position points through which the mobile station moves, where the starting position point and the end position point are position points on the boundary of the working region.

In this embodiment of the present invention, the starting position point includes a starting position point of a non-straight line segment on the boundary of the working region, and the end position point includes an end position point of the non-straight line segment on the boundary of the working region.

Specifically, for any non-straight line segment on the boundary of the working region, the user may specify any end point of the non-straight line segment as the starting position point, and correspondingly, the other end point is an end position point. Next, the mobile station may be controlled to move from the starting position point of the non-straight line segment to the corresponding end position point, and continuously acquire information about position points through which the mobile station moves.

Step S502: Connect the target position points, the starting position point, and the end position point to obtain the at least one boundary to generate the map of the working region.

For example, FIG. 53 is a schematic diagram of the shape of a working region according to still another embodiment of the present invention. For straight line segments in the working region, the method in FIG. 47 or FIG. 49 may be used to obtain a boundary. Specifically, the mobile station may sequentially acquire coordinate information of target position points A, B, C, D, E, and F. Next, the acquired target position points A, B, C, D, E, and F are connected according to an acquisition sequence to obtain the at least one boundary, that is, obtain straight line segments AB, BC, CD, DE, and EF. For an arc-shaped segment FA, F may be specified as a starting position point, and A may be specified as an end position point, so that the mobile station may be controlled to start to move from the starting position point F to a corresponding end position point A, and information about position points through which the mobile station moves is continuously acquired, so as to obtain an arc segment FA, so that a complete map of the working region can be generated.

In the map generation method for an automatic working system in this embodiment, feature position points on a regular boundary segment may be acquired to generate a boundary efficiently, and for an irregular boundary segment, a continuous acquisition manner may be used to ensure the accuracy of a map of a boundary.

To implement the foregoing embodiments, the present invention further provides a map generation apparatus for an automatic working system.

FIG. 55 is a schematic structural diagram of a map generation apparatus for an automatic working system according to an embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

As shown in FIG. 55, a map generation apparatus 5100 for an automatic working system includes an information receiving module 5110 and a connection and generation module 5120.

The information receiving module 5110 is configured to: receive confirmation information from a user to confirm target position points, and acquire information about the target position points, where the target position points include position points on the boundary of the working region, and the information about the target position points includes coordinate information of the target position points.

In this embodiment of the present invention, the target position points include position points on an outer boundary of the working region and/or position points on an inner boundary of the working region.

In this embodiment of the present invention, the quantity of the target position points may be set. Specifically, the user may select, according to a shape feature of the boundary, a position of the acquired target position points, a quantity of position points, or intervals between the position points.

In this embodiment of the present invention, the target position points include turning points on the boundary of the working region.

The connection and generation module 5120 is configured to connect at least target position points to obtain at least one boundary to generate the map.

In a possible implementation, the connection and generation module 5120 is specifically configured to: connect several target position points on the outer boundary to obtain a map of the outer boundary of the working region; connect several target position points on the inner boundary to obtain a map of the inner boundary of the working region; and combine the map of the outer boundary and the map of the inner boundary to generate the map.

In another possible implementation, the connection and generation module 5120 is specifically configured to: determine a first position of the map of the outer boundary on the map of the working region according to the coordinate information of the target position points on the outer boundary; determine a second position of the map of the inner boundary on the map of the working region according to the coordinate information of the target position points on the inner boundary; and position the map of the outer boundary at the first position, and position the map of the inner boundary at the second position to generate the map of the working region.

In a possible implementation, the information receiving module 5110 is specifically configured to: record acquisition time of target position points; and acquire attribute information of the target position points. The connection and generation module 5120 is specifically configured to: acquire target position points having the same attribute information to form a position point set; and connect the target position points in the position point set according to the acquisition time of each target position point in the position point set to obtain a boundary corresponding to the position point set.

Optionally, the connection and generation module 5120 is further configured to sequentially connect the target position points according to the acquisition time of each target position point in the position point set and connect two sequential ends of a set of the target position points to obtain a closed boundary.

Figure 56:
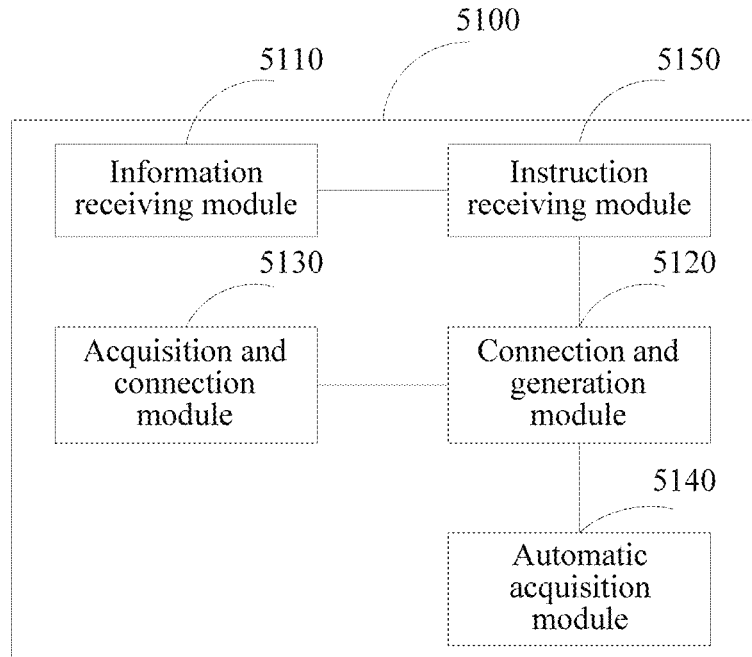
FIG. 56 is a schematic structural diagram of another map generation apparatus for an automatic working system according to an embodiment of the present invention.

Further, in a possible implementation of this embodiment of the present invention, referring to FIG. 56, based on the embodiment shown in FIG. 55, the map generation apparatus 5100 for an automatic working system may further include an acquisition and connection module 5130, an automatic acquisition module 5140, and an instruction receiving module 5150.

The acquisition and connection module 5130 is configured to: acquire information about continuous position points on the boundary of the working region, and connect target position points and at least boundary segments that are obtained by acquiring the information about the continuous position points to obtain the at least one boundary.

The automatic acquisition module 5140 is configured to: automatically acquire information about position points on the boundary of the working region, and connect target position points and at least boundary segments that are obtained by automatically acquiring the information about the position points to obtain the at least one boundary.

The instruction receiving module 5150 is configured to receive a boundary drawing instruction from the user.

It should be noted that the foregoing description of the embodiment of the map generation method for an automatic working system in FIG. 47, FIG. 48, and FIG. 50 to FIG. 54 is also applicable to the map generation apparatus 5100 for an automatic working system in this embodiment. Details are not described herein again.

For the map generation apparatus for an automatic working system in this embodiment, confirmation information is received from a user to confirm target position points, and information about the target position points is acquired, where the target position points include position points on a boundary of a working region, and the information about the target position points includes coordinate information of the target position points; and the target position points are then connected to obtain at least one boundary to generate a map. In this embodiment, a mobile station only acquires information about target position points specified by the user, and then connects the target position points to obtain the at least one boundary to generate the map. Because it is not necessary to record the coordinates of position points on an entire boundary of the working region, map generation efficiency can be improved. In addition, the user specifies the target position points, so that the method can be more flexible and adaptable. Moreover, information about only several target position points on the boundary of the working region is acquired, and it can be avoided that the mobile station passes through a region in which a positioning signal may be relatively poor in the working region, thereby improving map generation accuracy. When the user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

To implement the foregoing embodiments, the present invention further provides a map generation apparatus for an automatic working system.

Figure 57:
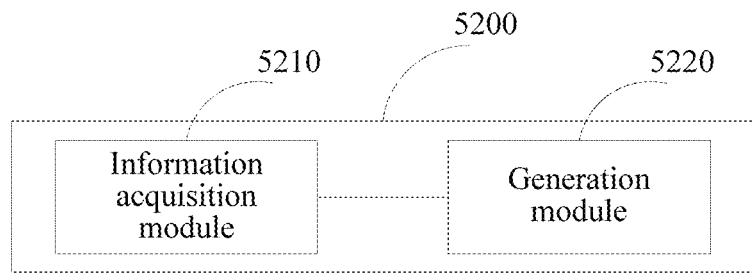
FIG. 57 is a schematic structural diagram of still another map generation apparatus for an automatic working system according to an embodiment of the present invention.

FIG. 57 is a schematic structural diagram of a map generation apparatus for an automatic working system according to still another embodiment of the present invention.

In this embodiment of the present invention, an automatic working system includes: a self-moving device, autonomously moving inside a working region defined on a map, and a positioning mobile station, the mobile station moving along a boundary of the working region and acquiring information about position points on the working region to generate the map.

As shown in FIG. 57, a map generation apparatus 5200 for an automatic working system includes an information acquisition module 5210 and a generation module 5220.

The information acquisition module 5210 is configured to acquire information about several target position points, where the several target position points include discrete position points on the boundary of the working region, and the information about the target position points includes coordinate information of the target position points.

In this embodiment of the present invention, the target position points include position points on an outer boundary of the working region and/or position points on an inner boundary of the working region.

The generation module 5220 is configured to connect the target position points to obtain at least one boundary to generate the map of the working region.

In a possible implementation, the generation module 5220 is specifically configured to: connect several target position points on the outer boundary to obtain a map of the outer boundary of the working region; connect several target position points on the inner boundary to obtain a map of the inner boundary of the working region; and combine the map of the outer boundary and the map of the inner boundary to generate the map.

In another possible implementation, the generation module 5220 is specifically configured to determine a first position of the map of the outer boundary on the map of the working region according to the coordinate information of the target position points on the outer boundary; determine a second position of the map of the inner boundary on the map of the working region according to the coordinate information of the target position points on the inner boundary; and position the map of the outer boundary at the first position and position the map of the inner boundary at the second position to generate the map of the working region.

In a possible implementation, the information acquisition module 5210 is specifically configured to: record acquisition time of the target position points; and acquire attribute information of the target position points. The generation module 5220 is specifically configured to: acquire target position points having the same attribute information to form a position point set; and connect the target position points in the position point set according to the acquisition time of each target position point in the position point set to obtain a boundary corresponding to the position point set.

Optionally, the generation module 5220 is further configured to sequentially connect the target position points according to the acquisition time of each target position point in the position point set and connect two sequential ends of a set of the target position points to obtain a closed boundary.

It should be noted that the foregoing description of the embodiment of the map generation method for an automatic working system in FIG. 47 to FIG. 58 is also applicable to the map generation apparatus 5200 for an automatic working system in this embodiment. Details are not described herein again.

For the map generation apparatus for an automatic working system in this embodiment, information about several target position points is acquired, where the several target position points include discrete position points on a boundary of a working region, and the information about the target position points includes coordinate information of the target position points; and the target position points are then connected to obtain at least one boundary to generate a map of the working region. In this embodiment, information about several target position points on the boundary of the working region is acquired, and the target position points are then connected to obtain the at least one boundary. Because it is not necessary to record the coordinates of position points on an entire boundary of the working region, map generation efficiency can be improved. In addition, information about only several target position points on the boundary of the working region is acquired, and it can be avoided that a mobile station passes through a region in which a positioning signal may be relatively poor in the working region, thereby improving map generation accuracy. When a user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

To implement the foregoing embodiments, the present invention further provides an automatic working system.

Figure 58:
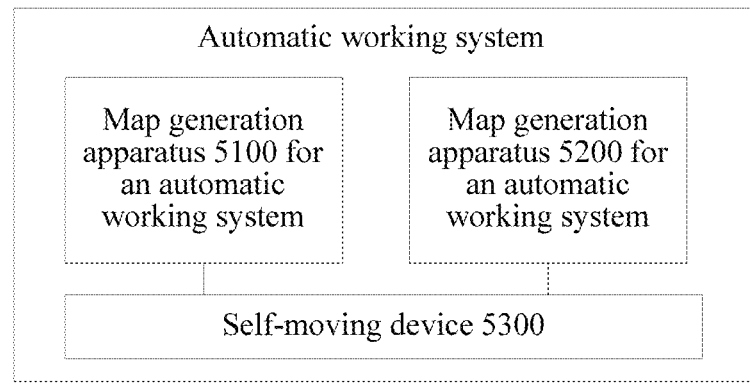
FIG. 58 is a schematic structural diagram of an automatic working system according to an embodiment of the present invention.

FIG. 58 is a schematic structural diagram of an automatic working system according to an embodiment of the present invention.

As shown in FIG. 58, the automatic working system includes the foregoing map generation apparatus 5100 for an automatic working system provided in the embodiment in FIG. 55 to FIG. 56 or the foregoing map generation apparatus 5200 for an automatic working system provided in the embodiment in FIG. 57 and a self-moving device 5300.

The self-moving device 5300 moves and works based on a map of a working region.

For the automatic working system in this embodiment, a mobile station generates a map of a working region, so that a self-moving device may move and work based on the map of the working region. In this embodiment, the mobile station does not need to record coordinates of position points on an entire boundary of the working region, so that map generation efficiency can be improved. In addition, the mobile station acquires information about only several target position points on the boundary of the working region, and it can be avoided that the mobile station passes through a region in which a positioning signal may be relatively poor in the working region, thereby improving map generation accuracy, so that efficient and reliable navigation data can be provided to the self-moving device. When a user holds the mobile station and moves to record the boundary, with the shaking of a hand, the mobile station may tilt around. As a result, coordinates of the boundary that are recorded by the mobile station are different from actual values, and map generation accuracy is decreased. The foregoing problem can be effectively resolved by using the solution in this embodiment.

To implement the foregoing embodiments, the present invention further provides a computer device, including a processor and a memory, where the processor reads an executable program code stored in the memory to execute a program corresponding to the executable program code, to implement the foregoing map generation method for an automatic working system provided in the embodiment in FIG. 47 to FIG. 54 of the present invention.

To implement the foregoing embodiments, the present invention further provides a non-transitory computer readable storage medium, storing a computer program, where when being executed by a processor, the program implements the foregoing map generation method for an automatic working system provided in the embodiment in FIG. 47 to FIG. 54 of the present invention.

To implement the foregoing embodiments, the present invention further provides a computer program product, where when being executed by a processor, an instruction in the computer program product performs the foregoing map generation method for an automatic working system the present invention provided in the embodiment in FIG. 47 to FIG. 54.

In the description of this specification, the description of reference terms such as "an embodiment", "some embodiments", "an example", "specific example", and "some examples" means that specific features, structures, materials or characteristics that are described with reference to the embodiments or examples are included in at least one embodiment or example of the present invention. In this specification, the schematic description of the foregoing terms is not required to involve a same embodiment or example. Moreover, the described specific features, structures, materials or characteristics may be appropriately combined in any one or more embodiments or examples. In addition, without causing any contradiction, a person skilled in the art may combine different embodiments or examples and features in different embodiments or examples described in this specification.

In addition, the terms such as "first" and "second" are used only for the purpose of description, and should not be understood as indicating or implying the relative importance or implicitly specifying the number of the indicated technical features. Therefore, when features are defined by "first" and "second", at least one such feature can be explicitly or implicitly included. In the description of the present invention, unless otherwise particularly defined, "a plurality of" means at least two, for example, two or three.

The description of any process or method in the flowcharts or described herein in other manners may be understood as represents a module, a segment or a part that includes one or more codes of executable instructions used to implement the steps of a customized logic function or process, and the scope of preferred implementations of the present invention include other implementations. The functions may be executed in a basically simultaneous manner or an opposite order according to the related functions instead of the shown or described order. This should be understood by a person skilled in the art of the embodiments of the present invention.

The logic and/or steps represented in the flowcharts or described herein in other manners may be, for example, regarded as a sequenced list of executable instructions for implementing logic functions, and may be specifically implemented in any computer readable medium for use by instruction execution systems, apparatuses or devices (for example, a computer-based system, a system including a processor or another system that may take an instruction from the instruction execution systems, apparatuses or devices and execute the instruction), or for use in combination with these instruction execution systems, apparatuses or devices. In this specification, "the computer readable medium" may be any apparatus that may include, store, communicate, propagate or transmit a program for use by instruction execution systems, apparatuses or devices or for use in combination with these instruction execution systems, apparatuses or devices. A more specific example (a nonexhaustive list) of the computer readable medium includes the following: an electrical connection portion (electronic apparatus) with one or more wires, a portable computer cassette (magnetic apparatus), a RAM, a ROM, an EPROM (or a flash memory), a fiber apparatus, and a CD-ROM. In addition, the computer readable medium may even be paper or another suitable medium on which the program may be printed, because, for example, optical scanning may be performed on the paper or the another medium, the program is then obtained in an electronic manner by means of editing, deciphering or processing in another suitable manner when necessary, and the program is then stored in a computer memory.

It should be understood that the parts of the present invention may be implemented by using hardware, software, firmware or a combination thereof. In the foregoing implementations, a plurality of steps or methods may be implemented by using software or firmware that is stored in a memory and executed by a suitable instruction execution system. For example, during implementation of hardware, as in other implementations, any one or a combination of the following technologies well known in the art may be used for implementation: a discrete logic circuit having a logic gate circuit configured to implement a logic function on a data signal, an application-specific integrated circuit having a suitable combinational logic gate circuit, a PGA, an FPGA, and the like.

A person of ordinary skill in the art may understand that all or some steps carried in the methods of the foregoing embodiments may be implemented by a program instructing relevant hardware. The program may be stored in a computer readable storage medium. When the program runs, one or a combination of the steps of the method embodiments is performed.

In addition, the functional units in the embodiments of the present invention may either be integrated in a processing module or separate physical units. Alternatively, two or more of the foregoing units may be integrated in one module. The foregoing integrated modules may be implemented in the form of hardware or software functional modules. If implemented in the form of software function modules and sold or used as an independent product, the integrated modules may also be stored in a computer readable storage medium.

The storage medium mentioned in the foregoing may be a ROM, a magnetic disk, an optical disc or the like. Although the embodiments of the present invention are shown and described above, it should be understood that the foregoing embodiments are exemplary and should not be construed as limitations to the present invention. A person of ordinary skill in the art may make changes, modifications, replacements, and variations to the foregoing embodiments within the scope of the present invention.

The basic principle of the present application has been described above with reference to specific embodiments. However, it should be noted that the advantages, benefits, effects and the like mentioned in the present application are only exemplary but are not limitative. It cannot be considered that every embodiment of the present application must have these advantages, benefits, effects and the like. In addition, the specific details disclosed above are only used as examples for ease of understanding but are not limitative. The foregoing details do not limit that the present application must be implemented by using the foregoing specific details.

The block diagrams of the devices, apparatuses, equipment, and systems used in the present application are only exemplary but are not intended to require or imply identical connections, arrangements, and configurations in the manners shown in the block diagrams. For example, a person skilled in the art will conceive of that these devices, apparatuses, equipment, and systems may be connected, arranged or configured in any manner. The words such as "include", "comprise", and "have" are non-exclusive words and mean "include, but is not limited to", and these words may be used interchangeably. The words "or" and "and" used herein mean the word "and/or", and these words may be used interchangeably, unless explicitly indicated otherwise in the context. The words "for example" used herein means the words "for example, but is not limited to", and these words may be used interchangeably.

It should be further noted that in the apparatuses, devices and methods of the present application, the parts or the steps may be divided and/or recombined. These divisions and/or recombinations should be considered as equivalent solutions of the present application.

The foregoing description of the disclosed aspects enables a person skilled in the art to implement or use the present application. It is apparent to a person skilled in the art to make various changes to these aspects. The general principle defined herein is applicable to other aspects without departing from the scope of the present application. Therefore, the present application is not limited to the aspects shown herein, and instead is to meet the widest range consistent with the principles and novel features disclosed herein.

The foregoing description has been presented for illustration and description purposes. In addition, the description is not intended to limit the embodiments of the present application to the form disclosed herein. Although a plurality of example aspects and embodiments have been discussed in the foregoing, a person skilled in the art will conceive of some variations, modifications, changes, additions, and sub-combinations of the example aspects and embodiments.

What is claimed is:

1. A method for an automatic working system, the method including:
    receiving, by a mobile station, a signal from a first antenna of the mobile station, the signal including a first signal of a satellite;
    determining, by the mobile station, position information of one or more positions of a self-moving device inside or outside of a working region based on the signal;
    controlling, by a control unit of the self-moving device, a movement of the self-moving device based on the position information;
    determining, by the mobile station, a quality of the signal received by the first antenna;
    determining, by the mobile station, an indication manner of a first indication module of the mobile station based on the quality of the signal received by the first antenna;
    acquiring, by the mobile station, a differential signal sent by a base station;
    determining, by the mobile station, a movement of the base station based on a state of the mobile station, the differential signal, and the first signal of a satellite,
    wherein the determining the movement of the base station includes:
        calculating, by the mobile station, a calculated position of the mobile station at a current time point according to the differential signal and the first signal of a satellite; and
        determining, by the mobile station, whether the mobile station is in a stationary state based on an output value of a first displacement sensor of the mobile station;
        when the mobile station is in the stationary state, determining, by the mobile station, whether the calculated position at the current time point is consistent with a calculated position at a previous time point; and
        when the calculated position at the current time point is not consistent with the calculated position at the previous time point, generating, by the first indication module, an indication of movement of the base station.

2. The state detection method according to claim 1, wherein the determining, by the mobile station, the quality of the signal received by the first antenna includes:
    determining, by the mobile station, the quality of the signal received by the first antenna based on a parameter of the first signal of a satellite received by the first antenna, the parameter of the first signal of a satellite including a number of satellite signals received and a signal-to-noise ratio of each of the number of satellite signals received.

3. The method according to claim 1, further including:
    receiving, by the mobile station, an output from an attitude sensor disposed on the first antenna;
    determining, by the mobile station, a state of a current attitude of the first antenna based on the output from the attitude sensor; and
    upon determining the state of the current attitude of the first antenna being abnormal, generating, by the first indication module, an indication of the attitude of the first antenna being incorrect.

4. The method according to claim 1, further including:
    determining, by the mobile station, the first antenna being obstructed based on an output value of a first contact sensor disposed on a receiving surface of the first antenna; and
    upon determining the first antenna being obstructed, generating, by the first indication module, an indication of the first antenna being obstructed.

5. The method according to claim 1, further including:
    generating, by the mobile station, an indication of whether an attitude of holding a handle portion of the mobile station is correct, the handle portion being configured to assist a user in keeping the first antenna in a correct attitude.

6. The method according to claim 5, further including:
    before generating the indication of whether the attitude of the holding portion of the mobile station is correct and when the handle is being held by the user, determining, by the mobile station, whether the attitude of the antenna is correct based on an output value of a second contact sensor disposed at the handle portion.

7. The method according to claim 1, further including:
    generating, by the first indication module, an indication of remaining power of an energy source module of the mobile station.

8. The method according to claim 1, wherein the determining an indication manner of the first indication module includes:
    determining a display manner of the first indication module;
    determining a vibration manner of the first indication module;
    determining voice content of the first indication module; or
    determining content sent to a terminal by using the first indication module.

9. The method according to claim 1, further including:
    upon determining the quality of the signal on the first antenna satisfies a preset condition at one or more positions, determining, by the mobile station, a fixing position of a charging station or the base station at the one or more positions.

10. The method according to claim 1, further including:
generating, by the mobile station, a map according to the first signal of a satellite received by the first antenna; and
upon determining the quality of the signal received by the first antenna, marking, by the mobile station, map information at one or more positions based on the quality of the signal received by the first antenna.

11. The method according to claim 1, further including:
acquiring, by a communications module of the mobile station, a state of the signal at a current position and/or time; and
determining, by the mobile station, a working state of the communications module at the current position based on the state of the signal acquired by the communication module, or
determining, by the communication module, a working state of a peer end in communication connection with the mobile station.

12. The method according to claim 11, further including:
connecting, by the communications module, the mobile station to a terminal; and
sending, by the mobile station, the working state of the mobile station at the current position to the terminal.

13. The method according to claim 1, further including:
generating, by a second indication module of the base station, a quality of a signal received by a second antenna of the base station, the second antenna being configured to receive a second signal, the second signal including a second signal of a satellite.

14. The method according to claim 13, further including:
when the base station determines that the base station has moved, generating, by the second indication module, an indication that the base station has moved.

15. The method according to claim 1, further comprising:
determining whether a positioning fault of the self-moving device has occurred based on a failure to determine the position of the self-moving device; and
in response to determining the positioning fault, controlling the self-moving device to stop.

16. The method according to claim 1, further comprising:
in response to failing to determine a position of the self-moving device at a predetermined accuracy level, determining a time point before a positioning fault occurred in the self-moving device;
acquiring positioning data at the time point; and
locating, based on a predetermined positioning fault handling strategy, the self-moving device by using the positioning data.

17. A mobile station configured to move and work inside a working region defined on a map, including:
a first antenna configured to receive a signal and a differential signal sent by a base station, the signal including a signal of a satellite;
a first indication module coupled to the first antenna;
a displacement sensor configured to detect movement of the mobile station;
a first memory storing a computer program; and
a first processor configured to invoke and execute the computer program stored in the first memory,
wherein the first processor is further configured to:
control the first indication module to perform indication,
determine position information of one or more positions of the mobile station inside or outside of a working region based on the signal;
control a movement of the mobile station based on the position information;
determine a quality of the signal received by the first antenna;
determine an indication manner of the first indication module based on the quality of the signal received by the first antenna;
determine a movement of the base station based on a state of the mobile station, the differential signal, and the signal of a satellite signal,
wherein the determining the movement of the base station includes:
calculating a calculated position of the mobile station at a current time point according to the differential signal and the signal of a satellite; and
determining whether the mobile station is in a stationary state based on an output value of the first displacement sensor of the mobile station;
determine, when the mobile station is in the stationary state, whether the calculated position at the current time point is consistent with a calculated position at a previous time point; and
control the first indication module to generate, when the calculated position at the current time point is not consistent with the calculated position at the previous time point, an indication of movement of the base station.

18. The mobile station according to claim 17, wherein the mobile station further includes at least one of a first contact sensor disposed on a receiving surface of the first antenna, an attitude sensor disposed on the first antenna, an energy source module, a communications module, a handle portion, and a second contact sensor disposed at the handle portion.

* * * * *